(12) United States Patent
Tsuyuki et al.

(10) Patent No.: US 9,594,447 B2
(45) Date of Patent: Mar. 14, 2017

(54) DISPLAY DEVICE AND COMPUTER READABLE RECORDING MEDIUM STORED A PROGRAM

(71) Applicant: FUJITSU LIMITED, Kawasaki-shi, Kanagawa (JP)

(72) Inventors: Yasuhiro Tsuyuki, Numazu (JP); Shigeki Moride, Zushi (JP)

(73) Assignee: FUJITSU LIMITED, Kawasaki (JP)

( * ) Notice: Subject to any disclaimer, the term of this patent is extended or adjusted under 35 U.S.C. 154(b) by 75 days.

(21) Appl. No.: 14/634,194

(22) Filed: Feb. 27, 2015

(65) Prior Publication Data

US 2015/0169100 A1    Jun. 18, 2015

Related U.S. Application Data

(63) Continuation of application No. PCT/JP2012/071977, filed on Aug. 30, 2012.

(51) Int. Cl.
*G06F 3/045* (2006.01)
*G06F 3/041* (2006.01)
(Continued)

(52) U.S. Cl.
CPC ............ *G06F 3/041* (2013.01); *G06F 1/1656* (2013.01); *G06F 1/1684* (2013.01); *G06F 3/0346* (2013.01); *G06F 3/0414* (2013.01); *G06F 3/0483* (2013.01); *G06F 3/0489* (2013.01); *G06F 11/3044* (2013.01); *G01L 1/225* (2013.01); *G06F 1/1618* (2013.01); *G06F 1/1641* (2013.01); *G06F 1/1652* (2013.01);
(Continued)

(58) Field of Classification Search
CPC .... G06F 1/1618; G06F 1/1641; G06F 1/1652; G06F 3/0346; G06F 3/0414; G06F 2200/1614; G06F 2203/04102; G06F 11/3044; G06F 11/3058; G01L 1/225; G09G 2320/041
See application file for complete search history.

(56) References Cited

U.S. PATENT DOCUMENTS 2,611,811 A * 9/1952 Yates ...................... G01L 1/225
324/140 R
2003/0085882 A1* 5/2003 Lu ......................... G06F 3/0414
345/173
(Continued)

FOREIGN PATENT DOCUMENTS

JP    2-230313    9/1990
JP    8-76926     3/1996
(Continued)

OTHER PUBLICATIONS

Morrison, Ralph, Instrumentation Fundamentals and Applications, John Wiley & Sons, 1st Ed. 1984, p. 19-25.*
(Continued)

*Primary Examiner* — Michael J Eurice
(74) *Attorney, Agent, or Firm* — Staas & Halsey LLP

(57) ABSTRACT

A display device includes a display unit, a strain sensor which detects strain on an opposite side against a surface in which the display unit is provided, and a control unit which controls changing of displaying content for the display unit based on a detected level of the strain detected by the strain sensor.

17 Claims, 34 Drawing Sheets

(51) Int. Cl.
  *G06F 3/0346* (2013.01)
  *G06F 11/30* (2006.01)
  *G06F 3/0489* (2013.01)
  *G06F 3/0483* (2013.01)
  *G06F 1/16* (2006.01)
  *G01L 1/22* (2006.01)

(52) U.S. Cl.
  CPC .. *G06F 11/3058* (2013.01); *G06F 2200/1614* (2013.01); *G06F 2203/04102* (2013.01); *G09G 2320/041* (2013.01)

(56) References Cited

U.S. PATENT DOCUMENTS

| | | | |
|---|---|---|---|
| 2004/0047510 A1 | 3/2004 | Kawabata | |
| 2004/0125081 A1* | 7/2004 | Hayakawa | G06F 3/04847 345/156 |
| 2004/0196265 A1* | 10/2004 | Nohr | G06F 1/1626 345/169 |
| 2004/0212602 A1* | 10/2004 | Nako | G06F 1/1616 345/173 |
| 2005/0140646 A1* | 6/2005 | Nozawa | G06F 1/1626 345/156 |
| 2005/0168579 A1* | 8/2005 | Imamura | H03K 17/9625 348/207.99 |
| 2005/0211003 A1* | 9/2005 | Yoshikuwa | G01G 3/1412 73/862.474 |
| 2007/0097103 A1 | 5/2007 | Yoshioka et al. | |
| 2007/0205997 A1 | 9/2007 | Lieshout et al. | |
| 2010/0103136 A1 | 4/2010 | Ono et al. | |
| 2010/0123686 A1* | 5/2010 | Klinghult | G06F 3/0412 345/178 |
| 2010/0164888 A1 | 7/2010 | Okumura et al. | |
| 2010/0194692 A1* | 8/2010 | Orr | G06F 3/0414 345/173 |
| 2013/0009905 A1* | 1/2013 | Castillo | G06F 3/044 345/174 |
| 2013/0082973 A1* | 4/2013 | Wurzel | G06F 3/044 345/174 |
| 2013/0083242 A1* | 4/2013 | Sirpal | G06F 3/1438 348/564 |
| 2013/0083457 A1* | 4/2013 | Wurzel | G06F 11/3044 361/679.01 |
| 2014/0029017 A1* | 1/2014 | Lee | G01B 11/24 356/601 |

FOREIGN PATENT DOCUMENTS

| | | |
|---|---|---|
| JP | 2580760 | 2/1997 |
| JP | 11-242539 | 9/1999 |
| JP | 2001-265481 | 9/2001 |
| JP | 2003-157134 | 5/2003 |
| JP | 2005-174006 | 6/2005 |
| JP | 2007-121765 | 5/2007 |
| JP | 2007-534055 | 11/2007 |
| JP | 2010-108071 | 5/2010 |
| JP | 2010-157060 | 7/2010 |
| WO | 02/15043 A1 | 2/2002 |
| WO | 2005/027089 A1 | 3/2005 |
| WO | 2005/093548 A1 | 10/2005 |

OTHER PUBLICATIONS

Thermometrics Publication, Thermistor Sensor Handbook, Thermometrics, 2nd rev. Sep. 1987, p. 22-24.*
Office Action dated Jan. 19, 2016 in corresponding Japanese Patent Application No. 2014-532646.
International Search Report for PCT/JP2012/071977 mailed Oct. 30, 2012.
Written Opinion for PCT/JP2012/071977 dated Oct. 30, 2012.

* cited by examiner

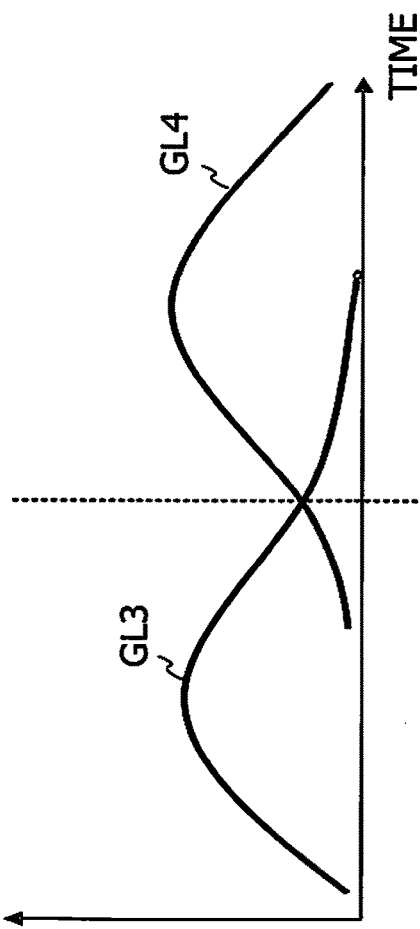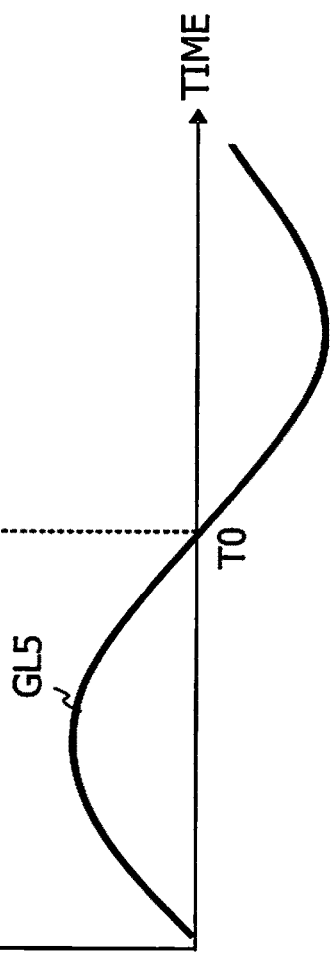
FIG.16A VOLTAGE LEVEL AFTER THE COMPENSATION
FIG.16B TURN PAGE SPEED

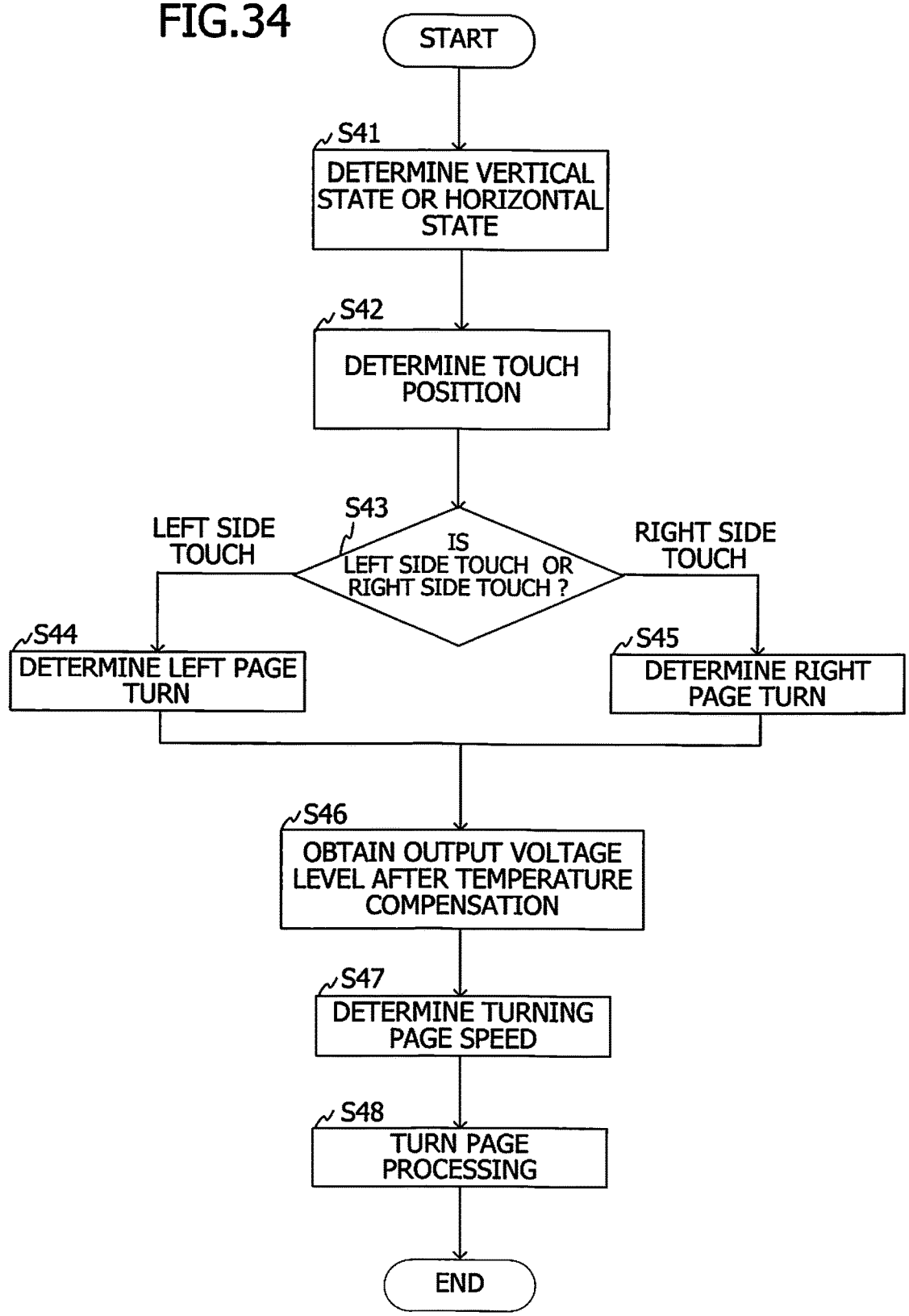

DISPLAY DEVICE AND COMPUTER READABLE RECORDING MEDIUM STORED A PROGRAM

CROSS-REFERENCE TO RELATED APPLICATION

This application is a continuation application of International Application PCT/JP2012/071977 filed on Aug. 30, 2012 and designated the U.S., the entire contents of which are incorporated herein by reference.

FIELD

The embodiments discussed herein are related to a display device and a computer readable recording medium stored program.

BACKGROUND

A display device, which displays various information such as an electronic book, a still image and video image, is proposed. As a representative such display device, a tablet-shaped computer and an electronic book are offered. Such a display device is operated in the state held by hand of the user. When the display device displays the electronic book, such a display device detects the operation of the finger of the user by a sensor, and, depending on this detecting result, controls, for example, a turn of a page of the electronic book.

One method to use a touch panel provided in a display screen is proposed as a method to detect the operation of the finger of the user. In addition, another method to use a bend detecting sensor which detects a bend power added to the display device and is provided in the display screen in the flexible device, is proposed as a method to detect the operation of the finger of this user.

CITATION LIST

Patent Documents

[patent document 1] Japanese Laid-Open Patent Publication No. 2001-265481
[patent document 2] Japanese Laid-open Patent publication No. 11-242539
[patent document 3] International Publication Pamphlet No. WO 2005/027089
[patent document 4] Japanese Patent No. 2580760
[patent document 5] Japanese Laid-open Patent publication No. 8-76926
[patent document 6] Japanese National Publication of International Patent Application No. 2007-534055
[patent document 7] Japanese Laid-open Patent publication No. 2010-157060
[patent document 8] Japanese Laid-open Patent publication No. 2007-121765
[patent document 9] International Publication Pamphlet No. WO 2002/015043
[patent document 10] Japanese Laid-open Patent publication No. 2003-157134

SUMMARY

However, in a case of using touch panel, it is easy to produce deterioration of the detecting performance because a user touches the touch panel frequently. In addition, in a case of providing the bend detecting sensor in the display screen, the display panel deteriorates because a pressure is added to the display panel based on the operation of the user.

A first aspect of a display device includes a display unit, a strain sensor which detects strain on an opposite side against a surface in which the display unit is provided, and a control unit which controls changing of displaying content for the display unit based on a detected level of the strain detected by the strain sensor.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 16A and FIG. 16B are graphical diagrams indicating the time changes of the first output voltage level Vt1 and the second output voltage level Vt2, and the changes at time of the page turning speed corresponding to the time changes of the first output voltage level Vt1 and the second output voltage level Vt2.

FIG. 34 is a diagram illustrating a flow to explain the display processing that the content display control unit 455 carries out.

DESCRIPTION OF EMBODIMENTS (Outline Explanation of the Display Device)

The outline of the display device to explain with a first embodiment, a second embodiment, a third embodiment and a fourth embodiment will be explained based on FIG. 1-FIG. 3.

Figure 1:
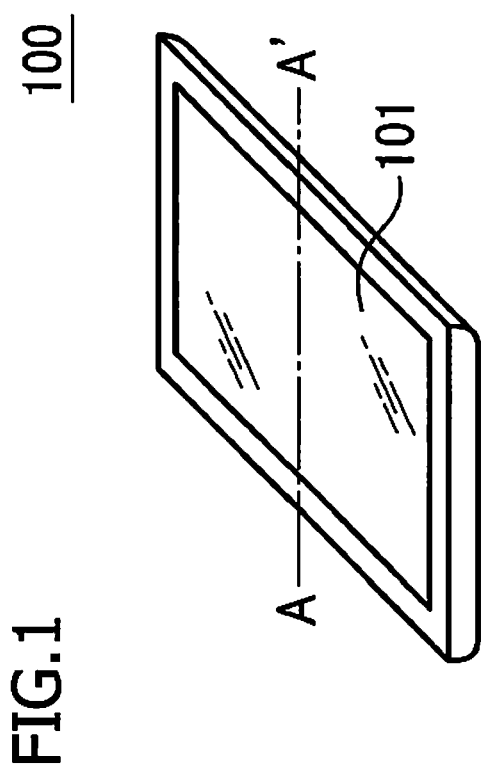
FIG. 1 is a diagram illustrated an external representation of the front side of the display device to explain with the following embodiment.

FIG. 1 is a diagram illustrated an external representation of the front side of the display device to explain with the following embodiment. FIG. 1 illustrates the front surface of the display device 100. Here, the front surface of the display device 100 means the touch panel 101 side which is provided in a display surface of the display unit, in which various images are displayed, and detects the position where a user touched, in the display device 100. The display device 100 has a rectangle-formed board-formed appearance.

For example, the size of the display device 100 is A4 size (210 mm in width×297 mm in height), or A5 size (148 mm in width×210 mm in height), or B4 size (257 mm in width×364 mm in height), or B5 size (182 mm in width×257 mm in height) in the Japanese Industrial Standards. In this way, the display device 100 is a portable device. In the explanation of the following figures, same elements are marked by same marks appropriately and the explanation of the elements which did once is omitted.

Figure 2:
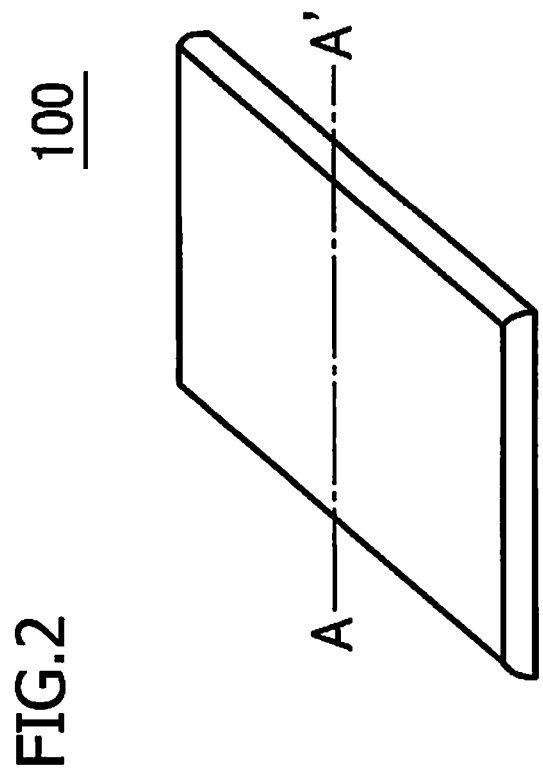
FIG. 2 is a diagram illustrated an external representation of the back side of the display device to explain with the following embodiment.

FIG. 2 is a diagram illustrated an external representation of the back side of the display device to explain with the following embodiment. FIG. 2 illustrates the back side of the display device 100. Here, the back side of the display device 100 means an opposite surface of the touch panel 101 (referring to FIG. 1) in the display device 100.

Figure 3:
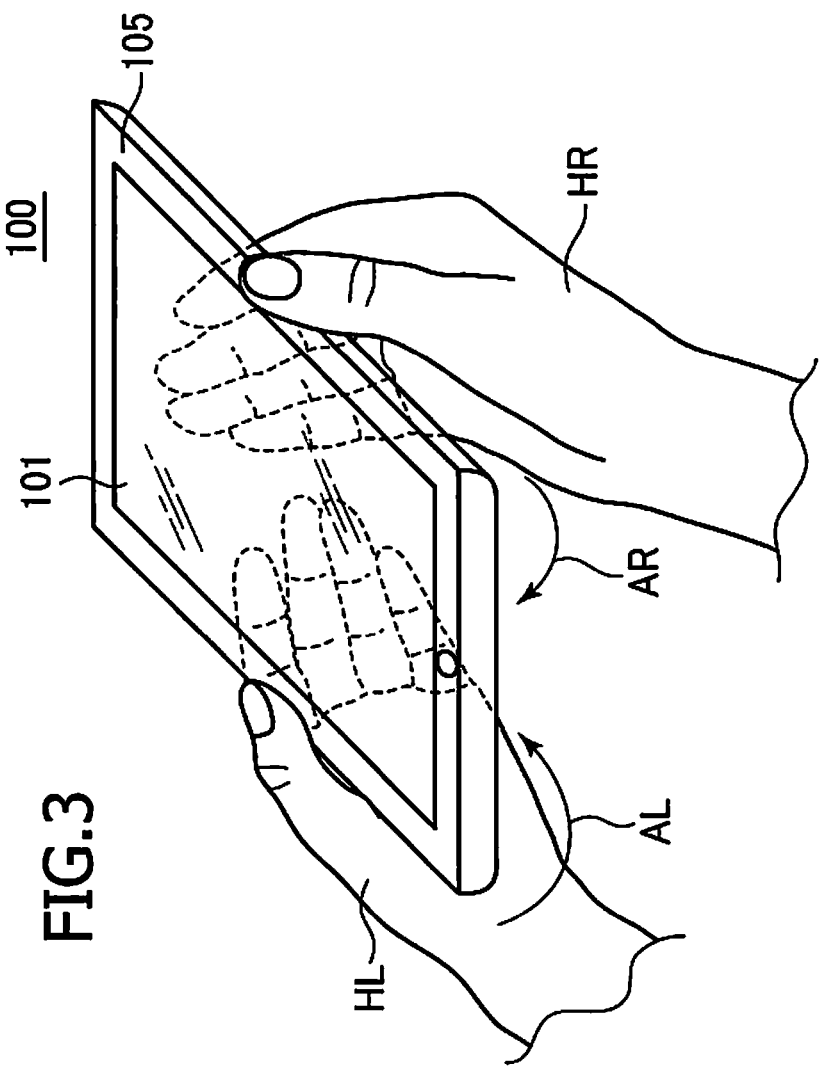
FIG. 3 is a diagram schematically illustrating an example that the user holds the display device 100 with both hands.

FIG. 3 is a diagram schematically illustrating an example that the user holds the display device 100 with both hands. Here, the user holds right and left edges of a housing 105 of the display device 100 using a left hand HL and a right hand HR. In this holding state, the user hangs a thumb of the right hand HR to the front surface of the housing 105 and supports the back side of the housing 105 from the bottom by using other fingers. Similarly in this holding state, the user hangs a thumb of the left hand HL to the front surface of the housing 105 and supports the back side of the housing 105 from the bottom by using other fingers. In this time, the thumb of the right hand HR and the thumb of left hand HL do not contact with the touch panel 101. Material of housing 105 of the display device 100 is the rigid material which is not flexible. This material is metal and hard plastic and is aluminum in the case of metal, for example. In the following embodiment, the material of housing is rigid material. In addition, an explanation about arrows AL, AR, will be explained later.

Figure 4:
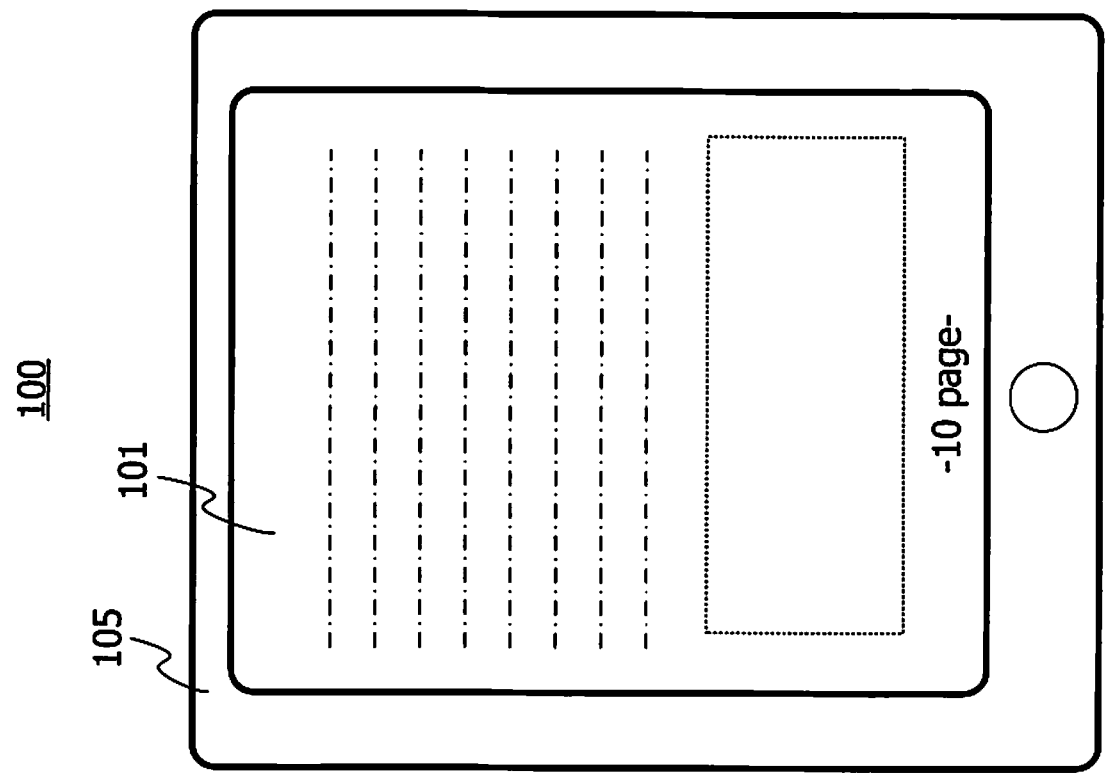
FIG. 4 is a diagram schematically illustrating one page of the electronic book in which the display device 100 displays to the touch panel 101.

FIG. 4 is a diagram schematically illustrating one page of the electronic book in which the display device 100 displays to the touch panel 101. The dash lines in FIG. 4 indicate character string, and a part surrounded by the dotted line indicates a figure, for example. The character string "-10 page-" in FIG. 4 indicates the pages of a displayed page.

Figure 5:
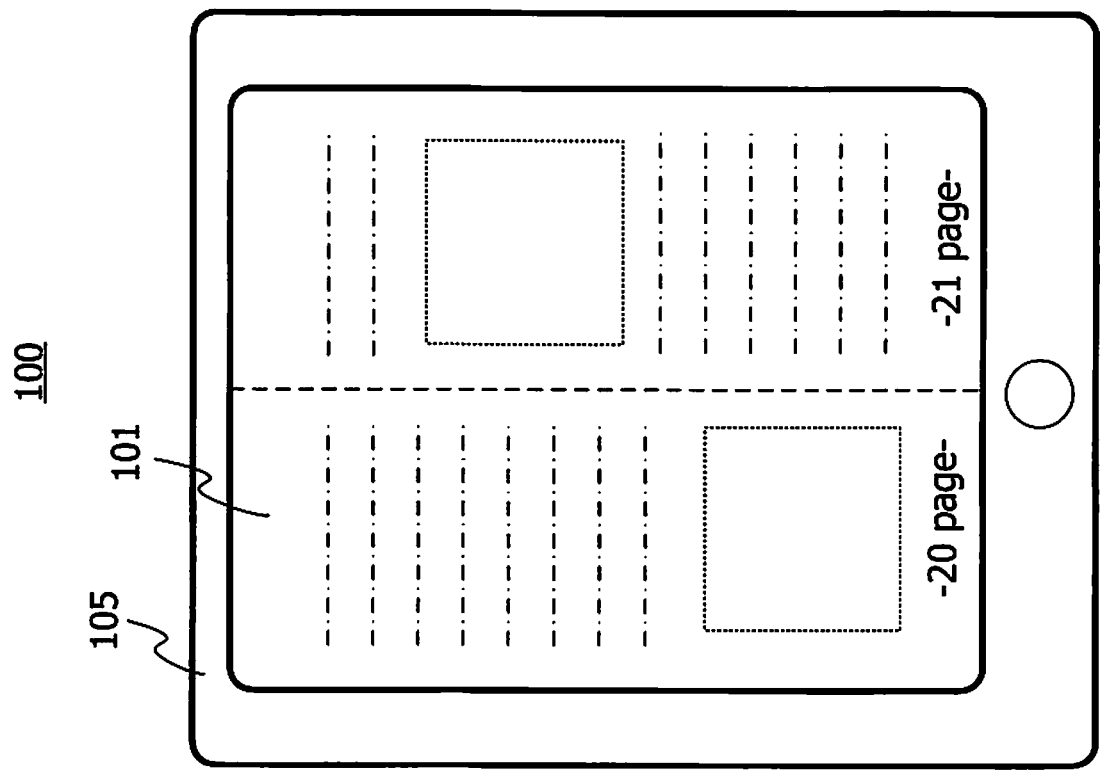
FIG. 5 is a diagram schematically illustrating two pages of the electronic book in which the display device 100 displays to the touch panel 101.

FIG. 5 is a diagram schematically illustrating two pages of the electronic book in which the display device 100 displays to the touch panel 101. The two Page of this electronic book is a two facing page. The character string "-20 page-" and the character string "-21 page-" in FIG. 5 indicate the page number of a displayed page. The display device 100, which has the display unit (not illustrated in FIG. 1-FIG. 5) provided under the touch panel 101, has a strain sensor which detects strain on the opposite side against the surface in which the display unit is provided. This strain sensor is provided in the bottom of the housing 105, and detects the strain of the housing 105 which is occurred by an operation of the user to the bottom face and outputs a detected level. A control unit (computer) in the display device 100 controls changing of displaying content for the display unit based on a detected level of the strain by the strain sensor.

Further, the display device 100 has a swing detecting device which detects the swing of the display device 100 and compensates the detected level of the strain sensor, using a detected level of the strain sensor when detecting that the swing of the display device 100 is within a predetermined swing range. For example, the control unit in the display device 100 determines, based on a detecting result of the swing detecting sensor, whether or not the swing of the display device 100 is within a predetermined range. When the control unit determines that the swing of the display device 100 is within a predetermined range, the control unit stores the detected level of the strain sensor in the storing unit. And the control unit in the display device 100 compensates the detected level of the strain sensor based on the detected level in the storing unit when displaying the content and controls changing of display content which is displayed for the display unit, based on a detected level after the compensation.

First Embodiment

Figure 6:
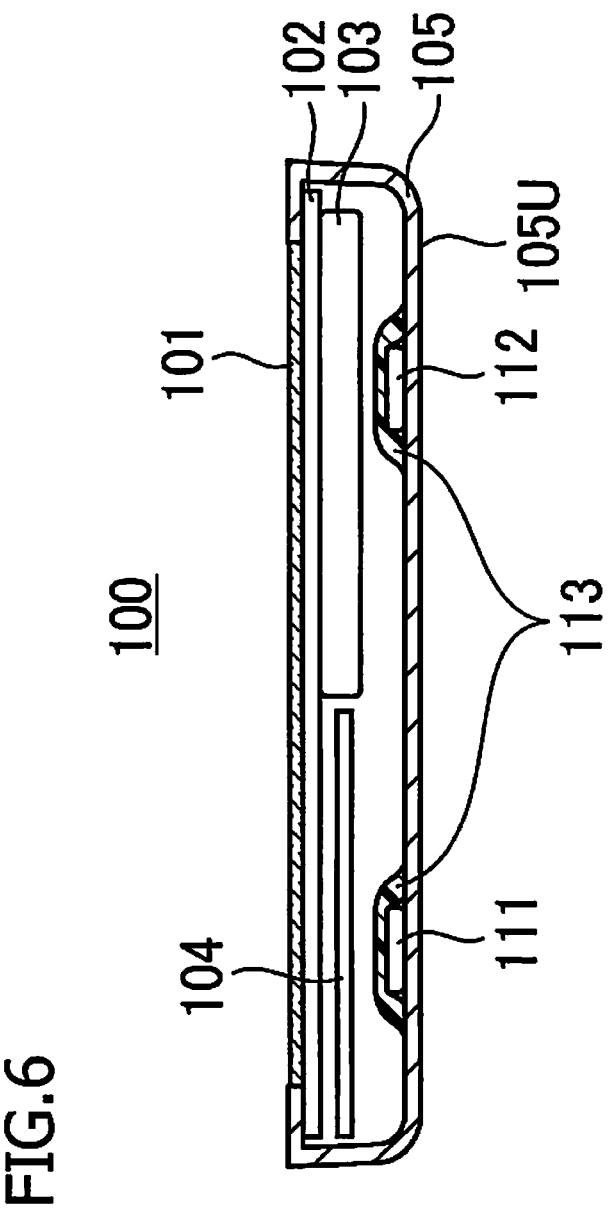
FIG. 6 is a diagram illustrating a cross section of the display device 100 according to the first embodiment.

FIG. 6 is a diagram illustrating a cross section of the display device 100 according to the first embodiment. This cross section is A-A' line cross section in FIG. 1 and FIG. 2. Here, an upper part in FIG. 6 is the surface of the display device 100, and a bottom part in FIG. 6 is the back side of the display device 100. The display device 100 has a touch panel 101, a display panel 102, a battery 103, a printed circuit board 104, a housing 105, a first strain sensor 111 and a second strain sensor 112.

The touch panel 101 has a transparent plate made by a transparent glasswork or a synthetic resin and detects the operation of the finger of the user for this transparence plate. The operation of the finger is described with operation appropriately as follows. The display panel 102 is a panel displaying various images, and is, for example, a liquid crystal display panel. The Battery 103 supplies electricity to the touch panel 101, the display panel 102, and various electronic parts of the printed circuit board 104.

The printed circuit board 104 is a board equipped with various electronic parts. The housing 105 of the display device 100 is a high-stiffness housing, and, for example, is a housing made by aluminum. The first strain sensor 111 and the second strain sensor 112 are devices which detects the strain (distortion) power that the user added for the housing 105 of the display device 100. The first strain sensor 111 and the second strain sensor 112 are fixed to a bottom part 105 U of the housing 105, by, for example, an adhesive 113 of epoxy based resin. The bottom part 105 U of the housing 105 is called as a bottom plate of the housing 105.

Figure 7:
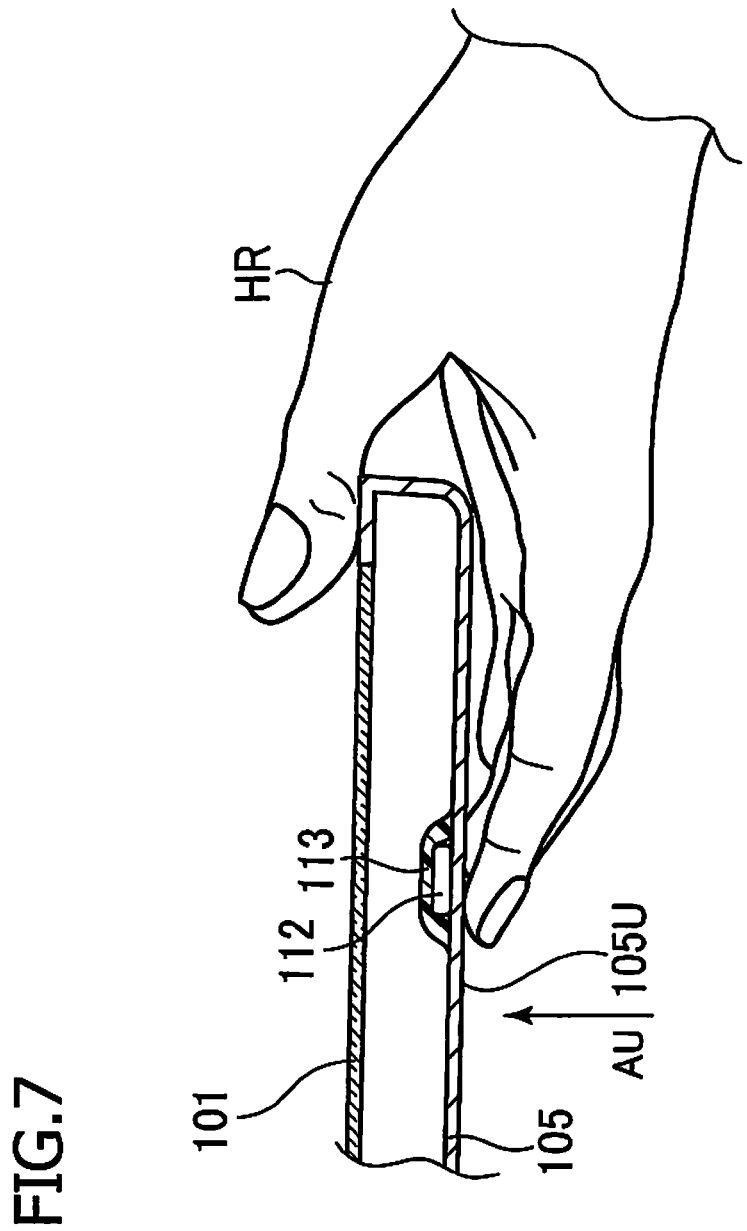
FIG. 7 is a diagram illustrating a cross section of a part of the display device 100 in the state that the user holds the display device 100.

FIG. 7 is a diagram illustrating a cross section of a part of the display device 100 in the state that the user holds the display device 100. The cross section diagram in FIG. 7, indicates a part of the display device 100 which is held by the right hand in FIG. 3. In FIG. 7, the display panel 102, the battery 103, the printed circuit board 104, and the first strain sensor 111, which are illustrated by FIG. 6, are omitted. In addition, an explanation about the arrow AU will be explained later.

Figure 8:
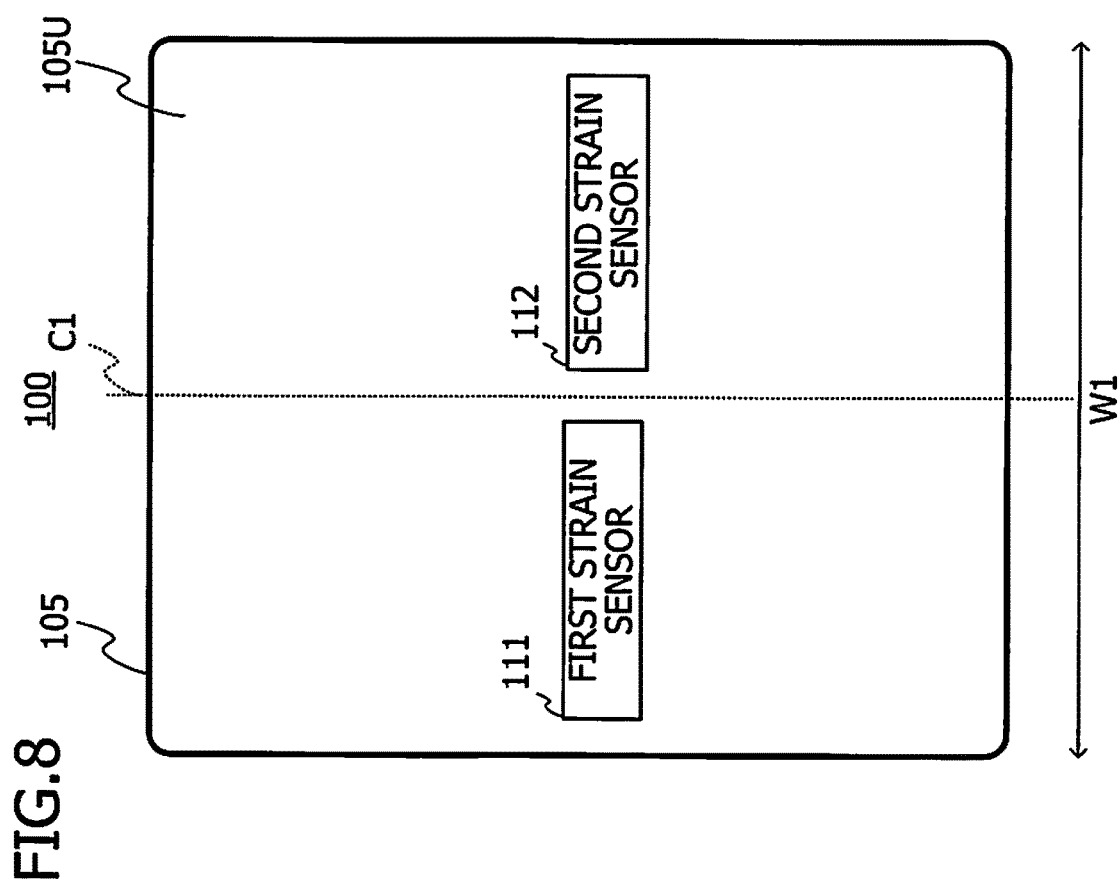
FIG. 8 is a diagram schematically illustrating a placement state of the first strain sensor 111 and the second strain sensor 112 in the bottom part 105 U of the housing 105.

FIG. 8 is a diagram schematically illustrating a placement state of the first strain sensor 111 and the second strain sensor 112 in the bottom part 105 U of the housing 105. The display device 100 has the first strain sensor 111 and the second strain sensor 112 are provided in the bottom part 105 U of the rectangular housing 105 which is opposite to the display panel 102 of the display device 100.

In FIG. 8, the dotted line represented by a mark C1 indicates the center of width W1 of the rectangular narrow side. The first strain sensor 111 is located (provided) in the left side area of the bottom part 105 U, on the basis of the center line C1 of the display device 100. The second strain sensor 112 is located in the right side area of the bottom part 105 U, on the basis of the center line C1 of the display device 100. The first strain sensor 111 and the second strain sensor 112 are located symmetrically on the basis of center line C1.

When the user holds the display device 100 in the state represented by FIG. 3, either finger except the thumb of the left hand of the user touches the left side area of a back side (referring to FIG. 2 for the back face), which is the bottom part 105U of the housing 105, on the basis of the center line C1 in FIG. 8. And, in the above holding state, either finger except the thumb of the right hand of the user touches the right side area of the bottom part 105 U which is the back side of housing 105, on the basis of the center line C1 in FIG. 8.

The first strain sensor 111 detects strain (distortion) of the left area of the bottom part 105 U of the housing 105 on the basis of the center line C1 of the housing 105 and outputs a first detect level (below, called as a first output level). The second strain sensor 112 detects strain of the right area of the bottom part 105 U of the housing 105 on the basis of center line C1 of the housing 105 and outputs a second detect level (below, called as a second output level). The distortion (strain), of which the first strain sensor 111 and the second strain sensor 112 detect, is a strain of the housing 105 to occur depending on the operation that the user performs for the bottom part 105 U of the housing 105.

Here, a changing process of the display content on the display device 100 by the operation of the user will be explained with reference to FIG. 3-FIG. 5, FIG. 7, and FIG. 8. In a state that the user holds the display device 100 as illustrated in FIG. 3, when the user performs operation to turn a wrist of the right hand HR to the arrow AR direction, the power of the arrow AU direction is added by either finger except the thumb of right hand HR, as illustrated in FIG. 7. In other words, the bottom part 105 U of the right area from the center line C1 in FIG. 8 is slightly warped by the power added by either finger except the thumb of right hand HR. However, the housing does not bend, because the housing 105 is rigid material. An operation to turn a wrist of the right hand HR to the arrow AR direction is described with a right twist operation appropriately.

Then, the second strain sensor 112 in the display device 100 detects this strain, and, the display device 100 carries out processing to, for example, roll up the page of the electronic book on the next page and change the display content of the electronic book. In the example in FIG. 4, the display device 100 roll up a page number in the direction where the page number increases, such as turning from a page 10 to a page 11, a page 12, namely, turn to a N page (N is integer), a N+1 page, and change the display content of the electronic book. In the example of FIG. 5, the display device 100 rolls up a page number in the direction where the pages increase which turns to a spread N page and N+1 page, a spread N+2 page and N+3 page, such as turning from a spread page 20 and page 21, a spread page 22 and page 23, a spread page 24 and page 25, and change the display content of the electronic book. When the right twist operation is carried out, the change process of the display content of the electronic book, in which the display device 100 carries out, is described with a right page turn appropriately.

On the other hand, in a state that the user holds the display device 100 as illustrated in FIG. 3, when the user performs operation to turn a wrist of the left hand HL to the arrow AL direction, the bottom part 105 U of the left area from the center line C1 in FIG. 8 is slightly warped by the power added by either finger except the thumb of left hand HL. An operation to turn a wrist of the left hand HL to the arrow AL direction is described with a left twist operation appropriately.

Then, the first strain sensor 111 in the display device 100 detects this strain and the display device 100, for example, rolls up the page of the electronic book to the former page and carry out the processing to change the display content of the electronic book. In the example in FIG. 4, the display device 100 rolls up a page in the direction where the page decreases from the spread N page to N−1 page, . . . , such as from a page 10 to a page 9, a page 8, and changes the display content of the electronic book. In the example in FIG. 5, the display device 100 rolls up in the direction where the page decreases from the spread N page and N+1 page to a spread N−2 page and N−1 page such as from a spread page 20 and page 21 to a spread page 18 and page 19, a spread page 16 and page 17 and changes the display content of the electronic book. When the left twist operation is carried out, the change process of the display content of the electronic book, which display device 100 carries out, is described with left page turn up appropriately.

In addition, when the display device 100 displays the electronic book in which the content of each page display of the writing from top to bottom character string, the display device 100 performs the change process of display the content of the electronic book as follows. The electronic book of this writing from top to bottom character string is appeared in a Japanese book well. Namely, when the left twist operation is carried out, the display device 100 rolls up a page in the direction where pages increase and changes the display content of the electronic book. In addition, when the right twist operation is carried out, the display device 100 rolls up a page in the direction where pages decrease and changes the display content of the electronic book.

As described above, it is possible that the user turns the page of the electronic book while holding the display device 100 with both hands, and the user does not have to largely move a finger for page turning up.

(Hardware Block)

Figure 9:
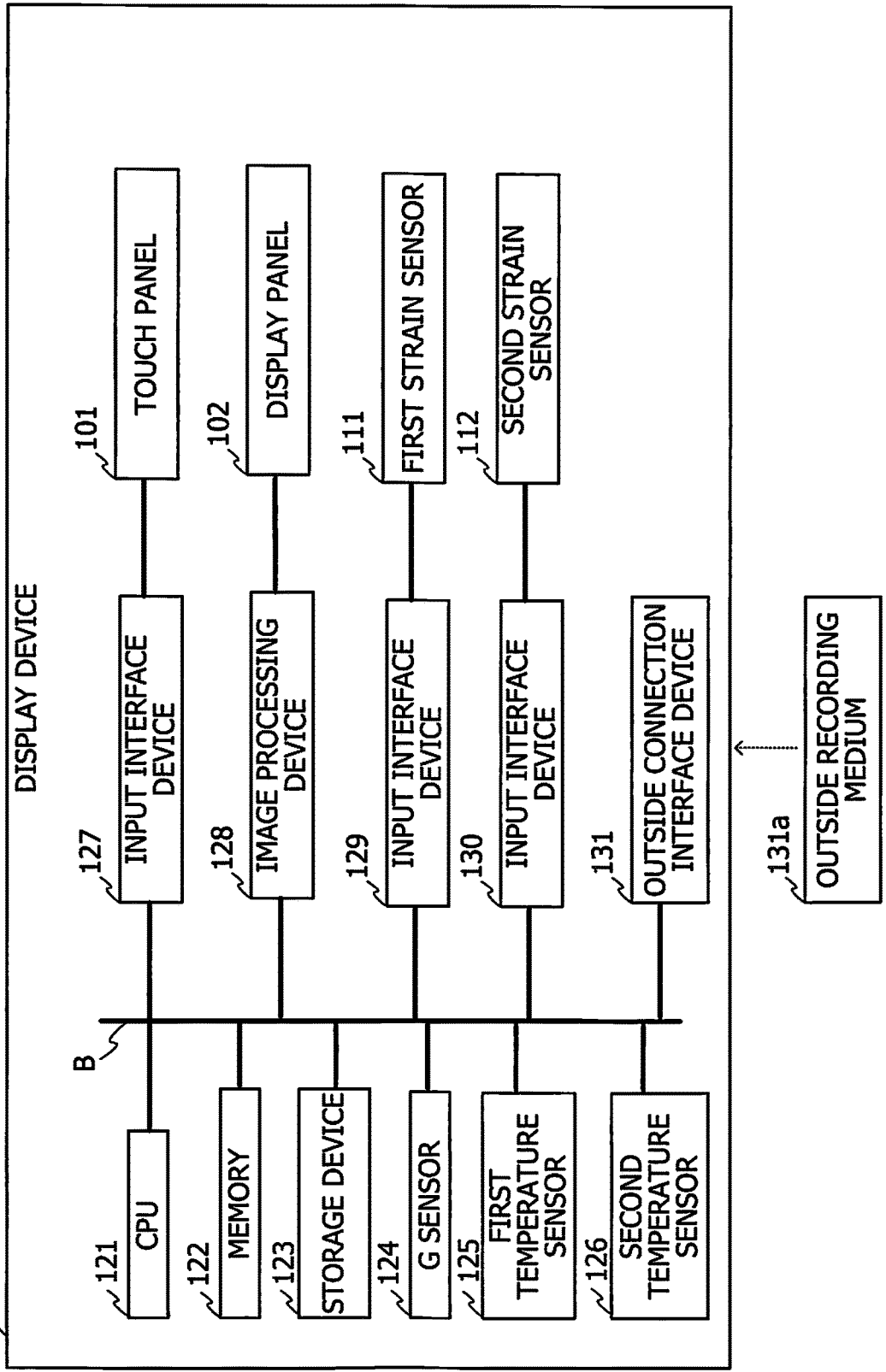
FIG. 9 is a diagram illustrating an example of the hardware block in the display device 100 according to the first embodiment.

FIG. 9 is a diagram illustrating an example of the hardware block in the display device 100 according to the first embodiment. In FIG. 9, the explanation will be a tablet computer for an example.

The display device 100 has a CPU (Central Processing Unit) 121, a memory 122, a storage device 123, a G (Gyro) sensor 124, a first temperature sensor 125 and a second temperature sensor 126. The display device 100 further has an input interface device 127 for touch panel 101, an image processing device 128, an input interface device 129 for the first strain sensor 111, an input interface device 130 for the second strain sensor 112, and an outside connection interface device 131. The display device 100 further has a touch panel 101, a display panel 102, the first strain sensor 111 and the second strain sensor 112. Each of hardware components is connected by a bus B. In addition, the display device 100 has wireless communication equipment as needed. The display device 100 acquires a content for display and a program as later described through the outside connection interface device 131 and the wireless communication equipment.

The CPU 121 is an arithmetic processor (also called as control unit, computer) which controls the whole of the display device 100. The memory 122 stores data which is processed in information processing by the CPU 121 and various programs, temporarily. For example, the memory 122 is RAM (Random Access Memory). The memory 122 is an example of the memory unit to store a first output level of the first strain sensor 111, and a second output level of the second strain sensor 112.

The storage device 123, for example, is a magnetic storage device such as a hard disk drive (HDD: Hard Disk Drive) and an nonvolatile memory and stores a program to perform the program and various data.

The G sensor 124 is called the acceleration sensor and detects acceleration added to the display device 100 and outputs a detected level of the acceleration. The detected level of the G sensor 124 is used for the processing which determines whether the swinging state of the display device 100 is within a predetermined swinging range, and the detecting how the user holds the display device 100, for example. In addition, the details will be described later.

The first temperature sensor 125 is provided near the first strain sensor 111, and detects temperature of the first strain sensor 111. The temperature that the first temperature sensor 125 detected is used to compensate an output level of the first strain sensor 111. The second temperature sensor 126 is provided near the second strain sensor 112, and detects temperature of the second strain sensor 112. The temperature that the second temperature sensor 126 detected is used to compensate an output level of the second strain sensor 112.

The touch panel 101 is provided on the display panel 102, and works as the device of which the user operates the display device 100 by touching (called as the touch) at a desired position of the display 102. The touch panel 101 outputs the position where the user touches the touch panel 101 and a level of the pressure that is added when touched, as analog data. In addition, an operation system of the touch panel includes an electrostatic induction system and a resistance film system, for example.

Figure 12:
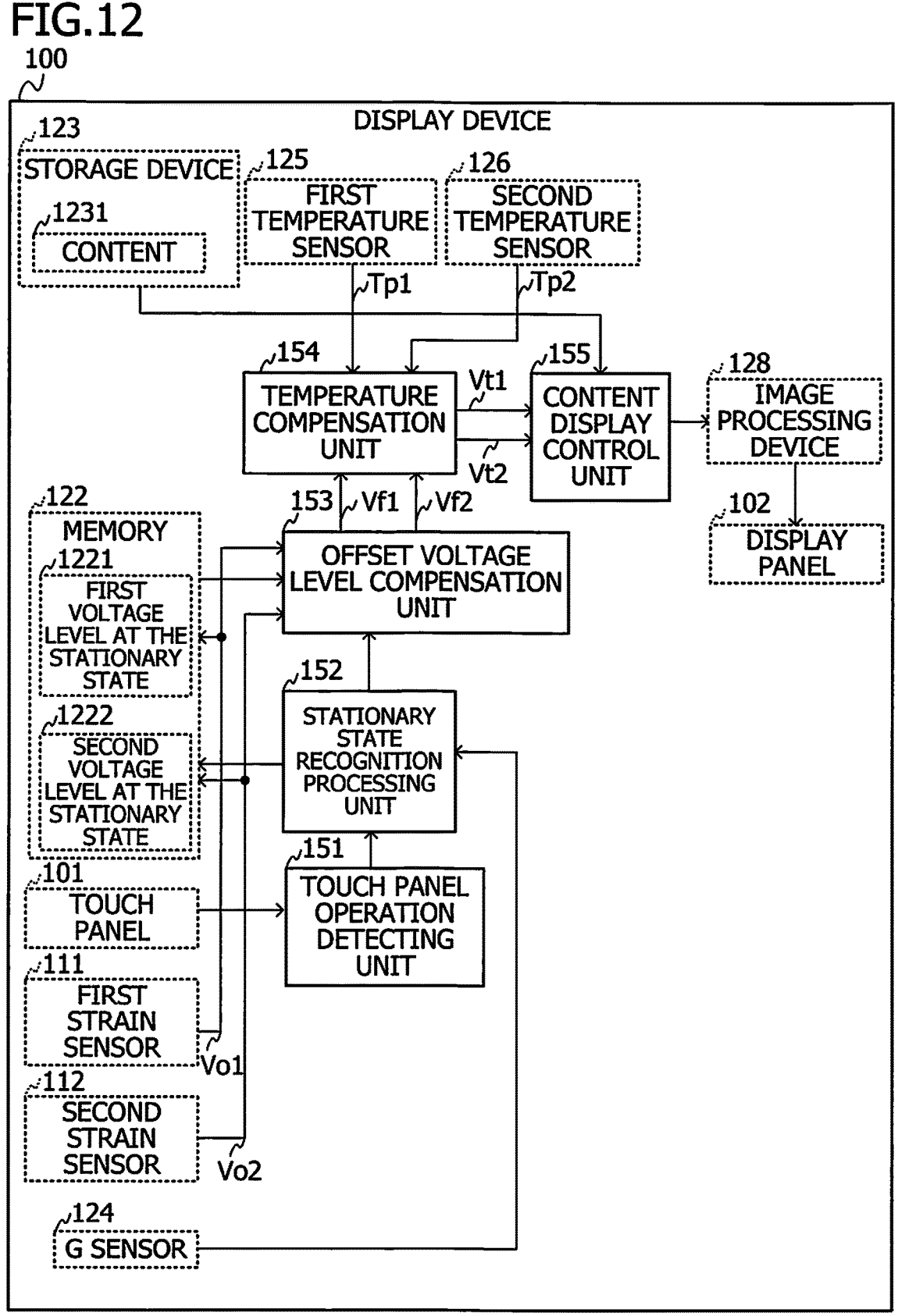
FIG. 12 is a diagram illustrating an example of a block diagram of software modules in the display device 100 according to the first embodiment.

The input interface device 127 has an interface function with various programs to explain in FIG. 12 and the touch panel 101. The input interface device 127 converts analog-digital of an output level of the touch panel 101 and outputs it to the CPU 121, for example.

The display panel 102 is a panel displaying various images. For example, the display panel 102 is a liquid crystal panel or organic electroluminescence panel. Various images are a still image, and a moving picture, for example. The still image includes, for example, the content of each page in the electronic book. Besides, various images include a user interface image for operation.

The image processing device 128 drives the display element in the display panel 102 and controls processing to display an image to the display panel 102.

The input interface device 129 has an interface function with various programs to explain in FIG. 12 and the first strain sensor 111. The input interface device 129 converts analog-digital of an output level of the first strain sensor 111 and outputs it to the CPU 121, for example.

The input interface device 130 has an interface function with various programs to explain in FIG. 12 and the second strain sensor 112. The input interface device 130 converts analog-digital of an output level of the second strain sensor 112 and outputs it to the CPU 121, for example.

The outside connection interface device 131 provides a connection interface with an outside recording medium 131a. For example, the recording medium 131a is a portability recording medium such as the USB (Universal Serial Bus) memory.

(Strain Sensor)

Figure 10:
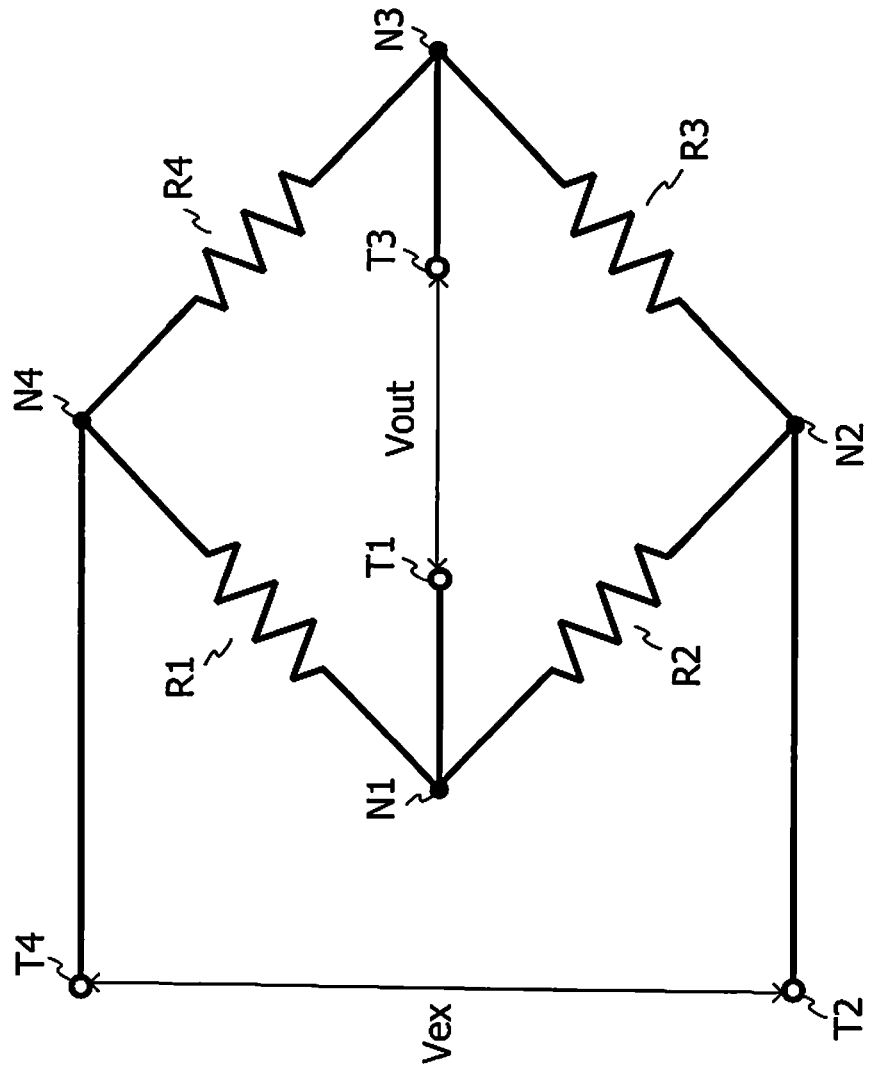
FIG. 10 is a diagram illustrating an example of circuit in the first strain sensor 111 and the second strain sensor 112 depicted by FIG. 9.

FIG. 10 is a diagram illustrating an example of circuit in the first strain sensor 111 and the second strain sensor 112 depicted by FIG. 9. In FIG. 10, each of the first strain sensor 111 and the second strain sensor 112 are constituted by a bridge circuit HBR1. The bridge circuit HBR1 is a Wheatstone bridge circuit having four resistance R1-resistance R4. One end of the first resistance R1 is connected to one end of the second resistance R2. And a connection point with the first resistance R1 and the second resistance R2 is represented by a reference sign N1. Another end of the second resistance R2 is connected to one end of third resistance R3. And a connection point with the second resistance R2 and the third resistance R3 is represented by a reference sign N2. Another end of the third resistance R3 is connected to one end of the fourth resistance R4. And a connection point with the third resistance R3 and the fourth resistance R4 is represented by a reference sign N3. Another end of the fourth resistance R4 is connected to another end of the first resistance R1. And a connection point with the fourth resistance R4 and the first resistance R1 is represented by a reference sign N4.

In the first resistance R1-the fourth resistance R4 in the bridge circuit HBR1, one or more resistance is the strain resistance element in which a resistance level changes, based on quantity of strain. And, in the first resistance R1-the fourth resistance R4 in the bridge circuit HBR1, the resistance except this strain resistance element is simple electrical resistance to have a constant resistance level.

The bridge circuit HBR1 receives the supply of power supply voltage Vex through a terminal T4 of the connection point N4 and a terminal T2 of the connection point N2. Low voltage (for example, grand electric potential) is supplied to the terminal T2, and high voltage is supplied to the terminal T4.

The bridge circuit HBR1 outputs a potential difference between the terminal T1 of the connection point N1 and the terminal T3 of the connection point N3, as voltage Vout. The terminal T3 is a positive terminal, and the terminal T1 is a negative terminal. This output voltage Vout is an output level of the strain sensor having the bridge circuit HBR1.

Here, the output voltage Vout is expressed by a following expression 1. In addition, in the expression 1, "R1"-"R4" indicate a resistance level of the first resistance R1-the fourth resistor R4.

$$Vout=((R3/(R3+R4))-(R2/(R1+R2)))\times Vex \quad \text{(expression 1)}$$

In addition, when a strain is not added to the strain gauge (strain detecting element), the resistance level of the strain gauge is equivalent to a resistance level of a simple electrical resistance element.

Figure 11:
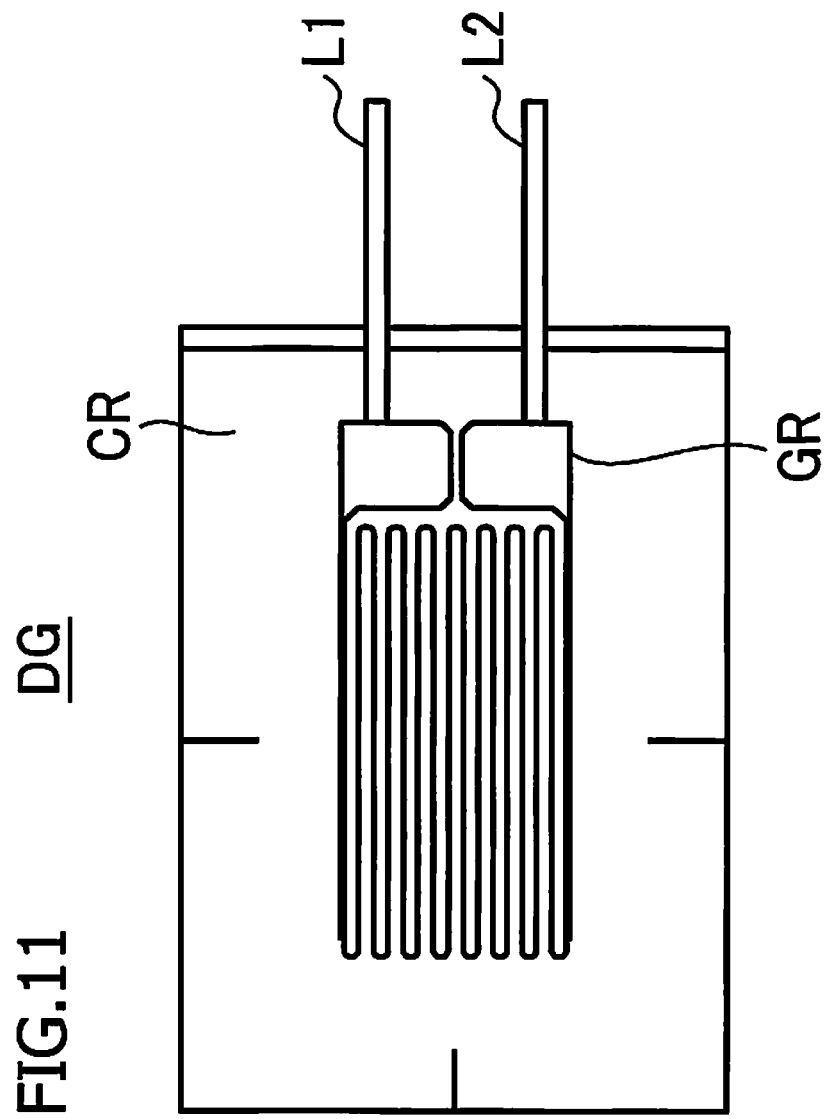
FIG. 11 is a diagram explaining a strain resistance element. The strain resistance element is also called the strain gauge.

FIG. 11 is a diagram explaining a strain resistance element. The strain resistance element is also called the strain gauge. The strain gauge DG has metal gauge GR of the zigzag shape on an insulator CR which is called the carrier. This metal gauge GR has a first gauge lead L1 and a second gauge lead L2. When the metal gauge GR expands and contracts, a resistance level of this gauge GR changes. In other words, the strain gauge DG changes a resistance level, based on quantity of the strain.

In the first resistance R1-the fourth resistance R4 in FIG. 10, it is assumed that the third resistance R3 is the strain gauge DG. When the third resistance R3 is the strain gauge DG, the first gauge lead L1 is connected to another end of second resistance R2, for example. This connection point is the connection point N2 in FIG. 10. On the other hand, the second gauge lead L2 is connected to one end of the fourth resistance R4. This connection point is the connection point N3 in FIG. 11.

In the strain gauge DG, when the metal gauge GR expands and contracts, a resistance level of this gauge GR changes, and, as a result, the output voltage Vout of the bridge circuit HBR1 in FIG. 10 changes. The first strain sensor 111 and the second strain sensor 112 detect the quantity of the strain that the user added for the first strain sensor 111 and the second strain sensor 112 by a change of this output voltage Vout.

Here, by constituted either one or more resistance in the first resistance R1-the fourth resistance in the strain gauge and by setting resistance level of the resistances except it, the output voltage of bridge circuit HBR1 of FIG. 10 increases, as a strain added to the strain gauge increases. In other words, the first strain sensor 111 raises the output voltage as the strain added to this strain sensor increases. The second strain sensor 112 raises the output voltage, as a strain added to this strain sensor increases.

(Software Module)

FIG. 12 is a diagram illustrating an example of a block diagram of software modules in the display device 100 according to the first embodiment. In FIG. 12, the touch panel 101, the display panel 102, the first strain sensor 111, the second strain sensor 112, the memory 122, the storage device 123, and the G sensor 124, which are the hardware components explained by FIG. 9, are represented by a dotted line. Similarly, the first temperature sensor 125, the second temperature sensor 126, and the image processing device 128, are represented by a dotted line. In addition, the input interface device 127, the input interface device 129, the input interface device 130, and the outside connection interface device 131 are omitted illustration because it is unnecessary in the explanation of FIG. 12.

A touch panel operation detecting unit 151 detects the touch position, a touch time and a level of the pressure that is added when the user touched, based on the output result that the touch panel 101 outputs when the user touched the touch panel 101 with fingers.

A stationary state recognition processing unit 152 determines that whether or not the swinging of the display device 100 is within a predetermined swing range, that is, the display device 100 is a stationary state, based on a detecting result of the touch panel 101 which functions as a stationary state sensing device, and the G sensor 124 which functions as the stationary state sensing device. Specifically, a stationary state recognition processing unit 152 determines that whether or not a detected level of the acceleration, of which the G sensor 124 outputs during a predetermined time, is equal or less than a predetermined detection level and determines that whether or not a pressure level, which indicates the pressure added to the touch panel form the touch panel 101, is equal or less than a predetermined pressure level. When the detected level is equal or less than the predetermined detection level and the pressure level is equal or less than the predetermined pressure level, the stationary state recognition processing unit 152 determines that the display device 100 is a stationary state.

And the stationary state recognition processing unit 152 carries out processing to store the output voltage levels of the first strain sensor 111 and the second strain sensor 112 in the memory 122 when determined that the swing of the display device 100 is within a predetermined swing range. The output voltage level of the first strain sensor 111 and the second strain sensor 112 in this stationary state, are described as voltage level at stationary state time, appropriately. That is, the output level of the first strain sensor 111 and the output level of the second strain sensor 112, of which the stationary state recognition processing unit 152 stores in the memory 122, are the first voltage level at the stationary state 1221 and the second voltage level at the stationary state 1222, each.

An offset voltage level compensation unit 153 compensates the first output voltage level Vo1 of the first strain sensor 111 based on the first voltage level at the stationary state 1221 in the memory 122 and outputs the first output voltage level Vf1 to a temperature compensation unit 154. The compensation, for example, is to calculate a difference between the first voltage level at the stationary state 1221 and the first output voltage level Vo1. The first output voltage level Vf1 is the first output voltage level Vo1 after the offset compensation. Similarly the offset voltage level compensation unit 153 compensates the second output voltage level Vo1 of the second strain sensor 112 based on the second voltage level at the stationary state 1222 in the memory 122 and outputs the second output voltage level Vf2 to the temperature compensation unit 154. The compensation, for example, is to calculate a difference between the second voltage level at the stationary state 1222 and the second output voltage level Vo1. The second output voltage level Vf2 is the second output voltage level Vo1 after the offset compensation.

The temperature compensation unit 154 compensates the first output voltage level Vf1, of which the offset voltage level compensation unit 153 outputs, based on a temperature correction factor corresponding to a temperature Tp1 of which the first temperature sensor 125 outputs. And the temperature compensation unit 154 outputs the first output voltage level Vt1 to a content display control unit 155. The first output voltage level Vt1 is a first output voltage level Vf1 after the temperature compensation.

The temperature compensation unit 154 compensates the second output voltage level Vf2, of which the offset voltage level compensation unit 153 outputs, based on a temperature correction factor corresponding to a temperature Tp2 of which the second temperature sensor 126 outputs. And the temperature compensation unit 154 outputs the second output voltage level Vt2 to the content display control unit 155. The second output voltage level Vt2 is a second output voltage level Vf2 after the temperature compensation.

The content display control unit 155, based on the operation of the user, reads the content 1231 in the storage device 123, and outputs it to the display panel 102 through the image processing device 128. The content is electronic data having information for the display, and is called the content data. For example, the content 1231 is electronic book data and moving picture data. In the case of the electronic book data, the content display control unit 155 displays the content 1231, which is read, to the display panel 102 through the image processing device 128, for example, as illustrated by FIG. 4. In addition, in the case of the moving picture, the content display control unit 155 displays the content 1231 which is read to the display device through the image processing device 128, as the moving picture.

For example, the content display control unit 155 controls changing of the display content to the first display state or to the second display state which is different from the first display state, based on a difference level between the first output voltage level Vt1 and the second output voltage level Vt2, for example.

Further, the content display control unit 155 determines changing speed in the changing control based on an absolute level of the difference voltage level and carries out the scroll control based on this scroll speed which is determined.

Here, the changing control means a display process which turns up the page which is the display content of electronic book data, when the content is electronic book data, and the page of the electronic book is displayed. Besides, the changing control means the display process which fast forwards or rewinds the moving picture when the content is the moving picture, and the moving picture is displayed. Besides, the changing control means display process which moves a Web page to an upper direction or a lower direction when the content is described, for example, in HTML (HyperText Markup Language) format, and a the Web page is displayed. In addition, in the case of the above Web page, the changing control means display process which moves a displayed Web page to a left direction or a right direction.

In addition, the content display control unit 155, when displaying the page of the electronic book, carries out the display process which turns the page in the direction where the page number increases, as the display process of changing control which changes the display content to the first display state, and the display process which turns the page where the page number decreases, as the display process of changing control which changes the display content to the second display state. Besides, the content display control unit 155, when displaying the moving picture, carries out the display process of the fast forwarding of the moving picture, as the display process of changing control which changes the display content to the first display state, and the display process of the rewind of the moving picture, as the display process of changing control which changes the display content to the second display state. Besides, the content display control unit 155, when displaying the Web page, carries out the display process which scrolls the page the Web page to the upper direction or the left direction, as the display process of changing control which changes the display content to the first display state. And the content display control unit 155, when displaying the Web page, carries out the display process which scrolls the page the Web page to the lower direction or the right direction, as the display process of changing control which changes the display content to the second display state.

In addition, the changing speed means a page turn speed when the content display control unit 155 displays the page of the electronic book. The page turn speed means the number of pages which is turned in a unit time. There are many pages which are turned in a unit time in proportional that this turn speed is fast, and are few pages which are turned in a unit time in proportional that this turn speed is small. Besides, the changing speed means the speed of the fast-forwarding and the speed of the rewind, when the content display control unit 155 displays the moving picture. Besides, the changing speed means the movement speed of the top, bottom, right and left directions, when the content display control unit 155 displays the Web page.

The touch panel operation detecting unit 151, the stationary state recognition processing unit 152, the offset voltage level compensation unit 153, the temperature compensation unit 154, and the content display control unit 155 are so-called programs. And, for example, these programs are stored in the storage device 123. The CPU 121 (referring to FIG. 9) retrieves these programs from the storage device 123 at the time of start, and develops it in the memory 122 for functionalizing these programs as software modules.

In addition, these programs may be recorded in the recording medium 131a which is explained in FIG. 9. In this case, the CPU 121 in FIG. 9 retrieves these programs at the time of start from the recording medium 131a attached to the outside connection interface device 131, and develops it in the memory 122, and functionalizes these programs as a software module.

(Memory of the Stationary State Time Voltage)

In the strain sensor, detecting unevenness occurs. The cause of the detecting unevenness, for example, is some kind of defective which occurred to this strain sensor at production of this strain sensor and at attachment of the strain sensor to the display device. Besides, the cause of the detecting unevenness includes the aged deterioration of this strain sensor. The display device may change display the content of the information against the intention of the user because of the detecting unevenness.

By the way, because the detecting unevenness occurs in the strain sensor as described above, the zero point in the stationary state is different to every sensor. Therefore the display device detects the stationary state of an own device, namely the strain sensor, and stores the output voltage level of the strain sensor in this stationary state. And the display device compensates the output voltage level of the strain sensor at the time of the content display, based on this output voltage level which is stored.

The storing process of voltage at the stationary state time will be explained based on FIG. 13, with reference to FIG. 12.

Figure 13:
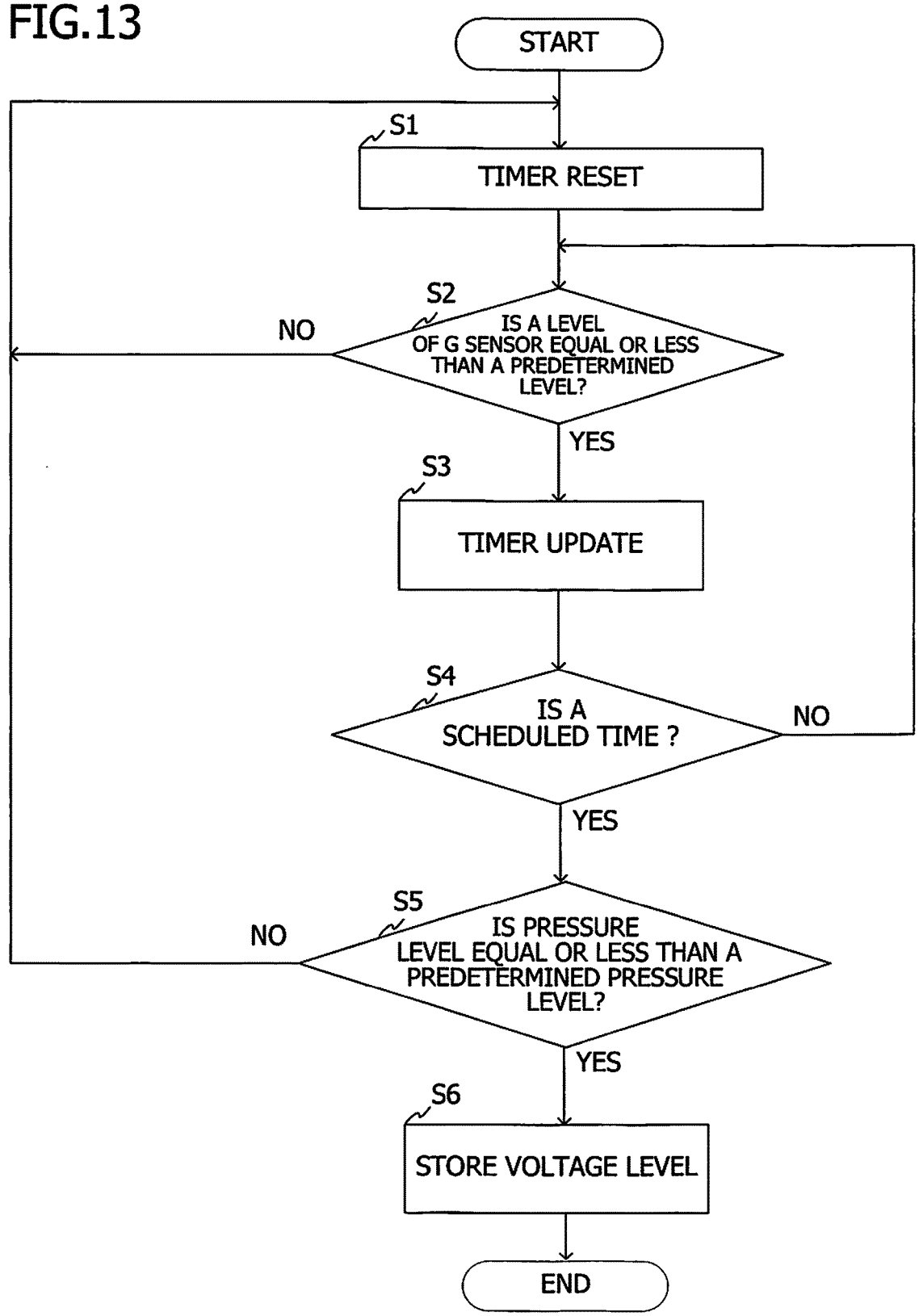
FIG. 13 is a diagram illustrating an example of flow to explain the storing process of voltage at stationary state time.

FIG. 13 is a diagram illustrating an example of flow to explain the storing process of voltage at stationary state time. The stationary state recognition processing unit 152 carries out the processing to explain in FIG. 13 in the timing when the user enters a power supply of the display device 100, and whenever constant time passes from the power supply. In addition, for example, this constant time is ten minutes.

Step S1: The stationary state recognition processing unit 152 resets a timer having a timekeeping function.

Step S2: The stationary state recognition processing unit 152 determines that the detected level of the G sensor 124 is equal or less than a predetermined detection level. By this determination in the step S2, it is determined whether or not the display device 100 swings.

When the detected level of this G sensor 124 is not equal or less than the predetermined detection level (NO/the step S2), the process returns to the step S1. When the detected level of this G sensor 124 is less equal or than the predetermined detection level (YES/the step S2), the process moves to the step S3.

Step S3: The stationary state recognition processing unit 152 updates the timer which is reset. In other words, the stationary state recognition processing unit 152 carries out timekeeping processing.

Step S4: The stationary state recognition processing unit 152 determines whether or not the time, when the timer counts up, passed to a scheduled time. In other words, the stationary state recognition processing unit 152 determines whether or not the scheduled time passed from the timekeeping start. When the time, when the timer counts up, does not pass to the scheduled time (NO/the step S4), the process returns to the step S2. When the time when a timer counts up passes to the scheduled time (YES/the step S4), the process moves to the step S5.

Step S5: The stationary state recognition processing unit 152 determines whether or not the level of pressure (pressure level), which is added to the touch panel 101 and outputted from the touch panel operation detecting unit 151, is equal or less than a predetermined pressure level. By determination process in the step S5, it is determined there is that the user operation is existed for the display device 100.

When this pressure level is not equal or less than the predetermined pressure level (NO/the step S5), the process moves to the step S1. When this pressure level is equal or less than the predetermined pressure level (YES/the step S5), the process moves to the step S6.

Step S6: The stationary state recognition processing unit 152 stores the output voltage level of the strain sensor in the memory 122. Specifically, the stationary state recognition processing unit 152 stores the first output voltage level Vo1 of the first strain sensor 111 in the memory 122, as the first voltage level at the stationary state 1221, and stores the second output voltage level Vo1 of the second strain sensor 112 in the memory 122, as the second voltage level at the stationary state 1222.

The offset voltage level compensation unit 153 compensates the first output voltage level Vo1 of the first strain sensor 111 based on the first voltage level at the stationary state 1221, thereby compensates the detecting unevenness of the first strain sensor 111. Similarly the offset voltage level compensation unit 153 compensates the second output voltage level Vo1 of the second strain sensor 112 based on the second voltage level at the stationary state 1222, thereby compensates the detecting unevenness of the second strain sensor 112.

In addition, the stationary state recognition processing unit 152 may determine whether or not the detected level of the G sensor 124 is equal or less than the predetermined detection level, and may determine that the swing of the display device 100 is within a predetermined swing range when the detected level is equal or less than the predetermined detection level. In other words, the determination process in the step S5 in FIG. 13 may be omitted. In this case only, only the G sensor functions as the stationary state sensing device. By this omission, the processing step of the determination, whether or not the swing of the display device 100 is within the predetermined swing range, decreases, thereby it is possible that the process speed improves.

(Temperature Compensation)

The temperature inside the display device 100 always changes by influence of the heat of each electronic part. In addition, the strain sensor may change an output level by a temperature change. Therefore, the temperature compensation unit 154 compensates an output level change of the strain sensor by the temperature change. As a result, it is possible to obtain an output level of the strain sensor with a high precision.

The temperature compensation process of the output level of the strain sensor will be explained based on FIG. 14, with reference to FIG. 12.

Figure 14:
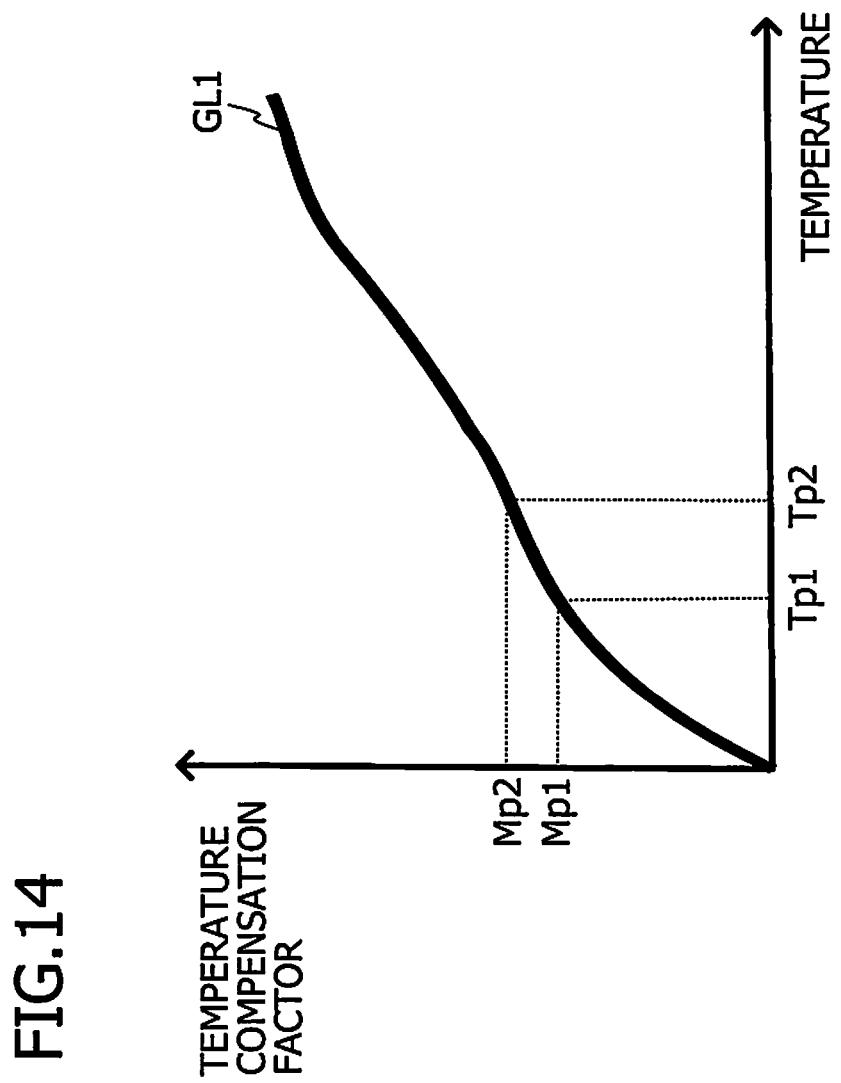
FIG. 14 is a graphical diagram of the temperature compensation factor.

FIG. 14 is a graphical diagram of the temperature compensation factor. In FIG. 14, a cross axle indicates the temperature, and a vertical axis indicates a temperature compensation factor. A graph line GL1 indicates the temperature compensation factor corresponding to the temperature of the cross axle. For example, in the case of the temperature to represent in a mark Tp1, the temperature compensation factor corresponding to a temperature Tp1 is a temperature compensation factor represented by a mark Mp1.

The temperature compensation unit 154 carries out the temperature compensation for the first output voltage level Vf1 based on the graph line GL1 in FIG. 14. Specifically, the temperature compensation unit 154 determines the temperature compensation factor Mp1 based on the graph line GL1 in FIG. 14 when the first temperature sensor 125, which is provided near the first strain sensor 111, outputs the temperature Tp1. And, the temperature compensation department 154, for example, multiplies the temperature compensation factor Mp1 and the first output voltage level Vf1, thereby calculates the first output voltage level Vt1.

Similarly the temperature compensation unit 154 carries out the temperature compensation for the second output voltage level Vf2 based on the graph line GL1 in FIG. 14. Specifically, the temperature compensation region 154 determines the temperature compensation factor Mp2 based on the graph line GL1 in FIG. 14 when the second temperature sensor 126, which is provided near the second strain sensor 112, outputs the temperature Tp2. And, the temperature compensation unit 154, for example, multiplies the temperature compensation factor Mp2 and the second output voltage level Vf2, thereby calculates the second output voltage level Vt2.

(Scroll Control)

The turning control of a page will be explained as an example of the scroll control of the display content, with reference to FIG. 12, based on FIG. 15 and FIG. 16. Here, when the same strain is added to the first strain sensor 111 and the second strain sensor 112, it is assumed that the first output voltage level Vt1 and the second output voltage level Vt2 are the equivalent.

Figure 15:
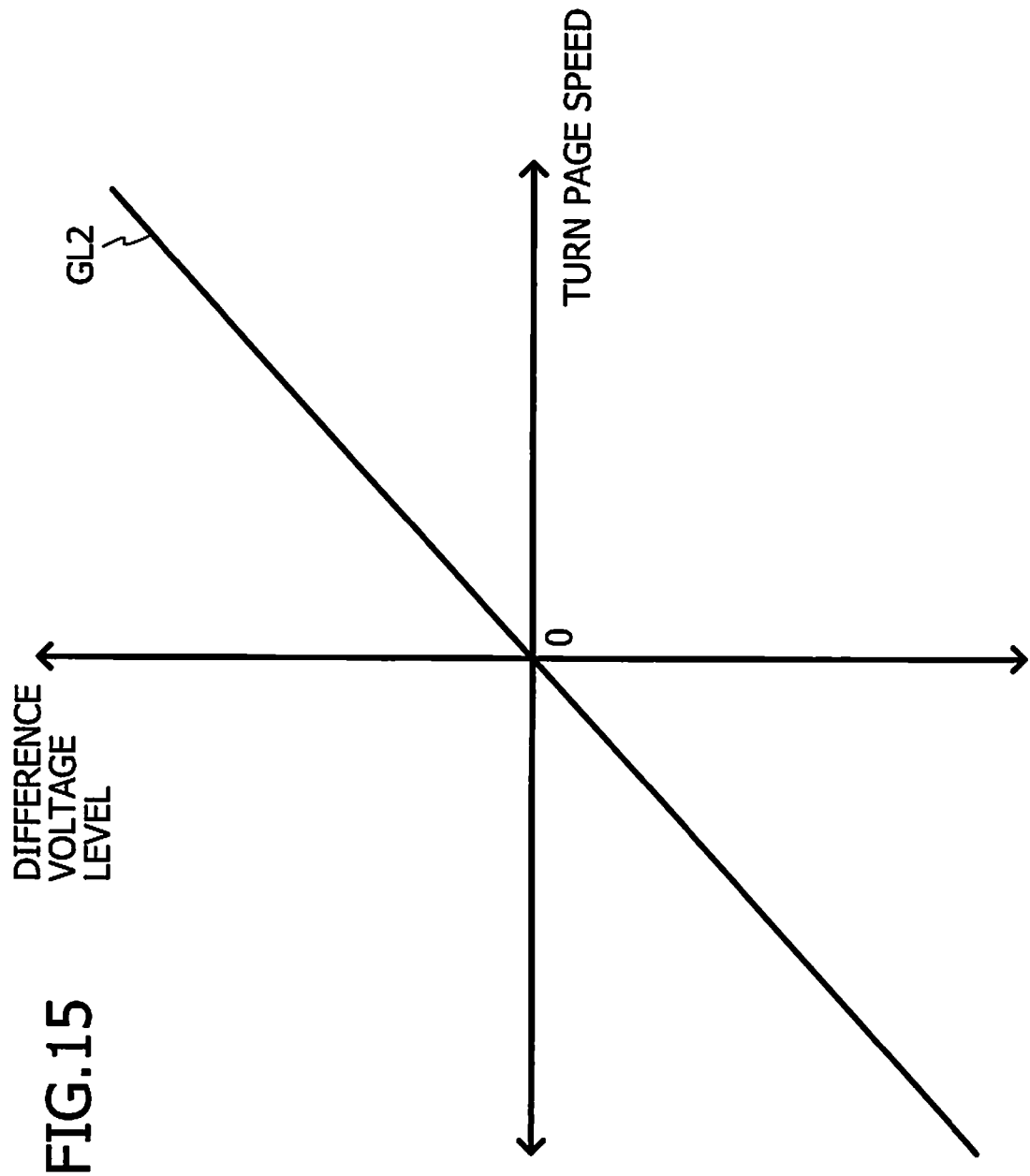
FIG. 15 is a graphical diagram illustrating a relationship between the difference voltage level, which is subtracted the second output voltage level Vt2 from the first output voltage level Vt1 and a turn page speed.

FIG. 15 is a graphical diagram illustrating a relationship between the difference voltage level, which is subtracted the second output voltage level Vt2 from the first output voltage level Vt1 and a turn page speed. In FIG. 15, a cross axle indicates the turn page speed and a vertical axis indicates the difference voltage level which is subtracted the second output voltage level Vt2 from the first output voltage level Vt1.

The graph line GL2 indicates page turning speed corresponding to the difference voltage level which is subtracted the second output voltage level Vt2 from the first output voltage level Vt1 voltage.

In the vertical axis in FIG. 15, a portion, of which the difference voltage level which is subtracted the second output voltage level Vt2 from the first output voltage level Vt1, is positive (that is, bigger than "0"), indicates that the first output voltage level Vt1 is bigger than the second output voltage level Vt2. That the first output voltage level Vt1 is bigger than the second output voltage level, indicates that the user carries out operation (left twist operation) to turn a wrist of the left hand HL to the arrow AL direction in a state holding the display device 100, as illustrated by FIG. 3.

On the other hand, in the vertical axis in FIG. 15, a portion, of which the difference voltage level which is subtracted the second output voltage level Vt2 from the first output voltage level Vt1, is negative (that is, smaller than "0"), indicates that the first output voltage level Vt1 is smaller than the second output voltage level Vt2. That the first output voltage level Vt1 is smaller than the second output voltage level, indicates that the user carries out operation (right twist operation) to turn a wrist of the right hand HR to the arrow AR direction in a state holding the display device 100, as illustrated by FIG. 3.

In the vertical axis in FIG. 15, the portion, of which the page turning speed is positive (that is, bigger than "0") indicates the page turning speed in a left page turning in the state that the left page turning was carried, for example. On the other hand, in the vertical axis in FIG. 15, the portion, of which the page turning speed is negative (that is, less than "0") indicates the page turning speed in a right page turning in the state that the right page turning was carried, for example.

The content display control unit 155 raises page turning speed as the absolute level of the difference voltage level increases, as illustrated in FIG. 15.

FIG. 16A and FIG. 16B are graphical diagrams indicating the time changes of the first output voltage level Vt1 and the second output voltage level Vt2, and the changes at time of the page turning speed corresponding to the time changes of the first output voltage level Vt1 and the second output voltage level Vt2. In the graphical diagram FIG. 16A, the cross axle indicates a time, and the vertical axis indicates the first output voltage level Vt1 and the second output voltage level Vt2. A graph line GL3 indicates temporal variations of the first output voltage level Vt1, and a graph line GL4 indicates temporal variations of the second output voltage level Vt2. Here, the user operates the left twist in the state that the user held the display device 100 by the left hand HL and the right hand HR as illustrated by FIG. 3. In this time, the user gradually increases quantity of operation of the left twist operation. In the example of FIG. 3, the user gradually raises power to twist the left hand HL in the arrow AL direction. Afterward, the user gradually lowers quantity of operation of the left twist operation. In the example of FIG. 3, the user gradually lowers power to twist the left hand HL the arrow AL direction. Thereby, the first output voltage level Vt1 changes with progress at time as described by the graph line GL3. In addition, the user operates the right twist in the process which gradually lowers quantity of operation of the above left twist operation. In a process of this right twist operation, the user gradually increases quantity of operation of the right twist operation. In the example of FIG. 3, the user gradually raises power to twist the right hand HR in the arrow AR direction. Afterward, the user gradually lowers quantity of operation of the right twist operation. In the example of FIG. 3, the user gradually lowers power to twist the right hand HR in the arrow AR direction. Thereby, the second output voltage level Vt2 changes with progress at time as described by a graph line GL4.

FIG. 16B is a diagram illustrating page turning speed corresponding to the difference voltage level which is subtracted the second output voltage level Vt2 from the first output voltage level Vt1 which represented by FIG. 16A. In the graphical diagram of FIG. 16B, the cross axle indicates a time, and the vertical axis indicates page turning speed corresponding to the difference voltage level which is subtracted the second output voltage level Vt2 from the first output voltage level Vt1 which is represented by FIG. 16A. A graph line GL5 indicates temporal variations of the page turning speed.

The content display control unit 155 determines whether or not the difference voltage level which is subtracted the second output voltage level Vt2 from the first output voltage level Vt1 is a positive or negative and determines whether or not a right page turn or a left page turn. Further, the content display control unit 155 determines page turning speed based on quantity of the difference voltage level.

(Display Processing)

Display processing will be explained as follows. Here, the content 1231 in FIG. 12 is electronic book data. The content display control unit 155 displays the content 1231 which is read to the display panel 102 through the image processing device 128, as represented by FIG. 4, for example. The stationary state recognition processing unit 152 stores the first voltage level at the stationary state 1221 and the second voltage level at the stationary state 1222 in the memory 122, as already explained in FIG. 13.

And the offset voltage level compensation unit 153 compensates the first output voltage level Vo1 of the first strain sensor 111 based on the first voltage level at the stationary state 1221 in the memory 122 and outputs the first output voltage level Vf1 to the temperature compensation unit 154. Further, the temperature compensation unit 154 compensates the first output voltage level Vf1 based on the temperature Tp1, of which the first temperature sensor 125 outputs, and outputs the first output voltage level Vt1 to the content display control unit 155. Similarly the offset voltage level compensation unit 153 compensates the second output voltage level Vo1 of the second strain sensor 112 based on the second voltage level at the stationary state 1222 in the memory 122 and outputs the second output voltage level Vf2 to the temperature compensation unit 154. Further, the temperature compensation unit 154 compensates the second output voltage level Vf2 based on the temperature Tp2, of which the second temperature sensor 126 outputs, and outputs the second output voltage level Vt2 to the content display control unit 155. Here, the content display control unit 155 carries out the display processing.

Figure 17:
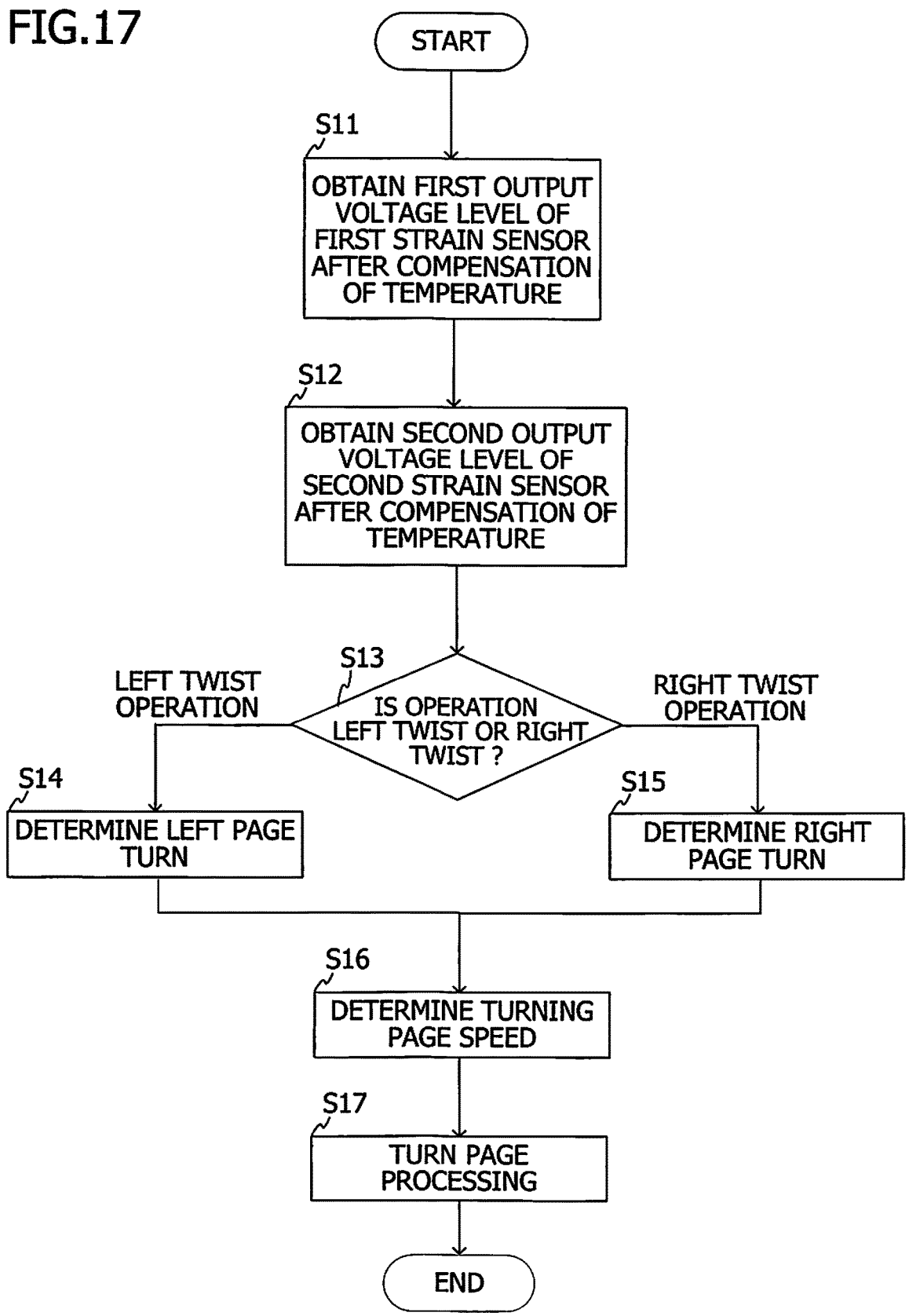
FIG. 17 is a diagram illustrating a flow to explain the display processing that the content display control unit 155 carries out.

FIG. 17 is a diagram illustrating a flow to explain the display processing that the content display control unit 155 carries out.

Step S11: The content display control unit 155 acquires the first output voltage level Vf1 (first output voltage level Vt1) after the temperature compensation.

Step S12: The content display control unit 155 acquires the second output voltage level Vf2 (second output voltage level) after the temperature compensation.

Step S13: The content display control unit 155 determines whether the left twist operation was performed or the right twist operation was carried out. Specifically, the content display control unit 155 determines whether or not the difference voltage level, which is subtracted the second output voltage level Vt2 from the first output voltage level Vt1, is less than the predetermined level. In the examples of FIG. 15 and FIG. 16A, FIG. 16B, the content display control unit 155 determines whether or not the difference voltage level is less than "0" (positive or negative). The content display control unit 155 determines that the difference voltage level is a positive, the content display control unit 155 determines that the left twist operation was performed (step S13/left twist operation), and moves to step S14.

Step S14: The content display control unit 155 determines to carry out the left page turning processing. On the other hand, in the step S13, the content display control unit 155 determines that the difference voltage level is a negative, the content display control unit 155 determines that the right twist operation was performed (step S13/right twist operation), and moves to step S15.

Step S15: The content display control unit 155 determines to carry out the right page turning processing. The content display control unit 155 moves to step S16 after execution of step S14 or step S15.

Step S16: The content display control unit 155 determines the page turning speed based on the difference voltage level. Specifically, the content display control unit 155 determines the page turning speed so that the page turning speed increases as the absolute level of the difference voltage level increase, as represented by FIG. 15. In other words, the content display control unit 155 determines the changing speed in the changing control based on the absolute level of the difference voltage level.

Step S17: The content display control unit 155 carries out the page turning processing. Specifically, the content display control unit 155 carries out the left page turning processing based on the page turning speed which is determined in the step S16, when determining that the left twist operation was performed in step S13 (step S13/left twist operation). On the other hand, the content display control unit 155 carries out the right page turning processing based on the page turning speed which is determined in the step S16, when determining that the right twist operation was performed in step S13 (step S13/right twist operation).

The content display control unit 155 carries out the process of FIG. 17 in response to inputs of the first output voltage level Vt1 and the second output voltage level Vt2. Therefore, the content display control unit 155 carries out the left page turning processing while the left twist operation is performed, and carries out the right page turning processing while the right twist operation is performed. As a result, while each twist operation is carried out, a page is rolled up fluently, thereby it is possible to move to the page that the user wishes to read.

According to the display device in the present embodiment, it is possible that the user, which is reading an electronic book, carries out page turning, as if the user reads in the book of the paper medium. Conventionally, the user, who reads the electronic book, when turning the page, holds the display device with one hand from the state which holds the display device with both hands, and performs operation to operate touch panel by other hands in order to carry out the page turn.

However, the display device according to the present embodiment detects strain, which is added to the bottom of the housing by operation to turn a wrist, in the state that the user holds the display device with both hands, based on a strain sensor located in the bottom of the housing of the display device. And, the display device according to the present embodiment, based on the strain which is detected, determines whether the left twist operation was performed or the right twist operation was performed and carries out the changing control of the display content based on a determination result.

As a result, it is possible that the user operates to instruct to carry out page turning into a desired direction for the this display device by only operating to twist a wrist in a state that the user holds the display device with both hands. This holding state is in condition to keep the book of the paper medium. For example, a state keeping the book of this paper medium is the following states. Namely, the state is that the user holds the page portion of the left side of the book of the spread state with a thumb and the finger except the thumb of the left hand and holds the page portion on the right side of the book of the spread state with a thumb and the finger except the thumb of the right hand.

Therefore, according to the display device of the present embodiment, because the user operates to turn page so as to read the book of the paper medium, it is possible to realize the user instruction operation of turn page and to contribute to the convenience of the user.

In addition, because the display device is equipped with electronic parts which are not flexible such as a CPU, a memory and a storage device, a rigid housing to mount these electronic parts is necessary. Namely, the display device is rigid, not flexible. However, the display device according to the present embodiment provides the strain sensor in this housing bottom, and this strain sensor detects strain added to the bottom of the housing by a user operating. Therefore, it is possible that the display device according to the present embodiment, in a state of holding of the above user (referring to FIG. 3), determines whether the left twist operation was performed or the right twist operation was performed based on the strain which is detected, and controls changing of the display content based on the determination result.

Further, because the user does not operate for the touch panel, it is possible to prevent the deterioration of the touch panel and the display panel which cause by adding unnecessary power for the touch panel and the display panel, which is located in the bottom of the touch panel.

Further, because the detecting unevenness of the strain sensor, which detects the twist operation of the user, is compensated, it is possible to control the display content (page turn) to reflect the intention of the user exactly. In addition, because the touch panel and the G sensor, which are standard installed in the display device, are used, it is needless to install a special device which detects a stationary state. Therefore, it is possible to reduce production cost.

In addition, the above temperature compensation processing may not carry out. In this case, the first temperature sensor 125 and the second temperature sensor 126, which are explained by FIG. 9 and FIG. 12, are not needed, and further the temperature compensation unit 154, which is explained in FIG. 12, is not needed. When the above temperature compensation processing is not carried out, the offset voltage level compensation unit 153 outputs the first output voltage level Vf1 and the second output voltage level Vf2 to the content display control unit 155. The content display control unit 155 controls to change the display content of the content based on a difference level with the first output voltage level Vf1 and the second output voltage level Vf2. By this construction, because the temperature sensor for detecting the temperature of the strain sensor becomes needless, it is possible to reduce production cost.

When it is possible to neglect the detecting unevenness because the strain sensor has a high precision, it is possible to not carry out the detecting unevenness compensation processing of the strain sensor in addition to not carry out the temperature compensation processing. In this case, the offset voltage level compensation unit 153 is not needed. When the detecting unevenness compensation processing of the strain sensor is not carried out, the first strain sensor 111 outputs the first output voltage level Vo1 to the content display control unit 155 and the second strain sensor 112 outputs the second output voltage level Vo1 to the content display control unit 155. The content display control unit 155 controls to change the display content of the content based on a difference level with the first output voltage level V01 and the second output voltage level V02. By this construction, because the compensation processing is not needed, it is possible to reduce the processing amount of the display device 100. Further, by the reduction of the processing amount, it is possible to shorten a time from an operation of the user until the carry out of the changing control of the display content, and to improve a response for the operation.

Second Embodiment

In the first embodiment, the display device having two strain sensors was explained. However, the production cost rises when two strain sensors are used. In addition, because two strain sensors are provided in the display device, physical area in the display device becomes narrow. Therefore, in the other embodiments, the display device having single strain sensor will be explained. The external representation of the display device according to the embodiment is same as the external representation of the display device 100 which is explained by FIG. 1 and FIG. 2.

Figure 18:
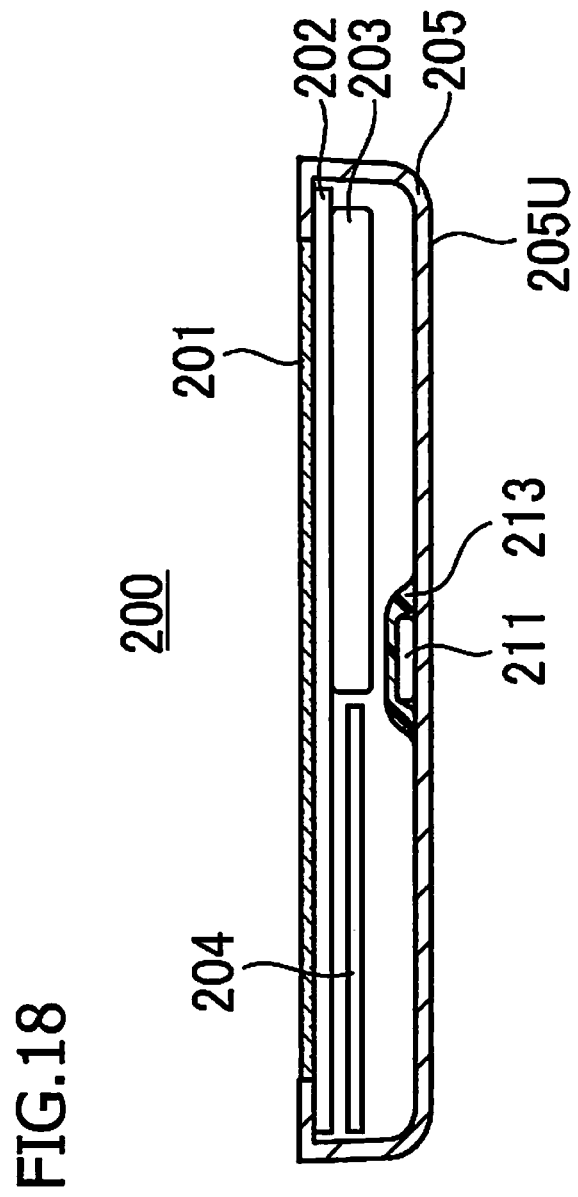
FIG. 18 is a diagram illustrating a cross section of a display device 200 according to the second embodiment.

FIG. 18 is a diagram illustrating a cross section of a display device 200 according to the second embodiment. This cross sectional diagram corresponds to the cross section of A-A' line in FIG. 1 and FIG. 2. The display device 200 has a touch panel 201, a display panel 202, a battery 203, a printed circuit board 204, a housing 205, a strain sensor 211. The strain sensor 211 is attached to a bottom part 205U of the housing 205 by an adhesive material 213, for example. The bottom part 205U of the housing 205 is also called as a bottom plate of the housing 205.

Figure 19:
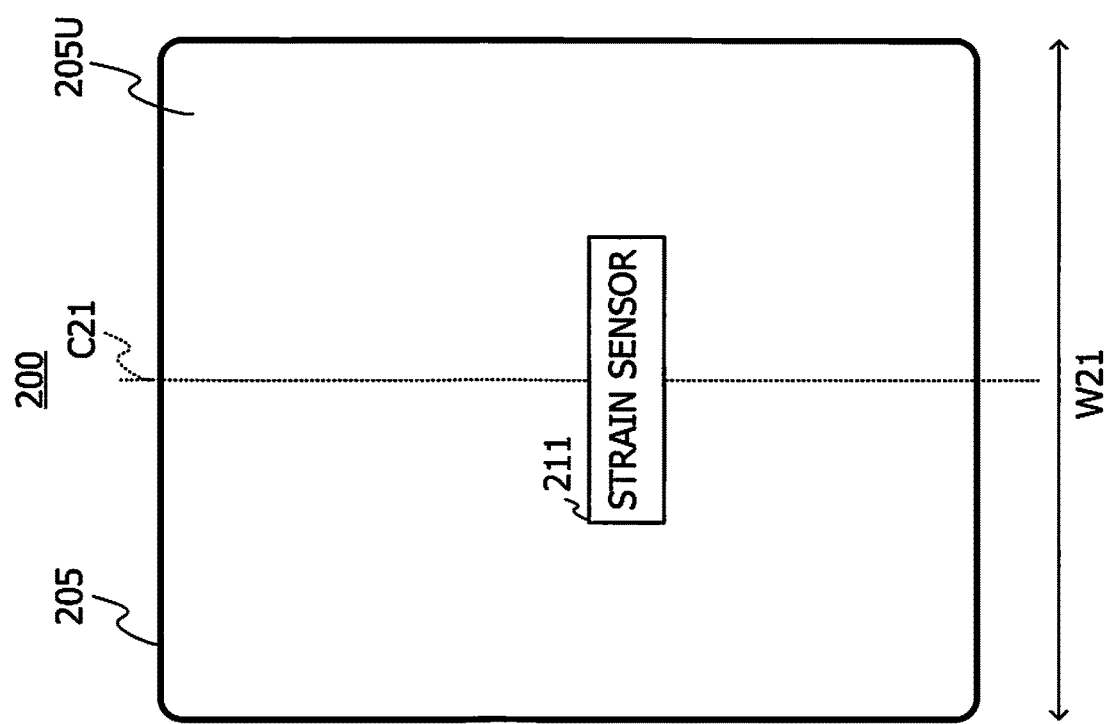
FIG. 19 is a diagram schematically illustrating arrangement status of the strain sensor on the bottom part 205U of the housing 205.

FIG. 19 is a diagram schematically illustrating arrangement status of the strain sensor on the bottom part 205U of the housing 205.

In FIG. 19, a dotted line marked by a reference sign C21 indicates a center of a width W21 on a short side of a rectangle. The strain sensor 211 is located on a center line C21 in the display device 200. In other words, the display device 200 has the strain sensor 211 on the center line C21 of the housing in the bottom part 205U of a rectangular housing 205 which is opposite to the display panel 202 of the display device 200.

When the user holds the display device 200 in a state represented by FIG. 3, either finger except the thumb of the left hand of the user touches the left side area of a back side (referring to FIG. 2 for the back face), which is the bottom part 205U of the housing 205, on the basis of the center line C21 in FIG. 19. And in the above state, either finger except the thumb of the right hand of the user touches the right side area of the bottom part 205 U which is the back side of housing 205, on the basis of the center line C21 in FIG. 19.

The strain sensor 211 detects strain on the bottom part 205U of the housing 205 in the left side area and the right side area, on the basis of the center line C21 of the housing 205, and outputs the detected level (below, called as output level appropriately). The strain, of which the strain sensor 211 detects, is strain of the housing 205 which occurs based on the operation of the user to the bottom part 205U of the housing 205.

(Hardware Construction)

Figure 20:
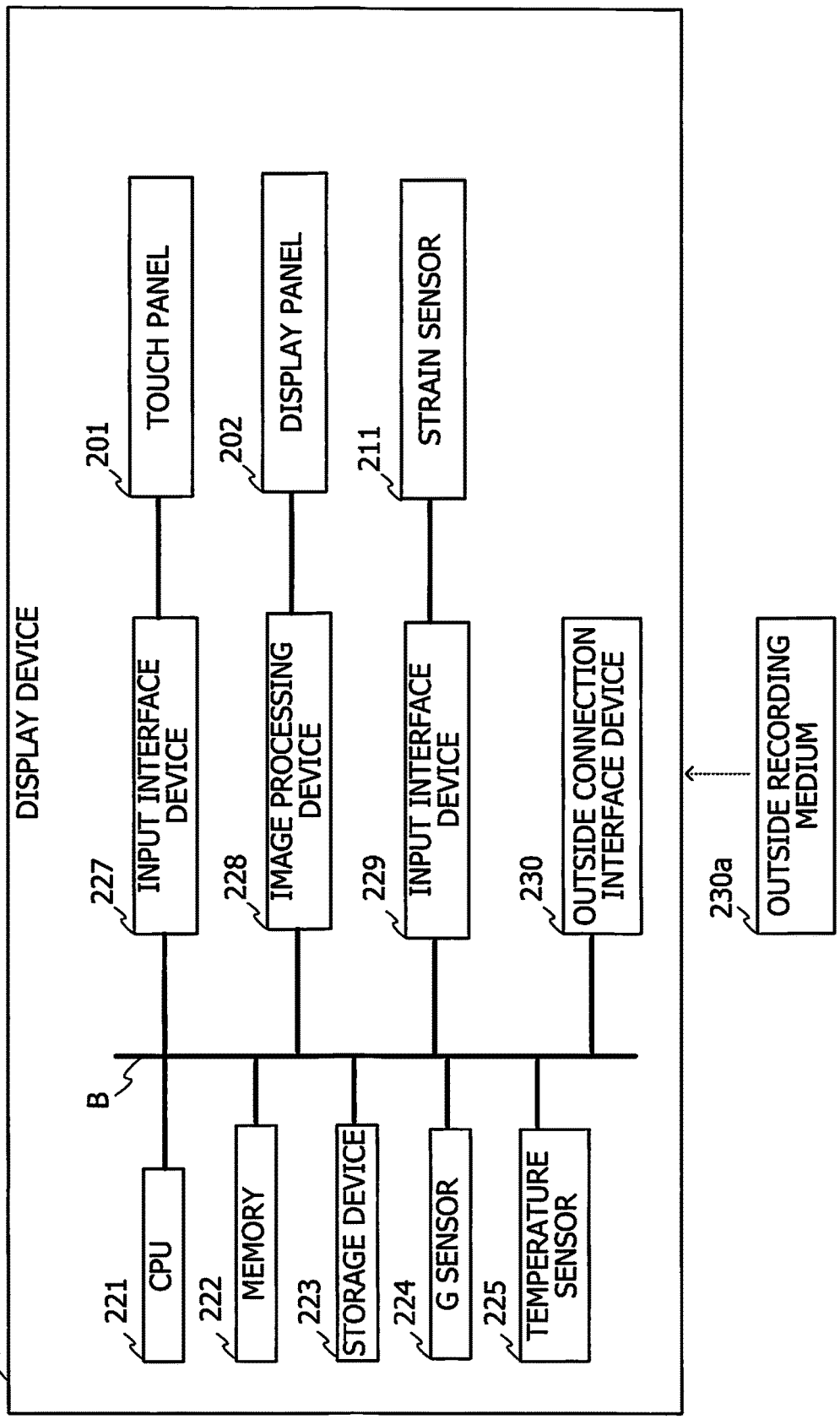
FIG. 20 is a diagram illustrating an example of the hardware block in the display device 100 according to the second embodiment.

FIG. 20 is a diagram illustrating an example of the hardware block in the display device 200 according to the second embodiment. In FIG. 20, the explanation will be a tablet computer for an example.

The display device 200 has a CPU (Central Processing Unit) 221, a memory 222, a storage device 223, a G (Gyro) sensor 224, a temperature sensor 225. The display device 200 further has an input interface device 227 for a touch panel 201, an image processing device 228, an input interface device 229 for the strain sensor 211, and an outside connection interface device 230. The display device 200 further has a touch panel 201, a display panel 202, and a strain sensor 211. Each of hardware components is connected by a bus B. In addition, the display device 200 has wireless communication equipment as needed. The display device 200 acquires the content for display and a program as later described through the outside connection interface device 230 and the wireless communication equipment.

The CPU 221 is an arithmetic processor (also called as control unit, computer) which controls the whole of the display device 200. The memory 222 stores data which is processed in information processing by the CPU 221 and various programs, temporarily. For example, the memory 222 is RAM (Random Access Memory). The memory 222 is an example of the memory unit to store an output level of the strain sensor 211.

The storage device 223, for example, is a magnetic storage device such as a hard disk drive (HDD: Hard Disk Drive) and an nonvolatile memory and stores a program to perform the program and various data.

The G sensor 224 is called the acceleration sensor and detects acceleration added to the display device 200 and outputs a detected level of the acceleration. The detected level of the G sensor 224 is used for the processing which determines whether the swinging state of the display device 200 is within a predetermined swinging range, and the detection how the user holds the display device 200, for example. In addition, the details will be described later.

The temperature sensor 225 is provided near the strain sensor 211, and detects temperature of the strain sensor 211. The temperature that the temperature sensor 225 detected is used to compensate an output level of the strain sensor 211.

The touch panel 201 is provided on the display panel 202, and works as the device of which the user operates the display device 200 by touching (called as the touch) at a desired position of the display 202. The touch panel 201 outputs the position where the user touches the touch panel 201 and a level of the pressure that is added when touched, as analog data. In addition, an operation system of the touch panel includes an electrostatic induction system and a resistance film system, for example.

Figure 22:
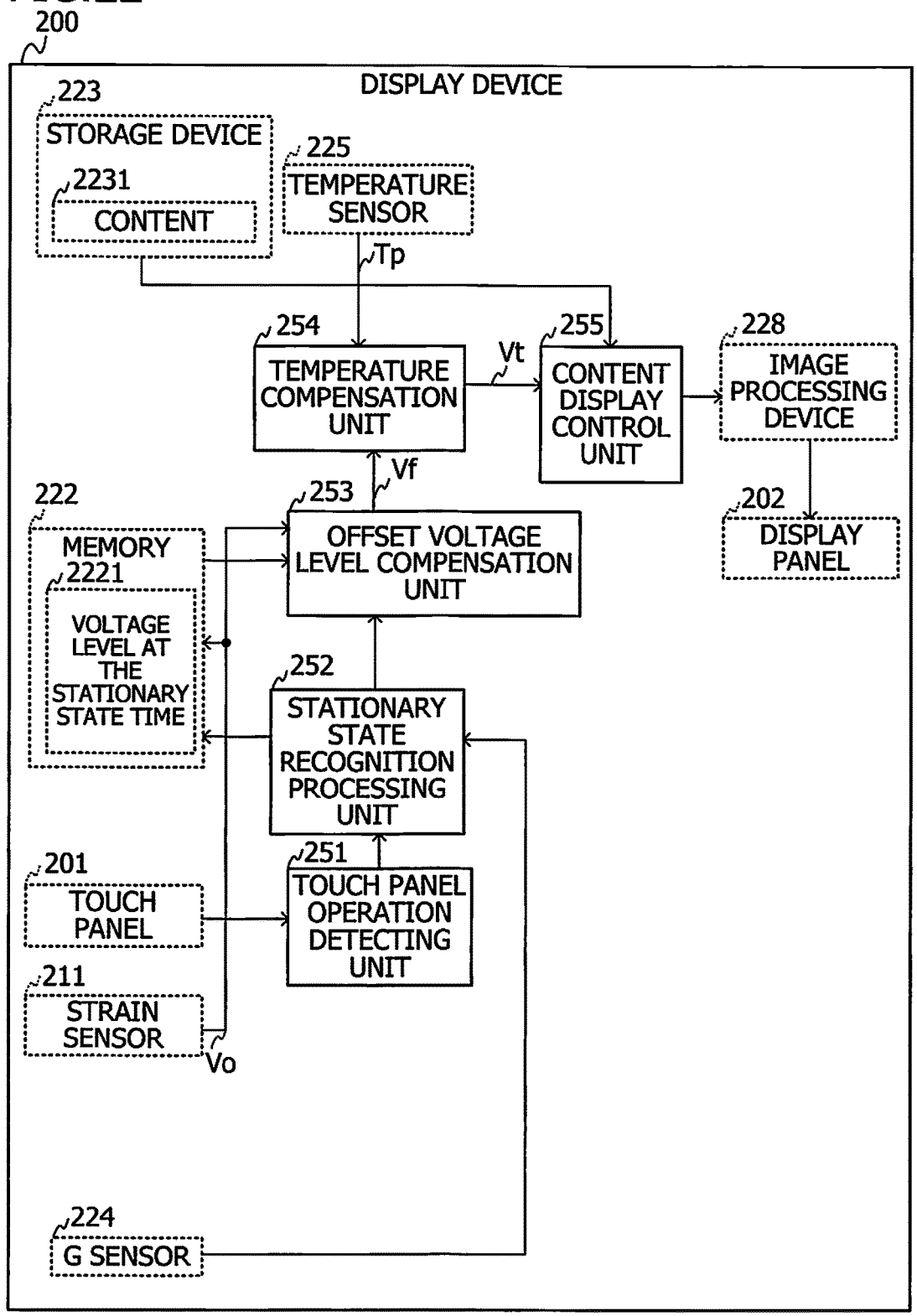
FIG. 22 is a diagram illustrating an example of a block diagram of software modules in the display device 200 according to the second embodiment.

The input interface device 227 has an interface function with various programs to explain in FIG. 22 and the touch panel 201. The input interface device 227 converts analog-digital of an output level of the touch panel 201 and outputs it to the CPU 221, for example.

The display panel 202 is a panel displaying various images. For example, the display panel 202 is a liquid crystal panel or organic electroluminescence panel. The display panel 202 is one example of the display unit. Various images are a still image, and a moving picture, for example. The still image includes, for example, the content of each page in the electronic book. Besides, various images include a user interface image for operation.

The image processing device 228 drives the display element in the display panel 202 and controls processing to display an image to the display panel 202.

The input interface device 229 has an interface function with various programs to explain in FIG. 22 and the strain sensor 211. The input interface device 229 converts analog-digital of an output level of the strain sensor 211 and outputs it to the CPU 221, for example.

The outside connection interface device 230 provides a connection interface with an outside recording medium 230a. For example, the recording medium 230a is a portability recording medium such as the USB (Universal Serial Bus) memory.

(Strain Sensor)

Figure 21:
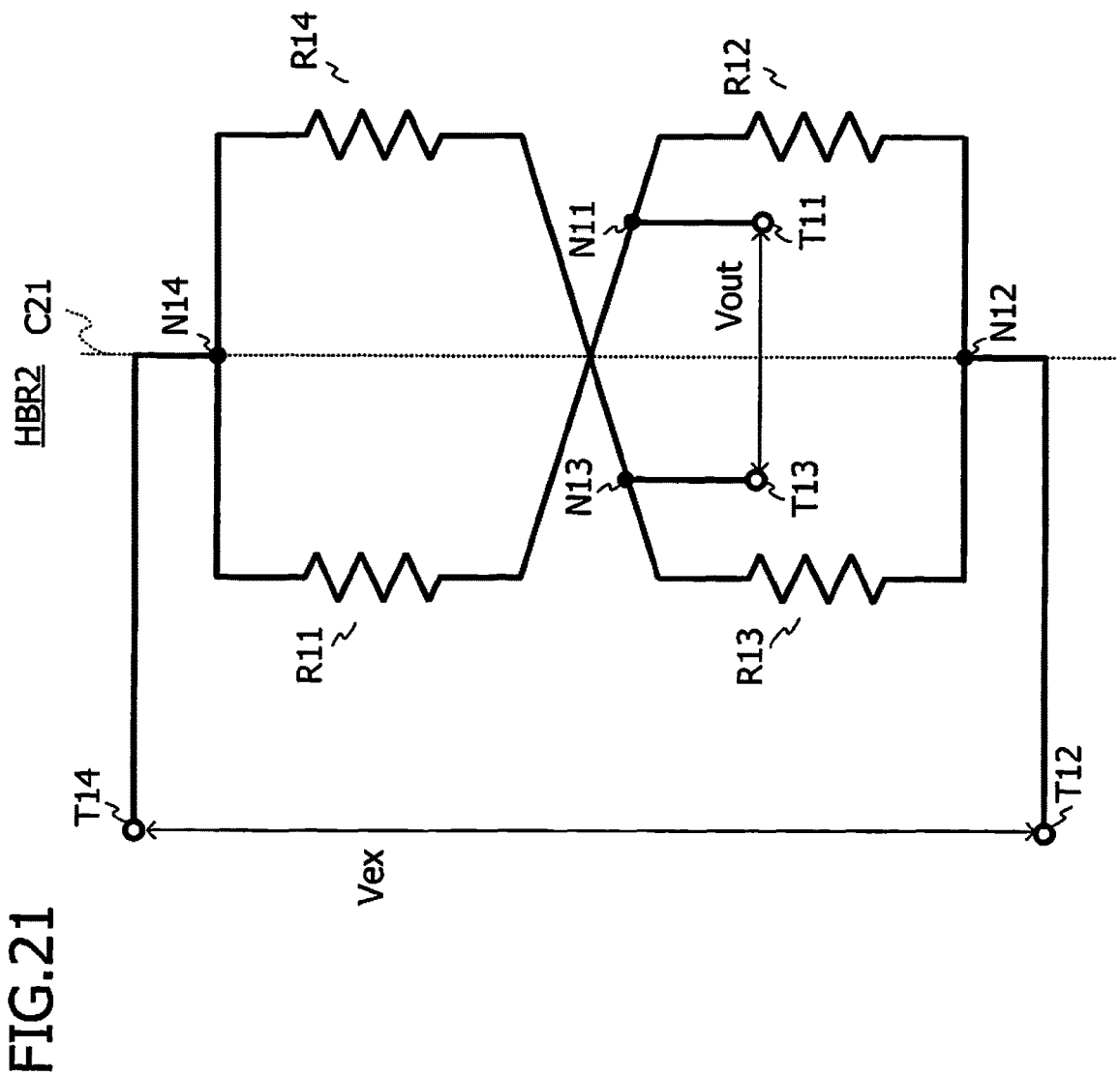
FIG. 21 is a diagram illustrating an example of circuit in the strain sensor 211 depicted by FIG. 20.

FIG. 21 is a diagram illustrating an example of circuit in the strain sensor 211 depicted by FIG. 20. In FIG. 21, single strain sensor 211 is constituted by a bridge circuit HBR2. The bridge circuit HBR2 is a bridge circuit having four resistance R11-resistance R14. One end of the first resistance R11 is connected to one end of the second resistance R12. And a connection point with the first resistance R11 and the second resistance R12 is represented by a reference sign N11. Another end of the second resistance R12 is connected to one end of third resistance R13. And a connection point with the second resistance R12 and the third resistance R13 is represented by a reference sign N12. Another end of the third resistance R13 is connected to one end of the fourth resistance R14. And a connection point with the third resistance R13 and the fourth resistance R14 is represented by a reference sign N13. Another end of the fourth resistance R14 is connected to another end of the first resistance R11. And a connection point with the fourth resistance R14 and the first resistance R11 is represented by a reference sign N14. A reference sign C21 in FIG. 21 indicates the center line C21 in FIG. 19.

In the bridge circuit HBR2, four resistances R11-R14 are located so that the first resistance R11 is opposite to the fourth resistance R14 and the second resistance R12 is opposite to the third resistance R13, on the basis of the center line C21. In other words, in the bridge circuit HBR2, the first resistance R11 and the fourth resistance R14 are located symmetrically and the second resistance R12 and the third resistance R13 are located symmetrically, on the basis of the center line C21.

In the first resistance R11-the fourth resistance R14 in the bridge circuit HBR2, a combination of the strain gauge and a simple electrical resistance element is following. The simple resistance element is a resistance element in which a resistance level does not change based on quantity of strain. That is, the first resistance R11 and the fourth resistance R14 are the strain gauge and the second resistance R12 and the third resistance R13 are simple electrical resistance. Or, the second resistance R12 and the third resistance R13 are the strain gauge and the first resistance R11 and the fourth resistance R14 are the simple electrical resistance. Besides, the first resistance R11-the fourth resistance R14 are the strain gauge. The more detailed explanation about this strain gauge is omitted because the strain gauge is explained by FIG. 11.

The bridge circuit HBR2 receives the supply of power supply voltage Vex through a terminal T14 of the connection point N14 and a terminal T12 of the connection point N12. Low voltage is supplied to the terminal T12, and high voltage is supplied to the terminal T14.

The bridge circuit HBR2 outputs a potential difference between the terminal T11 of the connection point N11 and the terminal T13 of the connection point N13, as voltage Vout. The terminal T13 is a positive terminal, and the terminal T11 is a negative terminal. This output voltage Vout is an output level of the strain sensor.

Here, the output voltage Vout is expressed by a following expression 2. In addition, in the expression 2, "R11"-"R14" indicate a resistance level of the first resistance R11-the fourth resistor R14.

$$Vout=((R13/(R13+R14))-(R12/(R11+R12)))\times Vex \quad \text{(expression 2)}$$

In addition, when a strain is not added to the strain gauge (strain detecting element), the resistance level of the strain gauge is equivalent to a resistance level of a simple electrical resistance element.

Here, the strain gauge is a resistance in which the resistance level increases as the strain added to the strain gauge increases. And in the first resistance R11-the fourth resistance R14 in FIG. 21, it is assumed that the second resistance R12 and the third resistance R13 are the strain gauge. Here, when it is assumed that there is no measurement error of the strain gauge, the output level of the strain sensor 211 changes according to the left twist operation and the right twist operation. Therefore, when the left twist operation is carried out, the strain is added to the resistance R11 and the resistance R13. Thereby, the resistance level of the resistance R13 which is the strain gauge increases and the output voltage Vout of the strain sensor 211 becomes positive level. While, when the right twist operation is carried out, the strain is added to the resistance R12 and the resistance R14. Thereby, the resistance level of the resistance R12 which is the strain gauge increases and the output voltage Vout of the strain sensor 211 becomes negative level. As above described, the display device 200 determines whether the left twist operation is carried out or the right twist operation is carried out by using the change of the output voltage Vout.

(Software Module)

FIG. 22 is a diagram illustrating an example of a block diagram of software modules in the display device 200 according to the second embodiment. In FIG. 22, the touch panel 201, the display panel 202, the strain sensor 211, the memory 222, the storage device 223, the G sensor 224, the temperature sensor 225 and the image processing device 228, which are the hardware components explained by FIG. 20, are represented by a dotted line. Similarly, the input interface device 227, the input interface device 229, and the outside connection interface device 230 are omitted illustration because it is unnecessary in the explanation of FIG. 22.

A touch panel operation detecting unit 251 detects the touch position, a touch time and a level of the pressure that is added when the user touched, based on the output result that the touch panel 101 outputs when the user touched the touch panel 101 with fingers.

A stationary state recognition processing unit 252 determines that whether or not the swinging of the display device 200 is within a predetermined swing range, based on a detecting result of the touch panel 201 which functions as a swinging state sensing device, and the G sensor 224 which functions as the swinging state sensing device. Specifically, the stationary state recognition processing unit 252 determines that whether or not the swinging of the display device 200 is within a predetermined swing range, based on the output level of the G sensor 224 and the detecting result of the touch panel operation detecting unit 251. And the stationary state recognition processing unit 252 carries out processing to store the output voltage level of the strain sensor 211 in the memory 222 when determined that the swing of the display device 200 is within a predetermined swing range. The output voltage level of the strain sensor 211 in this stationary state, is described as voltage level at stationary state time, appropriately. That is, the output level of the strain sensor 211, of which the stationary state recognition processing unit 252 stores in the memory 222, is the voltage level at the stationary state 2221.

An offset voltage level compensation unit 253 compensates the output voltage level Vo of the strain sensor 211 based on the voltage level 2221 at the stationary state in the memory 222 and outputs the output voltage level Vf to a temperature compensation unit 254. The compensation, for example, is to calculate a difference between the voltage level at the stationary state 2221 and the output voltage level Vo. The output voltage level Vf is the output voltage level Vo after the offset compensation.

A temperature compensation unit 254 compensates the output voltage level Vf, of which the offset voltage level compensation unit 253 outputs, based on a temperature correction factor corresponding to a temperature Tp of which the temperature sensor 225 outputs. And the temperature compensation unit 254 outputs the output voltage level Vt to the content display control unit 255. The output voltage level Vt is a output voltage level Vf after the temperature compensation.

The content display control unit 255, based on the operation of the user, reads the content 2231 in the storage device 223, and outputs it to the display panel 202 through the image processing device 228. The content is electronic data having information for the display, and is called the content data. For example, the content 2231 is electronic book data and moving picture data. In the case of the electronic book data, the content display control unit 255 displays the content 2231, which is read, to the display panel 202 through the image processing device 228, for example, as illustrated by FIG. 4. In addition, in the case of the moving picture, the content display control unit 255 displays the content 2231 which is read to the display device through the image processing device 228, as the moving picture.

For example, the content display control unit 255 carries out the display process which determines whether the output voltage level Vt is less than a predetermined level and controls changing of the display content to the first display state or to the second display state which is different from the first display state, based on the determination result, for example. Further, the content display control unit 255 determines the changing speed in the changing control based on the absolute level of the output level Vt, and carries out the changing control based on the determined scroll speed.

The changing control, the first display state, the second display state and the changing speed were explained in FIG. 12. Therefore, these explanations are omitted.

The touch panel operation detecting unit 251, the stationary state recognition processing unit 252, the offset voltage level compensation unit 253, the temperature compensation unit 254, and the content display control unit 255 are so-called programs. And, for example, these programs are stored in the storage device 223. The CPU 221 (referring to FIG. 20) retrieves these programs from the storage device 223 at the time of start, and develops it in the memory 222 (referring to FIG. 20) for functionalizing these programs as software modules.

In addition, these programs may be recorded in the recording medium 230a which is explained in FIG. 20. In this case, the CPU 221 in FIG. 20 retrieves these programs at the time of start from the recording medium 230a attached to the outside connection interface device 230, and develops it in the memory 222, and functionalizes these programs as a software module.

(Display Processing)

Display processing will be explained as follows. Here, the content 2231 in FIG. 12 is electronic book data. The content display control unit 255 displays the content 2231 which is read to the display panel 202 through the image processing device 228, as represented by FIG. 4, for example. The stationary state recognition processing unit 252 stores the voltage level at the stationary state 2221 in the memory 222, as already explained in FIG. 13.

And the offset voltage level compensation unit 253 compensates the output voltage level Vo of the strain sensor 211 based on the voltage level at the stationary state 2221 in the memory 222 and outputs the output voltage level Vf to the temperature compensation unit 254. Further, the temperature compensation unit 254 compensates the output voltage level Vf based on the temperature Tp, of which the temperature sensor 225 outputs, and outputs the output voltage level Vt to the content display control unit 255. Here, the content display control unit 255 carries out the display processing.

Figure 23:
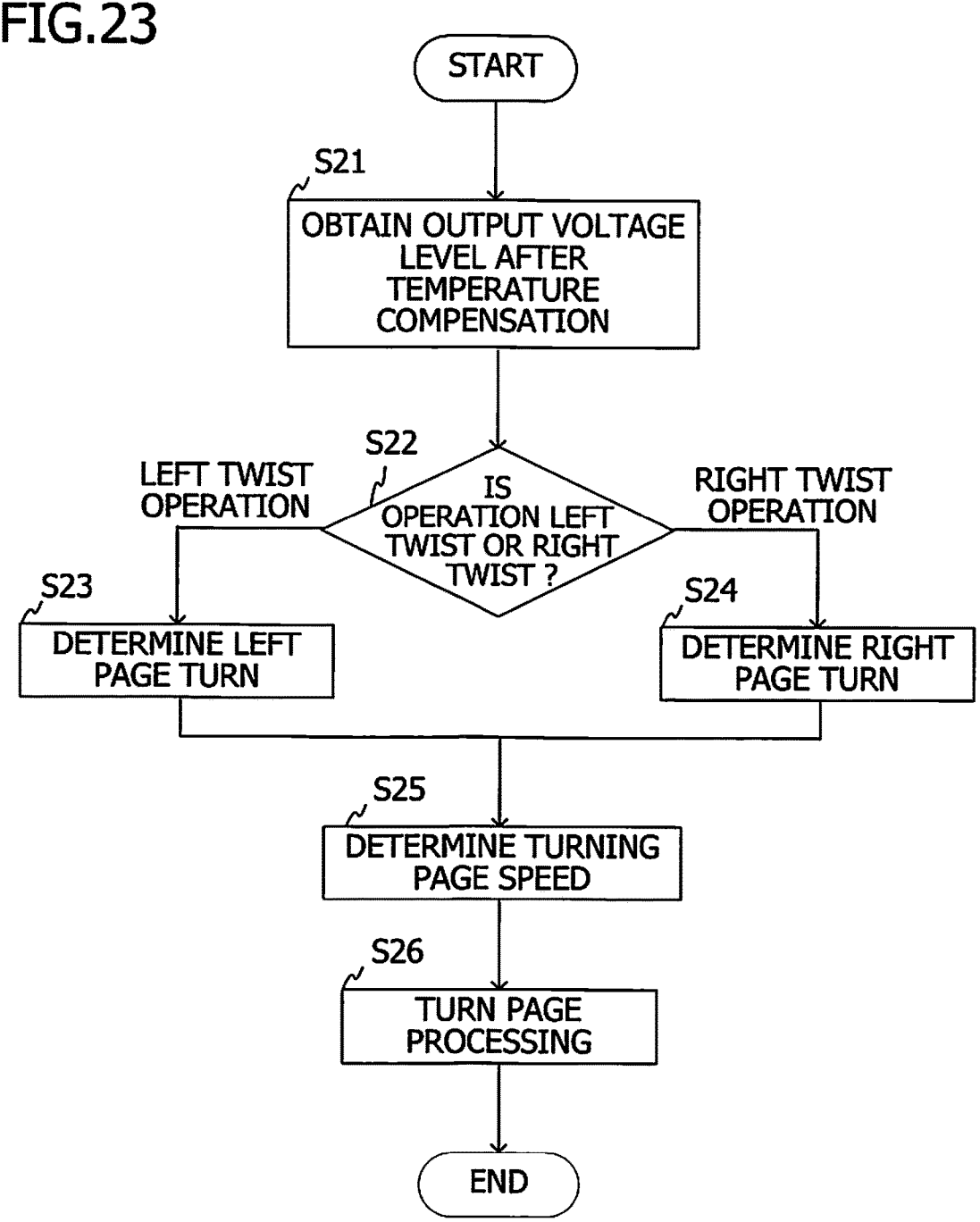
FIG. 23 is a diagram illustrating a flow to explain the display processing that the content display control unit 255 carries out.

FIG. 23 is a diagram illustrating a flow to explain the display processing that the content display control unit 255 carries out.

Step S21: The content display control unit 255 acquires the output voltage level Vf (output voltage level Vt) after the temperature compensation.

Step S22: The content display control unit 255 determines whether the left twist operation was performed or the right twist operation was carried out. Specifically, the content display control unit 255 determines whether or not the output voltage level Vt is less than the predetermined level. The content display control unit 255, when determined that the output voltage level is not less than the predetermined level (for example, "0"), determines that the left twist operation was performed (step S22/left twist operation), and moves to step S23.

Step S23: The content display control unit 255 determines to carry out the left page turning processing. On the other hand, when the content display control unit 255 determines that the output voltage level is less than the predetermined level, the content display control unit 255 determines that the right twist operation was performed (step S22/right twist operation), and moves to step S24.

Step S24: The content display control unit 255 determines to carry out the right page turning processing.

The content display control unit 255 moves to step S25 after execution of step S23 or step S24.

Step S25: The content display control unit 255 determines the page turning speed based on the output voltage level Vt. In this time, the content display control unit 255 determines the page turning speed so that the page turning speed increases as the absolute level of the output voltage level increases. In other words, the content display control unit 255 determines the changing speed in the changing control based on the absolute level of the output voltage level Vt.

Step S26: The content display control unit 255 carries out the page turning processing. Specifically, the content display control unit 255 carries out the left page turning processing based on the page turning speed which is determined in the step S25, when determining that the left twist operation was performed in step S22 (step S22/left twist operation). On the other hand, the content display control unit 255 carries out the right page turning processing based on the page turning speed which is determined in the step S25, when determining that the right twist operation was performed in step S22 (step S22/right twist operation).

The content display control unit 255 carries out the process of FIG. 23 in response to inputs of the output voltage level Vt. Therefore, the content display control unit 255 carries out the left page turning processing while the left twist operation is performed, and carries out the right page turning processing while the right twist operation is performed. As a result, while each twist operation is carried out, a page is rolled up fluently, thereby it is possible to move to the page that the user wishes to read.

According to the display device in the present embodiment, following effect is performed in addition to the effects which are explained by the first embodiment. That is, according to the second embodiment, when the display device in the vertical state and the horizontal, it is possible to determine whether the left twist operation was performed or the right twist operation was carried out by single strain sensor, because the strain sensor is constituted by the bridge circuit HBR2 as depicted by FIG. 21.

In addition, according to the second embodiment, because the number of the strain sensor is one, it is possible to reduce the number of the strain sensor, and to reduce production cost. Further, because single strain sensor is provided in the display device, it is possible to prevent that the physical space in the display device makes narrow.

In addition, the above temperature compensation processing may not carry out. In this case, the temperature sensor 225, which is explained by FIG. 20 and FIG. 22, is not needed, and further the temperature compensation unit 254, which is explained in FIG. 22, is not needed. When the above temperature compensation processing is not carried out, the offset voltage level compensation unit 253 outputs the output voltage level Vf to the content display control unit 255. The content display control unit 255 carries out the determination process in the step S22 in FIG. 23 and controls to change the display content of a content based on the output voltage level Vf. By this construction, because the temperature sensor for detecting the temperature of the strain sensor becomes needless, it is possible to reduce production cost.

When it is possible to neglect the detecting unevenness because the strain sensor has a high precision, it is possible to not carry out the detecting unevenness compensation processing of the strain sensor in addition to not carry out the temperature compensation processing. In this case, the offset voltage level compensation unit 253, which is explained by FIG. 22, is not needed. When the detecting unevenness compensation processing of the strain sensor is not carried out, the strain sensor 211 outputs the output voltage level Vo to the content display control unit 255. The content display control unit 255 carries out the determination process in the step S22 in FIG. 23 and controls to change the display content of the content based on the output voltage level Vo. By this construction, because the compensation processing is not needed, it is possible to reduce the processing amount of the display device 200. Further, by the reduction of the processing amount, it is possible to shorten a time from an operation of the user until the carry out of the changing control of the display content, and to improve a response for the operation.

Third Embodiment

In the second embodiment, the user holds the display device in a vertical state by using the left hand and the right hand. The holding of the display device in the vertical state means a state that the user holds the long side of the left side by the left hand HL and holds the long side of the right side by the right hand HR in the rectangular shaped display device, as illustrated by FIG. 3. While, the user is able to hold the display device in a state that the display device is rotated in a left or right direction at 90 degrees from the state illustrated in FIG. 3. That is, the user able to hold the display device in a horizontal state by using the left hand and the right hand. The holding of the display device in the horizontal state means a state that the user holds the shorten part of the left side by the left hand HL and holds the shorten part of the right side by the right hand HR in the rectangular shaped display device.

Figure 24:
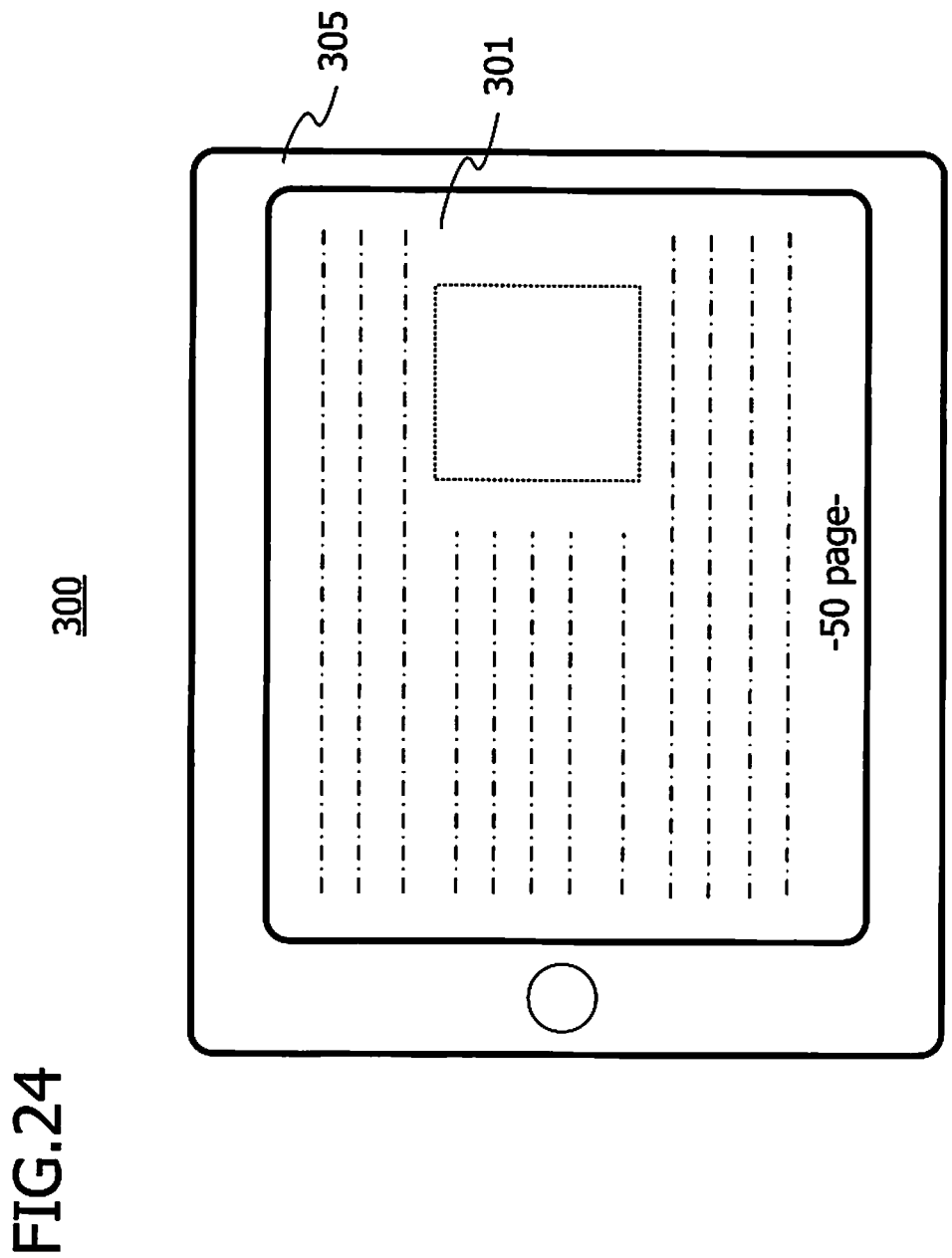
FIG. 24 is a diagram illustrating a display device 300 in a horizontal state according to the third embodiment.

FIG. 24 is a diagram illustrating a display device 300 in a horizontal state according to the third embodiment. FIG. 24 illustrates a state that the display device, which is held in a vertical state depicted by FIG. 3, is rotated in the right direction at 90 degrees. In this time, the display device 300 makes the content which is displayed on the touch panel 301 to rotate in a reverse direction of this rotation. In addition, a reference sign 305 in FIG. 24 indicates the housing of the display device 300.

In the third embodiment, the display device carries out the changing process of the display content based on the left twist operation or the right twist operation, even though the user holds the display device in the vertical state and in the horizontal state.

The outer appearance of the display device according to the third embodiment is same as the outer appearance of the display device 100 which is explained by FIG. 1 and FIG. 2. The cross sectional diagram corresponds to the cross section of A-A' line in FIG. 1 and FIG. 2 is same as the cross sectional diagram in FIG. 18. Therefore, the illustration is omitted.

Figure 25:
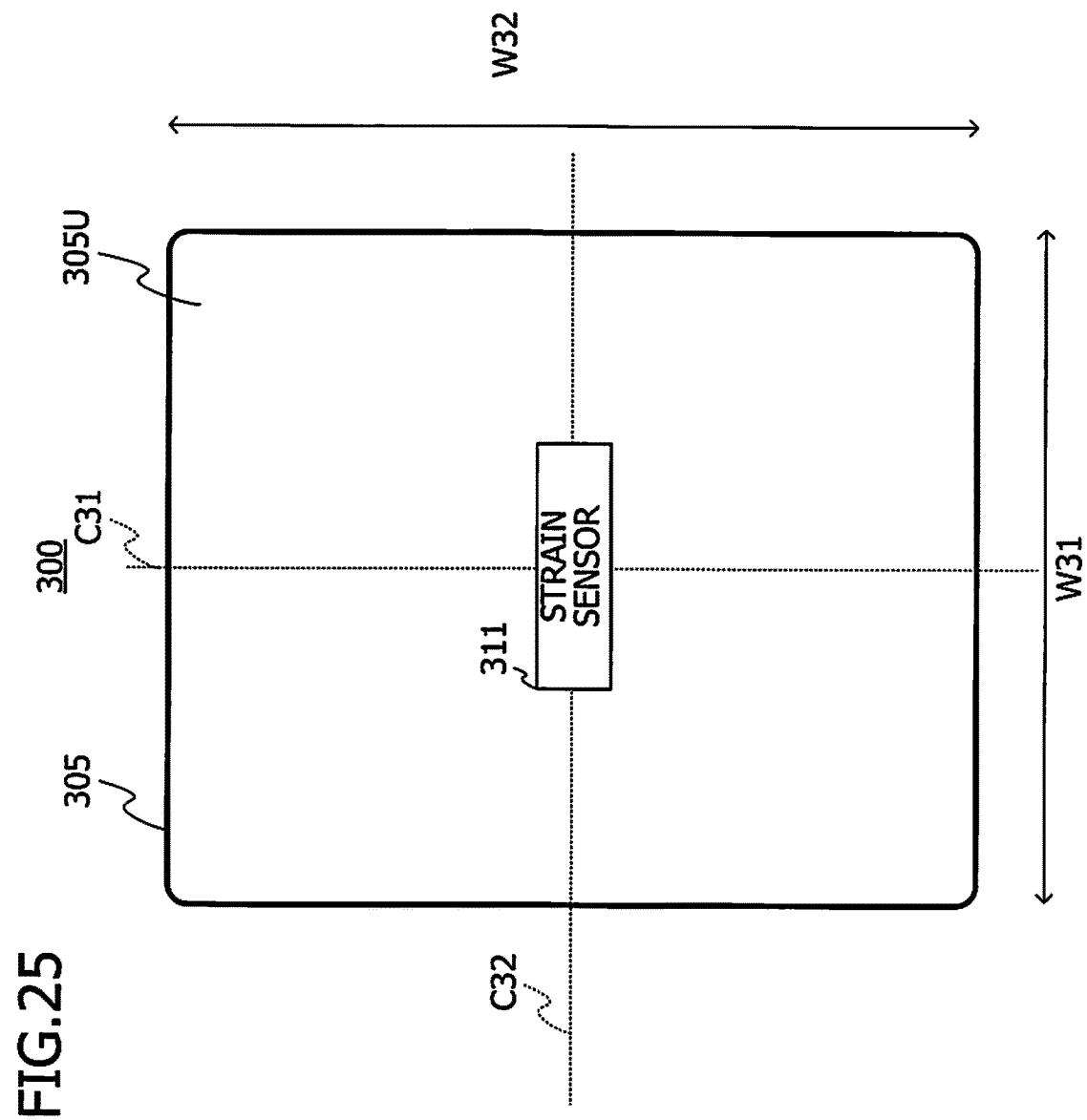
FIG. 25 is a diagram schematically illustrating arrangement status of the strain sensor 311 on the bottom part 305U of the display device 300.

FIG. 25 is a diagram schematically illustrating arrangement status of the strain sensor 311 on the bottom part 305U of the display device 300. In FIG. 25, a dotted line marked by a reference sign C31 indicates a center of a width W31 on a short side of a rectangle. The center line C31 is a center line of the housing 305 along (in parallel to) the long side of the housing 305. A dotted line marked by a reference sign C32 indicates a center of a width W32 on a long side of a rectangle. The center line C32 is a center line of the housing 305 along (in parallel to) the short side of the housing 305.

The strain sensor 311 is located on a center position of the display device 300, for example. In other words, the display device 300 has the strain sensor 311 on the center line C31 and the center line C32 of the housing 305 in the bottom part 305U of a rectangular housing 305 which is opposite to the display panel 302 of the display device 300.

When the user holds the display device 300 in a state (a vertical state) represented by FIG. 3, either finger except a thumb of the left hand of the user touches the left side area of a back side (referring to FIG. 2), which is the bottom part 305U of the housing 305, on the basis of the center line C31 in FIG. 25. And in the above vertical holding state, either finger except a thumb of the right hand of the user touches the right side area of the back side of the housing 305 which is the bottom part 305U on the basis of the center line C31 in FIG. 25.

Further, when the user holds the display device 300 in the horizontal state which is rotated the display device in the right direction at 90 degrees form the arrangement state of the display device 300 depicted by FIG. 25, either finger except a thumb of the left hand of the user touches the left side area of a back side, which is the bottom part 305U of the housing 305, on the basis of the center line C32 in FIG. 25. And in the above horizontal holding state, either finger except a thumb of the right hand of the user touches the right side area of the back side of the housing 305 which is the bottom part 305U on the basis of the center line C32 in FIG. 25.

In the vertical state of the display device, the strain sensor 311 detects strain on the bottom part 305U of the housing 305 in the left side area or the right side area on the basis of the center line C31 of the housing 305, and outputs the detected level (below, called as output level appropriately). In the horizontal state of the display device, the strain sensor 311 detects strain on the bottom part 305U of the housing 305 in the left side area or the right side area on the basis of the center line C32 of the housing 305, and outputs the output level. The strain, of which the strain sensor 311 detects, is strain of the housing 305 which occurs based on the operation of the user to the bottom part 305U of the housing 305.

The hardware construction of the display device 300 according to the third embodiment is same as the hardware construction which was explained by FIG. 20 except the strain sensor 311. Therefore, the illustration of the hardware construction is omitted.

(Strain Sensor)

Figure 26:
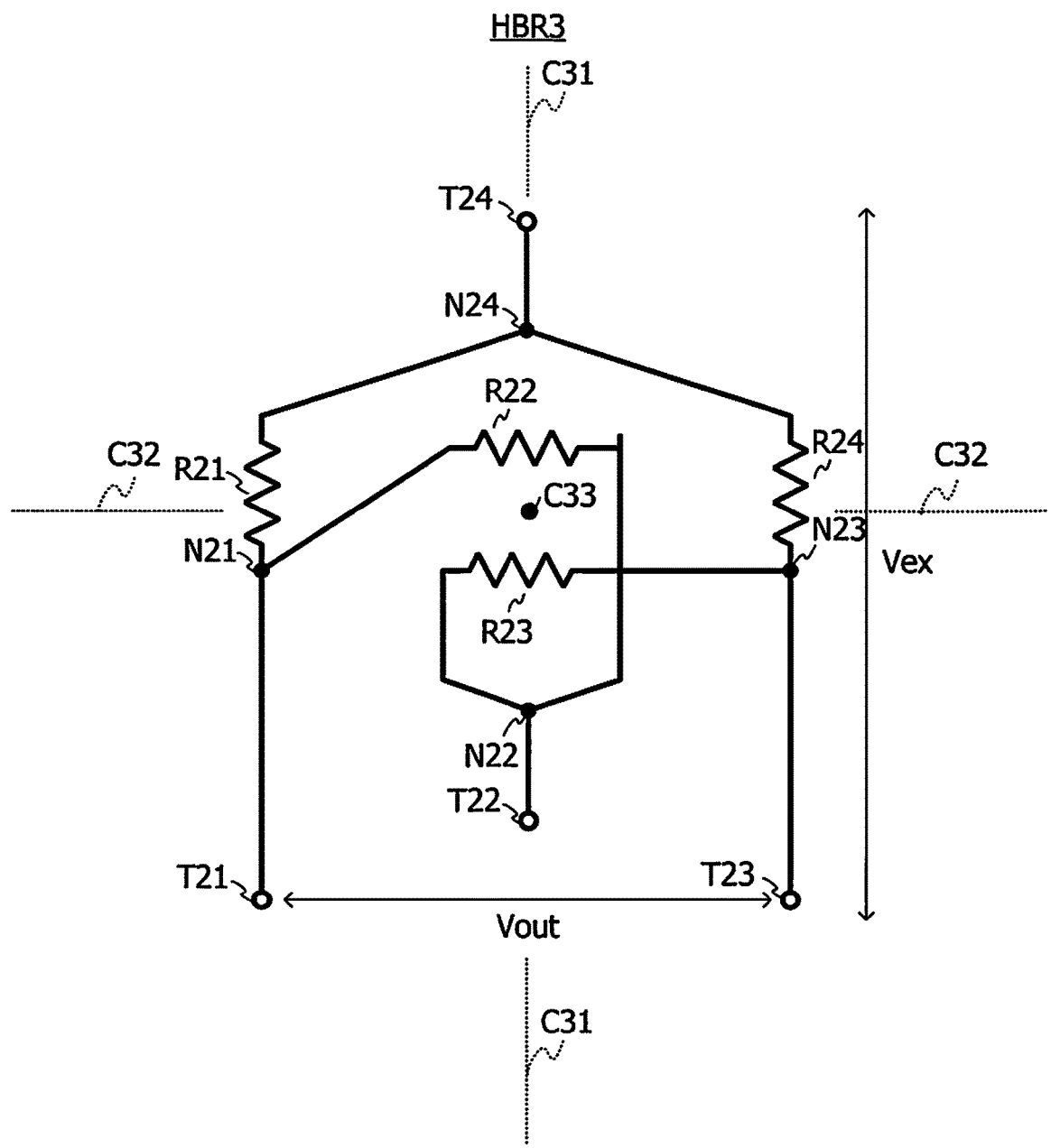
FIG. 26 is a diagram illustrating an example of circuit in the strain sensor 311 depicted by FIG. 25.

FIG. 26 is a diagram illustrating an example of circuit in the strain sensor 311 depicted by FIG. 25. In FIG. 26, single strain sensor 311 is constituted by a bridge circuit HBR3. The bridge circuit HBR3 is a bridge circuit having four resistance R21-resistance R24. All of the four resistance R21-the resistance R24 are constructed by the strain gauges.

One end of the first resistance R21 is connected to one end of the second resistance R22. And a connection point with the first resistance R21 and the second resistance R22 is represented by a reference sign N21. Another end of the second resistance R22 is connected to one end of third resistance R23. And a connection point with the second resistance R22 and the third resistance R23 is represented by a reference sign N22. Another end of the third resistance R23 is connected to one end of the fourth resistance R24. And a connection point with the third resistance R23 and the fourth resistance R24 is represented by a reference sign N23. Another end of the fourth resistance R24 is connected to another end of the first resistance R21. And a connection point with the fourth resistance R24 and the first resistance R21 is represented by a reference sign N24. Dotted lines represented by reference signs C31, C32 in FIG. 26 indicate the center lines C31, C32 in FIG. 25. A reference sign C33 indicates a cross point of the center lines C31, C32. This cross point is a center point of the display device 300.

In the bridge circuit HBR3, the first resistance R21 is located in an opposite position to the fourth resistance R24 on the basis of the center line C31 of the housing 305 along the long side of the housing 305 (referring to FIG. 25). Further, in the bridge circuit HBR3, the second resistance R22 is located in an opposite position to the third resistance R23 on the basis of the center line C32 of the housing 305 along the short side of the housing 305 (referring to FIG. 25).

The bridge circuit HBR3 receives the supply of power supply voltage Vex through a terminal T24 of the connection point N24 and a terminal T22 of the connection point N22. Low voltage is supplied to the terminal T22, and high voltage is supplied to the terminal T24.

The bridge circuit HBR3 outputs a potential difference between the terminal T21 of the connection point N21 and the terminal T23 of the connection point N23, as voltage Vout. The terminal T23 is a positive terminal, and the terminal T21 is a negative terminal. This output voltage Vout is an output level of the strain sensor 311. Here, the output voltage Vout is expressed by a following expression 3. In addition, in the expression 3, "R21"-"R24" indicate a resistance level of the first resistance R21-the fourth resistor R24.

$$V\text{out}=((R23/(R23+R24))-(R22/(R21+R22)))\times V\text{ex} \quad \text{(expression 3)}$$

In addition, when a strain is not added to the strain gauge (strain detecting element), the resistance level of all the strain gauges is same level.

Here, the strain gauge is a resistance in which the resistance level increases as the strain added to the strain gauge increases.

The arrangement state of the circuit construction in FIG. 26 is a state that the user holds the display device 300 in the vertical state. In this time, when the left twist operation is carried out, the strain is added to the resistance R21. Thereby, the resistance level of the resistance R21 which is the strain gauge increases and the output voltage Vout of the strain sensor 311 becomes positive level. While, when the right twist operation is carried out, the strain is added to the resistance R24. Thereby, the resistance level of the resistance R24 which is the strain gauge increases and the output voltage Vout of the strain sensor 311 becomes negative level.

The user holds the display device 300 in the horizontal state which is rotated in the right direction at 90 degrees from the vertical state depicted by FIG. 26. In this time, when the left twist operation is carried out, the strain is added to the resistance R23. Thereby, the resistance level of the resistance R23 which is the strain gauge increases and the output voltage Vout of the strain sensor 311 becomes positive level. While, when the right twist operation is carried out, the strain is added to the resistance R22. Thereby, the resistance level of the resistance R22 which is the strain gauge increases and the output voltage Vout of the strain sensor 311 becomes negative level.

While, the user holds the display device 300 in the horizontal state which is rotated in the left direction at 90 degrees from the vertical state depicted by FIG. 26. In this time, when the left twist operation is carried out, the strain is added to the resistance R22. Thereby, the resistance level of the resistance R22 which is the strain gauge increases and the output voltage Vout of the strain sensor 311 becomes negative level. While, when the right twist operation is carried out, the strain is added to the resistance R23. Thereby, the resistance level of the resistance R23 which is the strain gauge increases and the output voltage Vout of the strain sensor 311 becomes positive level.

While, the user holds the display device 300 in the vertical state which is rotated in the right or left direction at 180 degrees from the vertical state depicted by FIG. 26. In this time, when the left twist operation is carried out, the strain is added to the resistance R24. Thereby, the resistance level of the resistance R24 which is the strain gauge increases and the output voltage Vout of the strain sensor 311 becomes negative level. While, when the right twist operation is carried out, the strain is added to the resistance R21. Thereby, the resistance level of the resistance R21 which is the strain gauge increases and the output voltage Vout of the strain sensor 311 becomes positive level.

In the state that the user holds the display device 300 in the vertical state or the horizontal state, the display device 300 determines whether the left twist operation is carried out or the right twist operation is carried out by using the change of above the output voltage Vout.

(Software Module)

Figure 27:
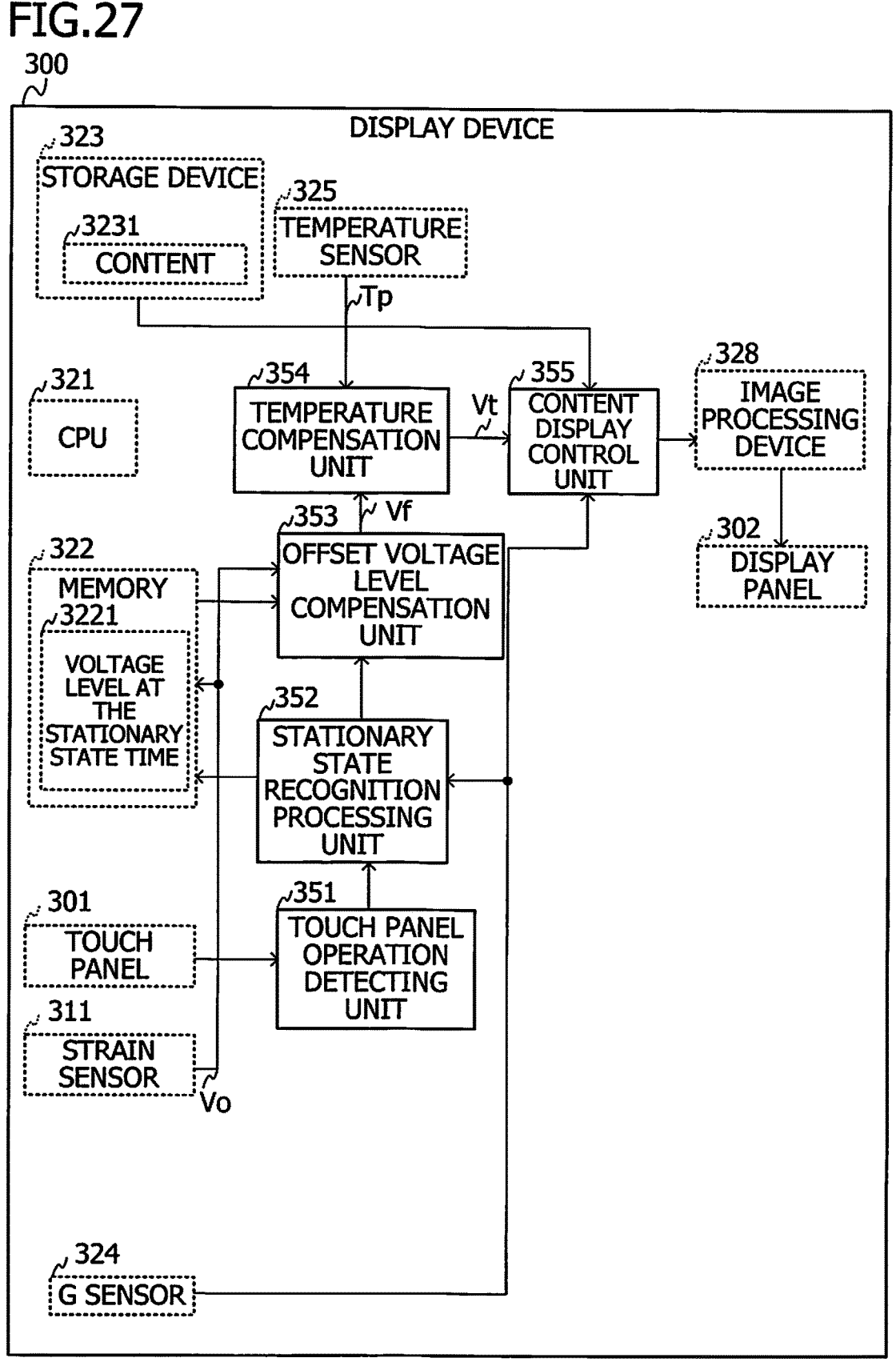
FIG. 27 is a diagram illustrating an example of a block diagram of software modules in the display device 300 according to the third embodiment.

FIG. 27 is a diagram illustrating an example of a block diagram of software modules in the display device 300 according to the third embodiment. In FIG. 27, the touch panel 301, the display panel 302, a CPU 321, a memory 322, and a storage device 323, have same functions as the touch panel 201, the display panel 202, the CPU 221, the memory 222, and the storage device 223 illustrated by FIG. 20. Further, in FIG. 27, a G sensor 324, a temperature sensor 325 and a image processing device 328, have same functions as the G sensor 224, the temperature sensor 225 and the image processing device 228 illustrated by FIG. 20.

In FIG. 27, the touch panel 301, the display panel 302, the strain sensor 311, the CPU 321, the memory 322, the storage device 323, the G sensor 324, the temperature sensor 325 and the image processing device 328, which are hardware components explained by FIG. 20, are represented by a dotted line. Similarly, the input interface device 227, the input interface device 229, and the outside connection interface device 230, which are illustrated by FIG. 20, are omitted illustration because it is unnecessary in the explanation of FIG. 27.

A touch panel operation detecting unit 351 detects the touch position, a touch time and a level of the pressure that is added when the user touched, based on the output result that the touch panel 301 outputs when the user touched the touch panel 301 with fingers.

A stationary state recognition processing unit 352 determines that whether or not the swinging of the display device 300 is within a predetermined swing range, based on a detecting result of the touch panel 301 which functions as a swinging state sensing device, and the G sensor 324 which functions as the swinging state sensing device, which was explained by FIG. 12 and FIG. 13. Specifically, the stationary state recognition processing unit 352 determines that whether or not the swinging of the display device 300 is within a predetermined swing range, based on the output level of the G sensor 324 and the detecting result of the touch panel operation detecting unit 351. And the stationary state recognition processing unit 352 carries out processing to store the output voltage level of the strain sensor 311 in the memory 322 when determined that the swing of the display device 300 is within a predetermined swing range. The output voltage levels of the strain sensor 311 in this stationary state, is described as voltage level at stationary state time, appropriately. That is, the output level of the strain sensor 311, of which the stationary state recognition processing unit 352 stores in the memory 322, is the voltage level at the stationary state 3221.

An offset voltage level compensation unit 353 compensates the output voltage level Vo of the strain sensor 311 based on the voltage level at the stationary state 3221 in the memory 322 and outputs the output voltage level Vf to the temperature compensation unit 354. The compensation, for example, is to calculate a difference between the voltage level at the stationary state 3221 and the output voltage level Vo. The output voltage level Vf is the output voltage level Vo after the offset compensation.

A temperature compensation unit 354 compensates the output voltage level Vf, of which the offset voltage level compensation unit 353 outputs, based on a temperature correction factor corresponding to a temperature Tp of which the temperature sensor 325 outputs, as explained by FIG. 14. And the temperature compensation unit 354 outputs the output voltage level Vt to the content display control unit 355. The output voltage level Vt is a output voltage level Vf after the temperature compensation.

The content display control unit 355, based on the operation of the user, reads the content 3231 in the storage device 323, and outputs it to the display panel 302 through the image processing device 328. The content is electronic data having information for the display, and is called the content data. For example, the content 3231 is electronic book data and moving picture data. In the case of the electronic book data, the content display control unit 355 displays the content 3231, which is read, to the display panel 302 through the image processing device 328, for example, as illustrated by FIG. 4. In addition, in the case of the moving picture, the content display control unit 355 displays the content 3231 which is read to the display device through the image processing device 328, as the moving picture.

The content display control unit 355 determines whether the display device 300 is a vertical state or a horizontal state, based on the output level of the G sensor 324. Then the content display control unit 355 carries out the display process which determines whether the output voltage level Vt is less than a predetermined level and controls changing of the display content to the first display state or to the second display state which is different from the first display state, based on the determination result, for example. Further, the content display control unit 355 determines the changing speed in the changing control based on the absolute level of the output level Vt, and carries out the changing control based on the determined scroll speed.

The changing control, the first display state, the second display state and the changing speed were explained in FIG. 12. Therefore, these explanations are omitted.

The touch panel operation detecting unit 351, the stationary state recognition processing unit 352, the offset voltage level compensation unit 353, the temperature compensation unit 354, and the content display control unit 355 are so-called programs. And, for example, these programs are stored in the storage device 323. The CPU (referring to the CPU 221 in FIG. 20) in the display device 300 retrieves these programs from the storage device 323 at the time of start, and develops it in the memory 322 for functionalizing these programs as software modules.

In addition, these programs may be recorded in the recording medium 230a which is explained in FIG. 20. In this case, the CPU 321 (referring to the CPU 221 in FIG. 20) in the display device 300 retrieves these programs at the time of start from the recording medium 230a attached to the outside connection interface device 230, and develops it in the memory 322, and functionalizes these programs as a software module.

(Display Processing)

Display processing will be explained as follows. Here, the content 3231 in FIG. 27 is electronic book data. The content display control unit 355 displays the content 3231 which is read to the display panel 302 through the image processing device 328, as represented by FIG. 4, for example. The stationary state recognition processing unit 352 stores the voltage level at the stationary state 3221 in the memory 322, as already explained in FIG. 13.

And the offset voltage level compensation unit 353 compensates the output voltage level Vo of the strain sensor 311 based on the voltage level at the stationary state 3221 in the memory 322 and outputs the output voltage level Vf to the temperature compensation unit 354. Further, the temperature compensation unit 354 compensates the output voltage level Vf based on the temperature Tp, of which the temperature sensor 325 outputs, and outputs the output voltage level Vt to the content display control unit 355. Here, the content display control unit 355 carries out the display processing.

Figure 28:
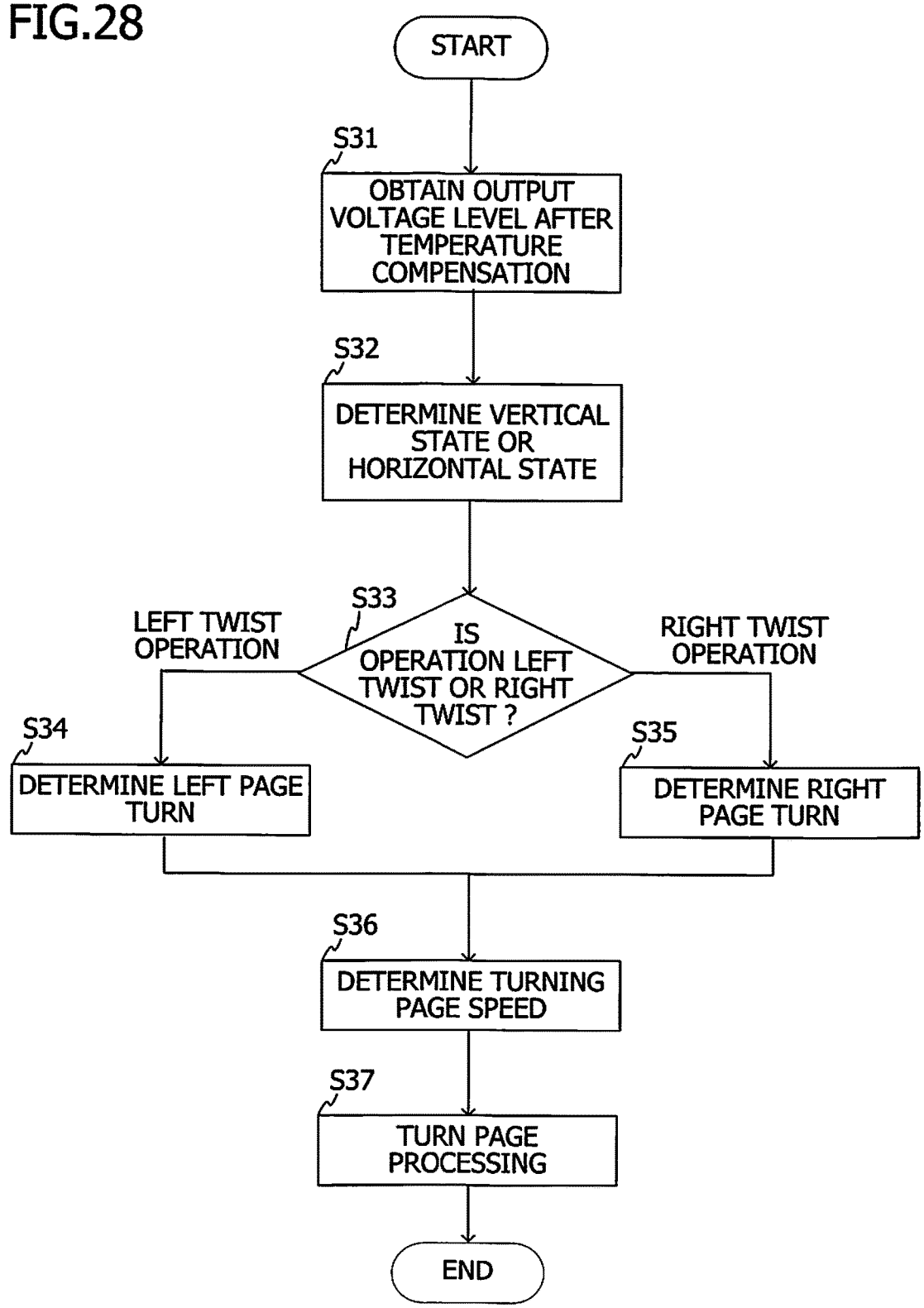
FIG. 28 is a diagram illustrating a flow to explain the display processing that the content display control unit 355 carries out.

FIG. 28 is a diagram illustrating a flow to explain the display processing that the content display control unit 355 carries out.

Step S31: The content display control unit 355 acquires the output voltage level Vf (output voltage level Vt) after the temperature compensation.

Step S32: The content display control unit 355 determines whether the holding state of the display device 300 is the vertical state or the horizontal state, based on the output level of the G sensor. In this time, the content display control unit 355 determines whether the display device 300 is the vertical state (described as a first vertical state appropriately) represented by FIG. 4 or is the horizontal state (described as a first horizontal state appropriately) which is rotated in the right direction at 90 degrees from the vertical state represented by FIG. 4. Further, the content display control unit 355 determines whether the display device 300 is the horizontal state (described as a second horizontal state appropriately) which is rotated in the left direction at 90 degrees from the vertical state represented by FIG. 4 or is the vertical state (described as a second vertical state appropriately) which is rotated in the left direction or the right direction at 180 degrees from the vertical state represented by FIG. 4.

Step S33: The content display control unit 355 determines whether the left twist operation was performed or the right twist operation was carried out. Specifically, the content display control unit 355 determines whether or not the output voltage level Vt is less than the predetermined level. In this determination time, the content display control unit 355 refers to the holding state which is determined by the step S32.

Specially, when the content display control unit 355 determined that the display device 300 is the first vertical state or the first horizontal state in the step S32, and determined that the output voltage level is not less than the predetermined level (for example, "0"), the content display control unit 355 determines that the left twist operation was performed (step S33/left twist operation), and moves to step S34. In addition, when the content display control unit 355 determined that the display device 300 is the second vertical state or the second horizontal state in the step S32, and determined that the output voltage level is less than the predetermined level, the content display control unit 355 determines that the left twist operation was performed (step S33/left twist operation), and moves to step S34.

Step S34: The content display control unit 355 determines to carry out the left page turning processing. On the other hand, when the content display control unit 355 determined that the display device 300 is the first vertical state or the first horizontal state in the step S32, and determined that the output voltage level is less than the predetermined level, the content display control unit 355 determines that the right twist operation was performed (step S33/right twist operation), and moves to step S35. In addition, when the content display control unit 355 determined that the display device 300 is the second vertical state or the second horizontal state in the step S32, and determined that the output voltage level is not less than the predetermined level (for example, "0"), the content display control unit 355 determines that the right twist operation was performed (step S33/right twist operation), and moves to step S35.

Step S35: The content display control unit 355 determines to carry out the right page turning processing. The content display control unit 355 moves to step S36 after execution of step S34 or step S35.

Step S36: The content display control unit 355 determines the page turning speed based on the output voltage level Vt. In this time, the content display control unit 255 determines the page turning speed so that the page turning speed increases as the absolute level of the output voltage level increases. In other words, the content display control unit 355 determines the changing speed in the changing control based on the absolute level of the output voltage level Vt.

Step S37: The content display control unit 355 carries out the page turning processing. Specifically, the content display control unit 355 carries out the left page turning processing based on the page turning speed which is determined in the step S36, when determining that the left twist operation was performed in step S33 (step S33/left twist operation). On the other hand, the content display control unit 355 carries out the right page turning processing based on the page turning speed which is determined in the step S36, when determining that the right twist operation was performed in step S33 (step S33/right twist operation).

The content display control unit 355 carries out the process of FIG. 28 in response to inputs of the output voltage level Vt. Therefore, the content display control unit 355 carries out the left page turning processing while the left twist operation is performed, and carries out the right page turning processing while the right twist operation is performed. As a result, while each twist operation is carried out, a page is rolled up fluently, thereby it is possible to move to the page that the user wishes to read.

According to the display device in the present embodiment, following effect is performed in addition to the effects which are explained by the first embodiment. That is, according to the third embodiment, it is possible to determine whether the left twist operation was performed or the right twist operation was carried out by single strain sensor, because the strain sensor is constituted by the bridge circuit HBR3 as depicted by FIG. 26.

In addition, according to the third embodiment, because the number of the strain sensor is one, it is possible to reduce the number of the strain sensor, and to reduce production cost. Further, because single strain sensor is provided in the display device, it is possible to prevent that the physical space in the display device makes narrow.

In addition, the above temperature compensation processing may not carry out. In this case, the temperature sensor 325 and the temperature compensation unit 354, which is explained in FIG. 27, is not needed. When the above temperature compensation processing is not carried out, the offset voltage level compensation unit 353 outputs the output voltage level Vf to the content display control unit 355. The content display control unit 355 carries out the determination process in the step S33 in FIG. 28 and controls to change the display content of the content based on the output voltage level Vf. By this construction, because the temperature sensor for detecting the temperature of the strain sensor becomes needless, it is possible to reduce production cost.

When it is possible to neglect the detecting unevenness because the strain sensor has a high precision, it is possible to not carry out the detecting unevenness compensation processing of the strain sensor in addition to not carry out the temperature compensation processing. In this case, the offset voltage level compensation unit 353, which is explained by FIG. 27, is not needed. When the detecting unevenness compensation processing of the strain sensor is not carried out, the strain sensor 311 outputs the output voltage level Vo to the content display control unit 355. The content display control unit 355 carries out the determination process in the step S33 in FIG. 28 and controls to change the display content of the content based on the output voltage level Vo. By this construction, because the compensation processing is not needed, it is possible to reduce the processing amount of the display device 300. Further, by the reduction of the processing amount, it is possible to shorten a time from an operation of the user until the carry out of the changing control of the display content, and to improve a response for the operation.

Fourth Embodiment

In the first and the second embodiments, in order to detect the strain, at least two strain gauges are used. And in the third embodiment, in order to detect the strain, four strain gauges are used. However, it is preferable to reduce the number of the strain gauge in order to reduce production cost. In the fourth embodiment, the display device controls the changing by using single strain gauge.

The outer appearance of the display device according to the fourth embodiment is same as the outer appearance of the display device 100 which is explained by FIG. 1 and FIG. 2.

Figure 29:
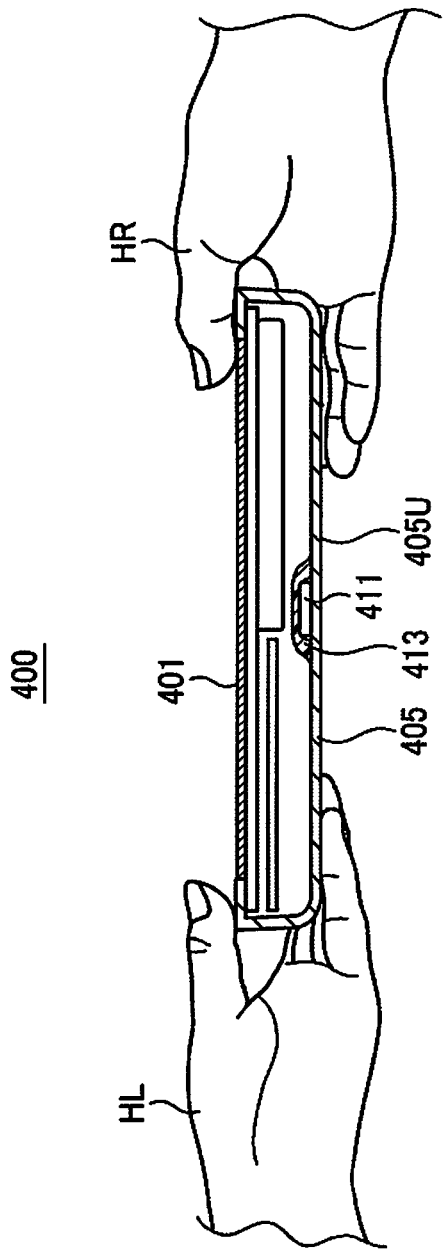
FIG. 29 is a diagram illustrating a cross section of the display device 400 in a state that the user holds the display device 400.

FIG. 29 is a diagram illustrating a cross section of the display device 400 in a state that the user holds the display device 400. This cross section diagram corresponds to the cross section of A-A' line in FIG. 1 and FIG. 2. The display device 400 has a touch panel 401, a housing 405, and a strain sensor 411. The touch panel 401 is provided on the display side of the display device 400 and detects a position of which the user touches. The strain sensor 411 is attached to the bottom part 405U of the housing 405, by the adhesive material, for example. The bottom part 405U of the housing 405 is also called as a bottom plate of the housing 405. In the cross sectional diagram in FIG. 29, illustration of display panel, battery and a printed circuit are omitted.

Here, the user holds the left and right edges of the housing 405 in the display device 400 by using the right hand HR and the left hand HL. In this holding, the user hangs a thumb of the right hand HR to the right edge of the touch panel 401 and supports the back side of the housing 405 by the other fingers. In this time, the thumb of the right hand HR touches lightly to the touch panel 401.

Further, in this holding, the user hangs a thumb of the left hand HL to the front face of the housing 405 and supports the back side of the housing 405 by the other fingers. In this time, the thumb of the left hand HL does not touch to the touch panel 401.

Figure 30:
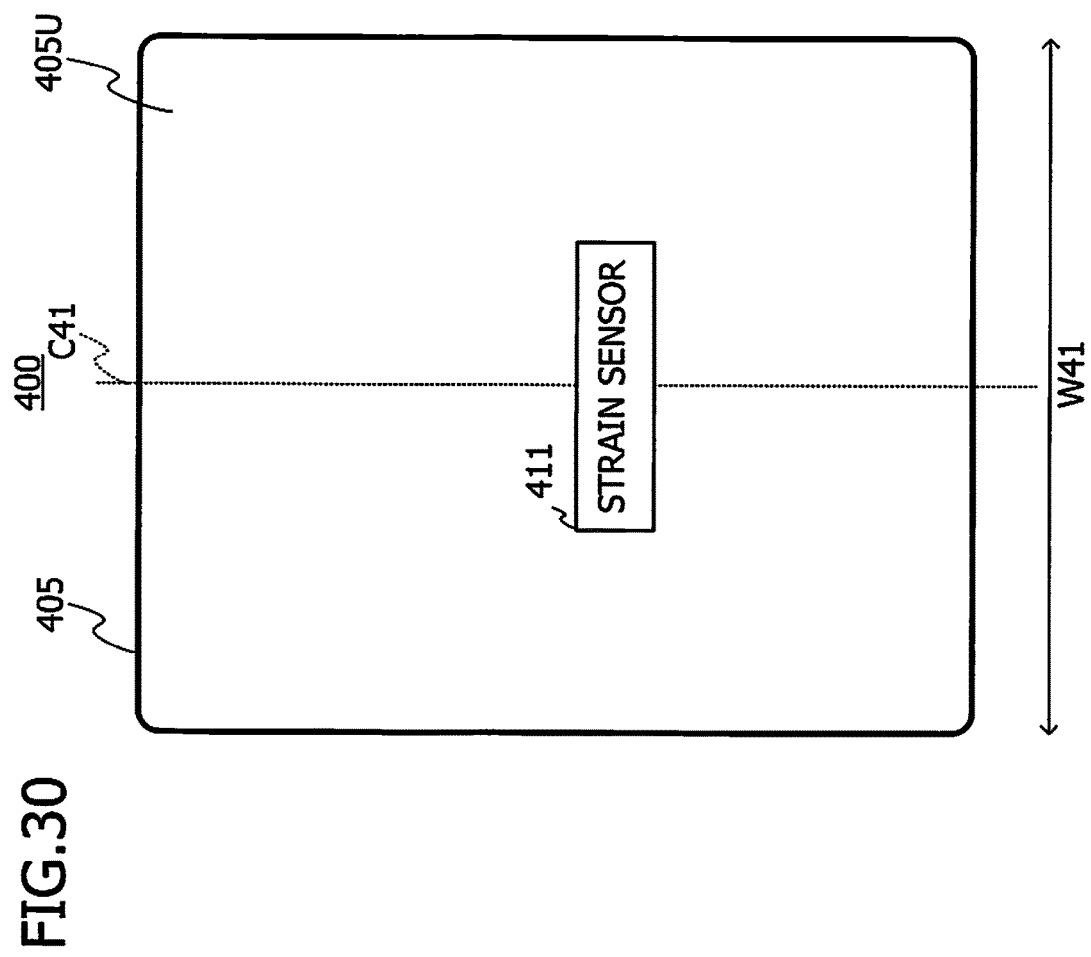
FIG. 30 is a diagram schematically illustrating arrangement status of the strain sensor 411 on the bottom part 405U of the housing 405.

FIG. 30 is a diagram schematically illustrating arrangement status of the strain sensor 411 on the bottom part 405U of the housing 405. In FIG. 30, a dotted line marked by a reference sign C41 indicates a center of a width W41 on a short side of a rectangle. The strain sensor 411 is located on a center line C41 of the display device 400, for example. In other words, the display device 400 has the strain sensor 411 on the bottom part 405U of the housing 405 which is opposite to the display panel of the display device 400.

The strain sensor 411 detects the strain of the housing 405 which occurs based on the operation of the user to the bottom part 405U of the housing 405 and outputs a detected level (below, described as output level appropriately).

The hardware construction of the display device 400 according to the fourth embodiment is same as the hardware construction which was explained by FIG. 20 except the strain sensor 411. Therefore, the illustration of the hardware construction is omitted. Further, the circuit diagram of the strain sensor 411 is same as the circuit diagram depicted by FIG. 10. Therefore, the illustration of the circuit diagram is omitted.

(Software Module)

Figure 31:
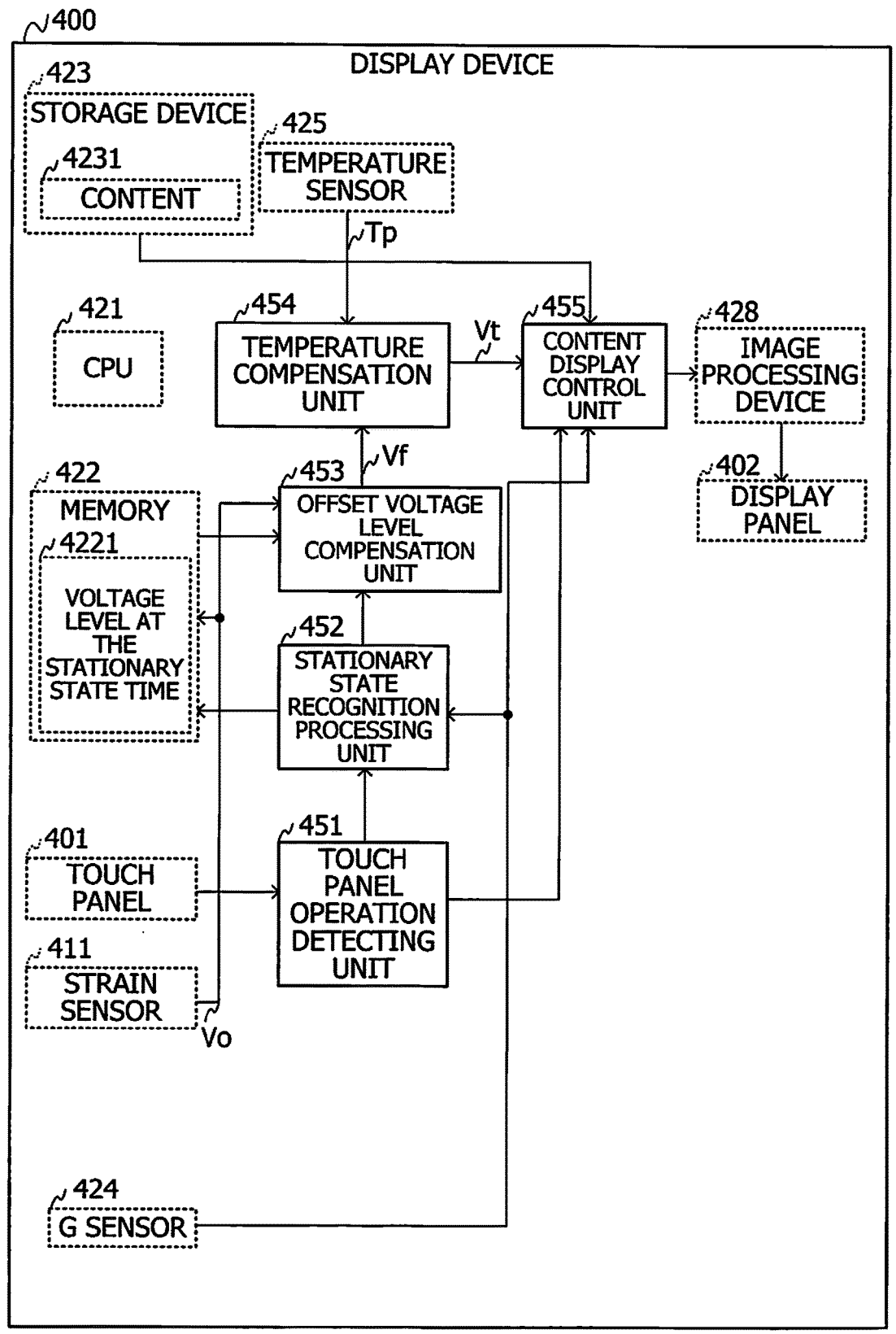
FIG. 31 is a diagram illustrating an example of a block diagram of software modules in the display device 400 according to the fourth embodiment.

FIG. 31 is a diagram illustrating an example of a block diagram of software modules in the display device 400 according to the fourth embodiment. In FIG. 31, the touch panel 401, the display panel 402, a CPU 421, a memory 422, and a storage device 423, have same functions as the touch panel 201, the display panel 202, the CPU 221, the memory 222, and the storage device 223 illustrated by FIG. 20. Further, in FIG. 31, a G sensor 424, a temperature sensor 425 and a image processing device 428, have same functions as the G sensor 224, the temperature sensor 225 and the image processing device 228 illustrated by FIG. 20. In addition, the display panel 402 is one example of the display unit.

In FIG. 31, the touch panel 401, the display panel 402, the strain sensor 411, the CPU 421, the memory 422, the storage device 423, the G sensor 424, the temperature sensor 425 and the image processing device 428, which are hardware components explained by FIG. 20, are represented by a dotted line. Similarly, the input interface device 227, the input interface device 229, and the outside connection interface device 230, which are illustrated by FIG. 20, are omitted illustration because it is unnecessary in the explanation of FIG. 31.

A touch panel operation detecting unit 451 detects the touch position, a touch time and a level of the pressure that is added when the user touched, based on the output result that the touch panel 401 outputs when the user touched the touch panel 401 with fingers.

A stationary state recognition processing unit 452 determines that the swinging of the display device 400 is within a predetermined swing range, based on a detecting result of the touch panel 401 which functions as the swinging state sensing device, and the G sensor 424 which functions as the swinging state sensing device, which was explained by FIG. 12 and FIG. 13. Specifically, the stationary state recognition processing unit 452 determines that the swinging of the display device 400 is within a predetermined swing range, based on the output level of the G sensor 424 and the detecting result of the touch panel operation detecting unit 451. And the stationary state recognition processing unit 452 carries out processing to store the output voltage level of the strain sensor 411 in the memory 422 when determined that the swing of the display device 400 is within a predetermined swing range. The output voltage level of the strain sensor 411 in this stationary state, is described as voltage level at stationary state time, appropriately. That is, the output level of the strain sensor 411, of which the stationary state recognition processing unit 452 stores in the memory 422, is the voltage level at the stationary state 4221.

An offset voltage level compensation unit 453 compensates the output voltage level Vo of the strain sensor 411 based on the voltage level at the stationary state 4221 in the memory 422 and outputs the output voltage level Vf to the temperature compensation unit 454. The compensation, for example, is to calculate a difference between the voltage level at the stationary state 4221 and the output voltage level Vo. The output voltage level Vf is the output voltage level Vo after the offset compensation.

A temperature compensation unit 454 compensates the output voltage level Vf, of which the offset voltage level compensation unit 453 outputs, based on a temperature correction factor corresponding to a temperature Tp of which the temperature sensor 425 outputs, as explained by FIG. 14. And the temperature compensation unit 454 outputs the output voltage level Vt to the content display control unit 455. The output voltage level Vt is a output voltage level Vf after the temperature compensation.

The content display control unit 455, based on the operation of the user, reads the content 4231 in the storage device 423, and outputs it to the display panel 402 through the image processing device 428. The content is electronic data having information for the display, and is called the content data. For example, the content 4231 is electronic book data and moving picture data. In the case of the electronic book data, the content display control unit 455 displays the content 4231, which is read, to the display panel 402 through the image processing device 428, for example, as illustrated by FIG. 4. In addition, in the case of the moving picture, the content display control unit 455 displays the content 4231 which is read to the display device through the image processing device 428, as the moving picture.

The content display control unit 455 determines whether the display device 400 is a vertical state or a horizontal state, based on the output level of the G sensor 424. Then the content display control unit 455 controls changing of the display content to the first display state or to the second display state which is different from the first display state, based on the touch position of the user, for example. Further, the content display control unit 455 determines the changing speed in the changing control based on the absolute level of the output voltage level Vt, and carries out the changing control based on the determined scroll speed.

The touch panel operation detecting unit 451, the stationary state recognition processing unit 452, the offset voltage level compensation unit 453, the temperature compensation unit 454, and the content display control unit 455 are so-called programs. And, for example, these programs are stored in the storage device 423. The CPU 421 (referring to the CPU 221 in FIG. 20) in the display device 400 retrieves these programs from the storage device 423 at the time of start, and develops it in the memory 422 for functionalizing these programs as software modules.

In addition, these programs may be recorded in the recording medium 230a which is explained in FIG. 20. In this case, the CPU 421 (referring to the CPU 221 in FIG. 20) in the display device 400 retrieves these programs at the time of start from the recording medium 230a attached to the outside connection interface device 230, and develops it in the memory 422, and functionalizes these programs as a software module.

(Display Processing)

Display processing will be explained as follows. Here, the content 4231 in FIG. 31 is electronic book data. The content display control unit 455 displays the content 4231 which is read to the display panel 402 through the image processing device 428, as represented by FIG. 4, for example. The stationary state recognition processing unit 452 stores the voltage level at the stationary state 4221 in the memory 422, as already explained in FIG. 13.

And the offset voltage level compensation unit 453 compensates the output voltage level Vo of the strain sensor 411 based on the voltage level at the stationary state 4221 in the memory 422 and outputs the output voltage level Vf to the temperature compensation unit 454. Further, the temperature compensation unit 454 compensates the output voltage level Vf based on the temperature Tp, of which the temperature sensor 425 outputs, and outputs the output voltage level Vt to the content display control unit 455. Here, the content display control unit 455 carries out the display processing.

Figure 32:
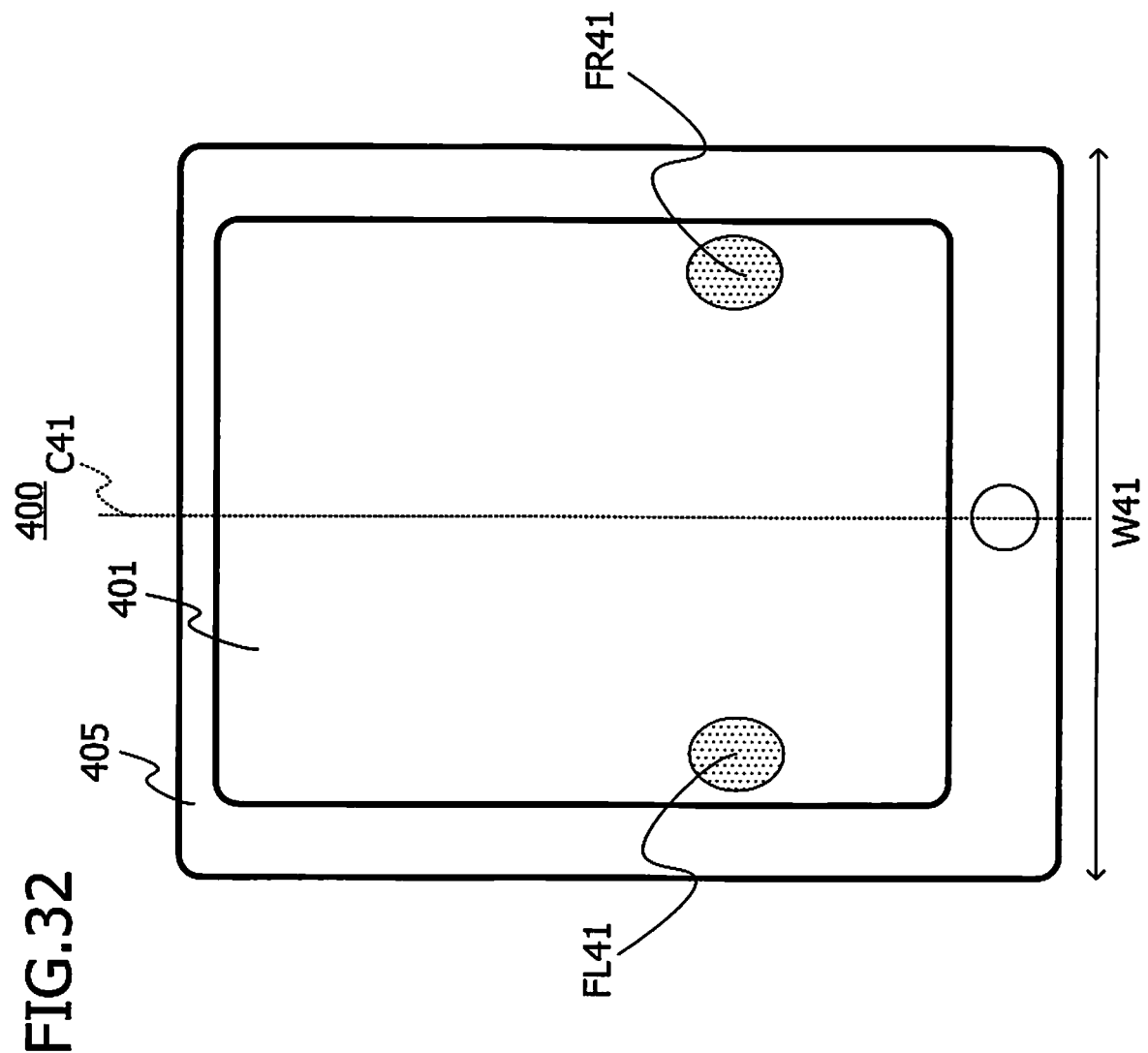
FIG. 32 is a diagram schematically illustrating the display device 400 in the vertical state.

FIG. 32 is a diagram schematically illustrating the display device 400 in the vertical state. In FIG. 32, a dotted line marked by a reference sign C41 indicates a center of a width W41 on a short side of a rectangle, as described in FIG. 30. A reference sign FR41 indicates a position in which the user touches the touch panel 401 by the thumb of the right hand in a state that the user holds the display device 400 in the vertical state by both hands, as explained by FIG. 29. A reference sign FL41 indicates a position in which the user touches the touch panel 401 by the thumb of the left hand in a state that the user holds the display device 400 in the vertical state by both hands, as explained by FIG. 29.

Figure 33:
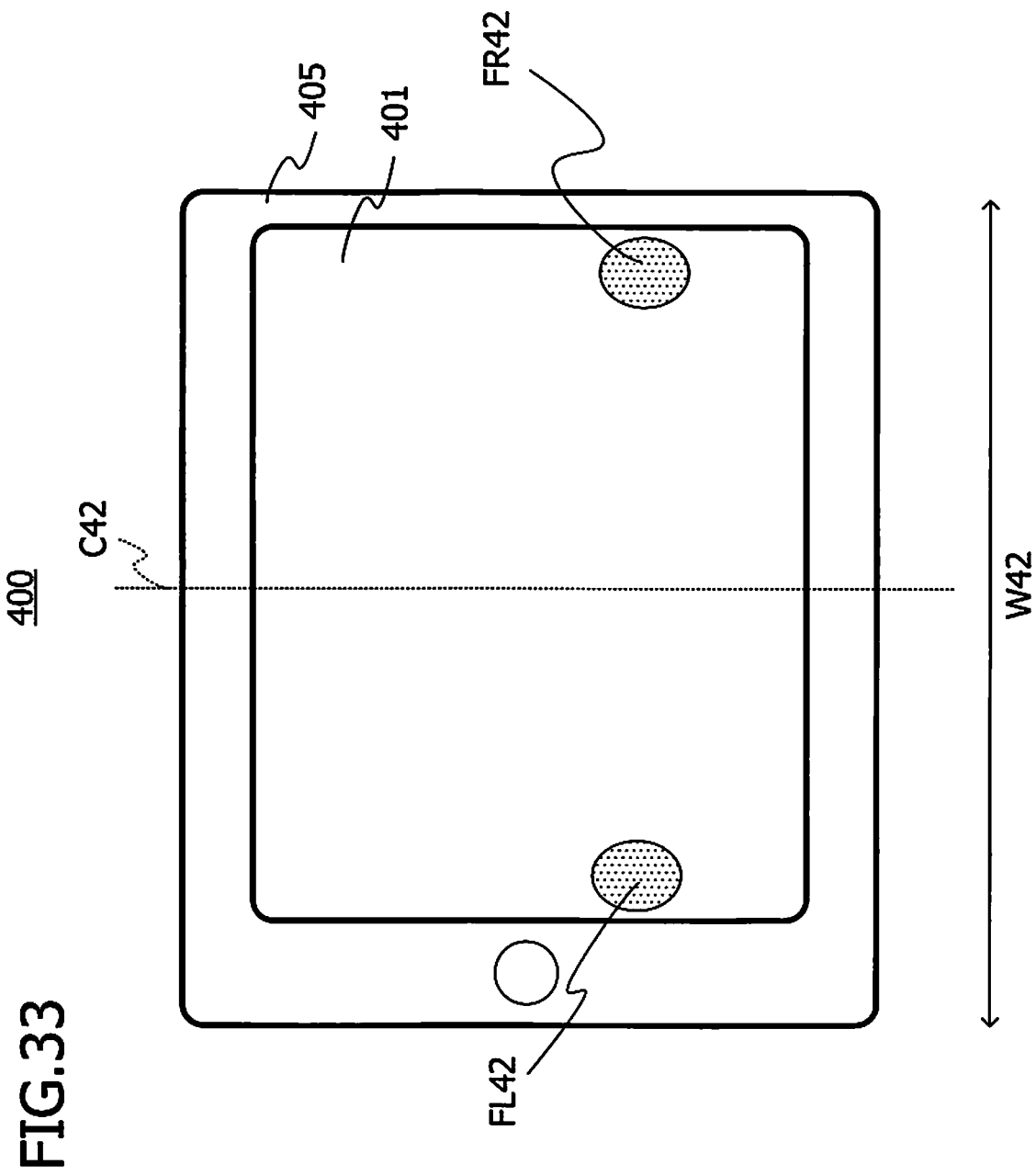
FIG. 33 is a diagram schematically illustrating the display device 400 in the horizontal state.

FIG. 33 is a diagram schematically illustrating the display device 400 in the horizontal state. In FIG. 33, a dotted line marked by a reference sign C42 indicates a center of a width W42 on a long side of a rectangle. A reference sign FR42 indicates a position in which the user touches the touch panel 401 by the thumb of the right hand in a state that the user holds the display device 400 in the horizontal state by both hands. A reference sign FL42 indicates a position in which the user touches the touch panel 401 by the thumb of the left hand in a state that the user holds the display device 400 in the horizontal state by both hands.

FIG. 34 is a diagram illustrating a flow to explain the display processing that the content display control unit 455 carries out.

Step S41: The content display control unit 455 determines whether the holding state of the display device 400 is the vertical state (referring to FIG. 32) or the horizontal state (referring to FIG. 33), based on the output level of the G sensor 424.

Step S42: The content display control unit 455 determines the touch position of the user. Specially, The content display control unit 455 determines whether the user touches the left side or the right side of the touch panel 401 based on coordinates information of the touch position of which the touch panel operation detecting unit 451 outputs.

For example, when the content display control unit 455 determines that the holding state of the display device 400 is the vertical state (referring to FIG. 32) in step S41, following process is executed. That is, when the touch panel operation detecting unit 451 outputs the coordinate information of the left side on the basis of the center line C41 of the vertical state as represented by FIG. 32, the content display control unit 455 determines that the user touches the left side of the touch panel 401. This coordinates information of the left side, for example, is coordinates information in the area indicated by the reference sign FL41 in FIG. 32. While, when the touch panel operation detecting unit 451 outputs the coordinate information of the right side on the basis of the center line C41 of the vertical state as represented by FIG. 32, the content display control unit 455 determines that the user touches the right side of the touch panel 401. This coordinates information of the right side, for example, is coordinates information in the area indicated by the reference sign FR41 in FIG. 32.

Further, for example, when the content display control unit 455 determines that the holding state of the display device 400 is the horizontal state (referring to FIG. 33) in step S41, following process is executed. That is, when the touch panel operation detecting unit 451 outputs the coordinate information of the left side on the basis of the center line C42 of the horizontal state as represented by FIG. 33, the content display control unit 455 determines that the user touches the left side of the touch panel 401. This coordinates information of the left side, for example, is coordinates information in the area indicated by the reference sign FL42 in FIG. 33. While, when the touch panel operation detecting unit 451 outputs the coordinate information of the right side on the basis of the center line C42 of the horizontal state as represented by FIG. 33, the content display control unit 455 determines that the user touches the right side of the touch panel 401. This coordinates information of the right side, for example, is coordinates information in the area indicated by the reference sign FR42 in FIG. 33.

Step S43: The content display control unit 455 determines whether the user touches the left side or the right side of the touch panel 401 based on the determination result in step S42. When the content display control unit 455 determines that the user touches the left side of the touch panel 401 (step S43/left side touch), the content display control unit 455 moves to step S44.

Step S44: The content display control unit 455 determines to carry out the left page turning processing. On the other hand, when the content display control unit 455 determines that the user touches the right side of the touch panel 401 (step S43/right side touch), the content display control unit 455 moves to step S45.

Step S45: The content display control unit 455 determines to carry out the right page turning processing. The content display control unit 455 moves to step S46 after execution of step S44 or step S45.

Step S46: The content display control unit 455 acquires the output voltage level Vf after temperature compensation (output voltage level Vt).

Step S47: The content display control unit 455 determines the page turning speed based on the output voltage level Vt. In this time, the content display control unit 455 determines the page turning speed so that the page turning speed increases as the absolute level of the output voltage level increases. In other words, the content display control unit 455 determines the changing speed in the changing control based on the absolute level of the output voltage level Vt.

Step S48: The content display control unit 455 carries out the page turning processing. Specifically, the content display control unit 455 carries out the left page turning processing based on the page turning speed which is determined in the step S47, when determining that the user touches the left side of the touch panel 401 in step S43 (step S43/left side touch). On the other hand, the content display control unit 455 carries out the right page turning processing based on the page turning speed which is determined in the step S37, when determining that the user touches the right side of the touch panel 401 in step S43 (step S43/right side touch).

The content display control unit 455 carries out the process of FIG. 43 in response to inputs of the coordinate information. Therefore, the content display control unit 455 carries out the left page turning processing while the left touch operation is performed, and carries out the right page turning processing while the right touch operation is performed. As a result, while each touch operation is carried out, a page is rolled up fluently, thereby it is possible to move to the page that the user wishes to read.

According to the display device in the present embodiment, it is possible that the user, who reads the electronic book, performs the page turn as if the user reads the paper medium book. It is possible that the user performs instruction operation which changes the scroll speed for the display device when the user holds the display device by both hands and reads the electronic book. In addition, it is possible that the user performs an instruction operation which carries out the turn page in a desired direction for the display device, by only touching of the touch panel, when the user holds the display device by both hands and reads the electronic book. Therefore, it is not needed that user touches the touch panel much. As a result, it is possible to prevent the deterioration of the touch panel and the display panel which causes by adding unnecessary power for the touch panel and the display panel.

Further, because the detect unevenness of the strain sensor which detects the twist operation of the user is compensated, it is possible to control the display content (page turn) to reflect the intention of the user exactly. In addition, because the touch panel and the G sensor, which are standard installed in the display device, are used, it is needless to install a special device which detects a stationary state. Therefore, it is possible to reduce production cost.

In addition, the display device according to the embodiment determines page turn speed using one strain sensor having one strain gauge. Therefore, it is possible to determine the page turn speed by only one strain gauge and to prevent the rise of the production cost.

In addition, the above temperature compensation processing may not carry out. In this case, the temperature sensor 425 and the temperature compensation unit 454, which are explained in FIG. 31, are not needed. When the above temperature compensation processing is not carried out, the offset voltage level compensation unit 453 outputs the output voltage level Vf to the content display control unit 455. The content display control unit 455 determines the content changing speed (turn page speed) in the changing control of display the content based on the output voltage level Vf. By this construction, because the temperature sensor for detecting the temperature of the strain sensor becomes needless, it is possible to reduce production cost.

When it is possible to neglect the detecting unevenness because the strain sensor has a high precision, it is possible to not carry out the detecting unevenness compensation processing of the strain sensor in addition to not carry out the temperature compensation processing. In this case, the offset voltage level compensation unit 453, which is explained by FIG. 31, is not needed. When the detecting unevenness compensation processing of the strain sensor is not carried out, the strain sensor 411 outputs the output voltage level Vo to the content display control unit 455. The content display control unit 455 determines the changing speed in the changing control of the display content of the content based on the output voltage level Vo. By this construction, because the compensation processing is not needed, it is possible to reduce the processing amount of the display device 400. Further, by the reduction of the processing amount, it is possible to shorten a time from an operation of the user until the carry out of the changing control of the display content, and to improve a response for the operation.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A display device comprising:
   a display unit;
   an acceleration sensor which detects an acceleration of the display device,
   a strain sensor which detects strain on an opposite side against a surface in which the display unit is provided; and
   a control unit which controls changing of displaying content for the display unit based on a detected level of the strain detected by the strain sensor, which stores, as an offset level, the detected level of the strain sensor when detecting that the acceleration of the display device detected by the acceleration sensor is within a predetermined acceleration range, then offset compensates the detected level of the strain sensor using the offset level.

2. The display device according to claim 1, further comprising a touch panel on the display unit, wherein the control unit determines whether or not a detected acceleration which the acceleration sensor outputs is equal to or less than a predetermined detection level during a predetermined time,
   wherein the control unit determines whether or not a pressure level indicating a pressure added to the touch panel is equal to or less than a predetermined pressure level, and
   wherein the control unit determines that the acceleration is within the predetermined acceleration range when the detected acceleration is equal to or less than the predetermined detection level and the pressure level is equal to or less than the predetermined pressure level.

3. The display device according to claim 1, wherein the display content comprises an electronic book, and
   wherein the control unit displays a page of the electronic book, and carries out a display process of the page turn to a direction where the page number increases or a direction where the page number decreases, based on the detected level of the strain detected by the strain sensor.

4. The display device according to claim 1, wherein the display content comprises a moving picture, and
   wherein the control unit displays the moving picture, and carries out a display process of a fast forward of the moving picture or a display process of a rewind of the moving picture, based on the detected level of the strain detected by the strain sensor.

5. The display device according to claim 1, wherein the strain sensor is provided in a bottom of a housing of the display device on the opposite side of the display unit, detects the strain of the housing caused by an operation of the user to the bottom and outputs the detected level.

6. The display device according to claim 5, wherein
   the display device further comprises a touch panel which is provided in a display face of the display unit and detects a touch position of the user, and
   the control unit controls changing of the display content to a first display state or to a second display state which is different from the first display state, based on the touch position of the user, and determines a changing speed in the changing control based on the detected level of the strain sensor after the offset compensation.

7. The display device according to claim 6,
   further comprising a temperature sensor which detects a temperature of the strain sensor, and
   wherein the control unit controls changing of the display content to a first display state or to a second display state which is different from the first display state, based on the touch position of the user, and determines a changing speed in the changing control based on a compensation factor corresponding to the temperature detected by the temperature sensor.

8. The display device according to claim 5,
   wherein the strain sensor comprises:
   a first strain sensor which is provided in a left area of the bottom of the housing on the basis of a center line of the housing and outputs a first detected level; and
   a second strain sensor which is provided in a right left area of the bottom of the housing on the basis of the center line of the housing and outputs a second detected level; and
   wherein the control unit controls changing of the display content to a first display state or to a second display state which is different from the first display state, based on a first difference level between the first detected level after the offset compensation and the second detected level after the offset compensation.

9. The display device according to claim 8,
   wherein the display device further comprises:
   a first temperature sensor which detects a temperature of the first strain sensor: and
   a second temperature sensor which detects a temperature of the second strain sensor, and
   wherein the control unit temperature compensates the first detected level based on a compensation factor corresponding to the temperature detected by the first temperature sensor, temperature compensates the second detected level based on a compensation factor corresponding to the temperature detected by the second temperature sensor and controls changing of the display content to a first display state or to a second display state which is different from the first display state, based on a second difference level between the first detected level after the temperature compensation and the second detected level after the temperature compensation.

10. The display device according to claim 8, wherein the control unit determines the changing speed in the changing control based on an absolute level of the first difference level.

11. The display device according to claim 5,
    wherein the strain sensor comprises a single strain sensor which is provided in the center line of the housing of the bottom of the rectangular housing which is opposite to the display unit and detects the strain of a right and a left areas of the bottom of the housing on the basis of the center line of the housing and outputs the detected level, and wherein the control unit determines whether the detected level after the offset compensation is less than a predetermined level and controls changing of the display content to a first display state or to a second display state which is different from the first display state, based on a determination result.

12. The display device according to claim 11, wherein the display device further comprises a temperature sensor which is provided in the center line and detects a temperature of the strain sensor, and the control unit temperature compensates the detected level based on a compensation factor corresponding the temperature detected by the temperature sensor, determines that whether or not the detected level after compensation is less than a predetermined level and controls changing of the display content to a first display state or to a second display state which is different from the first display state, based on a determination result.

13. The display device according to claim 11, wherein the control unit determines the changing speed in the changing control based on the detected level after the temperature compensation.

14. The display device according to claim 11, wherein the strain sensor comprises a bridge circuit, the bridge circuit including:
  a first resistor and a fourth resistor which are constructed by a constant resistor element in which a resistance level does not change based on a strain amount; and
  a second resistor and a third resistor which are constructed by a varying resistor element in which the resistance level changes based on the strain amount, and
wherein
  one end of the first resistor connects to one end of the second resistor, another end of the second resistor connects to one end of the third resistor, another end of third resistor connects to one end of the fourth resistor and another end of the fourth resistor connects to another end of the first resistor, and
  the first resistor is allocated to be opposite to the fourth resistor and the second resistor is allocated to be opposite to the third resistor on the basis of the center line, and
wherein the bridge circuit outputs a potential difference between a first connection point of the first resistor and the second resistor and a second connection point of the third resistor and the fourth resistor as the detected level.

15. The display device according to claim 11, wherein the strain sensor comprises a bridge circuit, the bridge circuit including: a first resistor, a second resistor, a third resistor and a fourth resistor which are constructed by a resistor element in which a resistance level changes based on strain amount, and wherein
  one end of the first resistor connects to one end of the second resistor, another end of the second resistor connects to one end of the third resistor, another end of third resistor connects to one end of the fourth resistor and another end of the fourth resistor connects to another end of the first resistor, and
  the first resistor is allocated to be opposite to the fourth resistor on the basis of the center line of the housing along a long side of the housing and the second resistor is allocated to be opposite to the third resistor on the basis of the center line of the housing along a short side of the housing, and
wherein the bridge circuit outputs a potential difference between a first connection point of the first resistor and the second resistor and a second connection point of the third resistor and the fourth resistor as the detected level.

16. A computer-readable non-transitory recording medium having stored therein a displaying content control program that causes a computer to execute a process comprising:
  acquiring a detected level of a strain sensor which detects strain on an opposite side against a surface in which a display unit is provided;
  detecting an acceleration of the display device by an acceleration sensor;
  storing, as an offset level, the detected level of the strain sensor when detecting that the acceleration of the display device detected by the acceleration sensor is within a predetermined acceleration range;
  offset compensating the detected level of the strain sensor using the offset level after said storing of the offset level; and
  controlling displaying content for the display unit based on the detected level.

17. A computer-readable non-transitory recording medium having stored therein a program for causing a computer to execute a process, the process comprising:
  acquiring a detected level of a strain sensor which detects strain on an opposite side against a surface in which the display unit is provided;
  detecting an acceleration of the display device by an acceleration sensor;
  storing, as an offset level, the detected level of the strain sensor when detecting that the acceleration of the display device detected by the acceleration sensor is within a predetermined acceleration range;
  offset compensating the detected level of the strain sensor using the offset level after said storing of the offset level; and
  outputting the detected level to another program which controls changing of displaying content for the display unit.

* * * * *